(12) United States Patent
Dress et al.

(10) Patent No.: US 7,796,885 B2
(45) Date of Patent: *Sep. 14, 2010

(54) DISTRIBUTION OPTICAL ELEMENTS AND COMPOUND COLLECTING LENSES FOR BROADCAST OPTICAL INTERCONNECT

(75) Inventors: William Benjamin Dress, Camas, WA (US); Frederick Norman Magee, Loon Lake, WA (US)

(73) Assignee: Lightfleet Corporation, Vancouver, WA (US)

( * ) Notice: Subject to any disclaimer, the term of this patent is extended or adjusted under 35 U.S.C. 154(b) by 41 days.

This patent is subject to a terminal disclaimer.

(21) Appl. No.: 11/818,883

(22) Filed: Jun. 14, 2007

(65) Prior Publication Data

US 2008/0008472 A1 Jan. 10, 2008

Related U.S. Application Data

(63) Continuation-in-part of application No. 11/796,133, filed on Apr. 25, 2007, which is a continuation-in-part of application No. 10/702,227, filed on Nov. 5, 2003, now Pat. No. 7,450,857.

(60) Provisional application No. 60/813,970, filed on Jun. 14, 2006, provisional application No. 60/423,939, filed on Nov. 5, 2002, provisional application No. 60/432,141, filed on Dec. 10, 2002.

(51) Int. Cl.
*H04B 10/10* (2006.01)

(52) U.S. Cl. ............................ 398/66; 398/118; 398/82; 398/164

(58) Field of Classification Search .................. 398/57, 398/164, 118, 128–131, 82
See application file for complete search history.

(56) References Cited

U.S. PATENT DOCUMENTS 3,798,568 A 3/1974 Willett (Continued)

FOREIGN PATENT DOCUMENTS

GB 2404054 1/2005

(Continued)

OTHER PUBLICATIONS

International Search Report for App. No. PCT/US/35242 mailed May 13, 2004.

(Continued)

*Primary Examiner*—Leslie Pascal
(74) *Attorney, Agent, or Firm*—John Bruckner PC

(57) ABSTRACT

Methods and apparatus are described for distribution optical elements and compound collector lenses for a broadcast interconnect. An apparatus includes a broadcast optical interconnect including: a plurality of nodes positioned to define a node array, each of the plurality of nodes having at least one optical signal emitter and a plurality of optical signal receivers positioned to define a receiver array that substantially corresponds to the node array; and a plurality of optics optically coupled to the array of nodes, the plurality of optics positioned to define an optics array that substantially corresponds to the node array and the receiver array, each of the plurality of optics including at least one optical distributing element and an optical collecting element, wherein an optical signal from the optical signal emitter is fanned-out by the at least one optical distributing element of one of the optics and broadcast to one of the plurality of receivers of all of the plurality of nodes by the optical collecting element of all of the plurality of optics.

18 Claims, 25 Drawing Sheets

U.S. PATENT DOCUMENTS

| | | | |
|---|---|---|---|
| 4,211,834 A | | 7/1980 | Lapadula et al. |
| 4,230,902 A | | 10/1980 | Hug et al. |
| 4,388,720 A | | 6/1983 | Silfvast et al. |
| 4,600,299 A | | 7/1986 | Abshire |
| 5,227,906 A | * | 7/1993 | Tokumitsu .................. 398/55 |
| 5,532,856 A | * | 7/1996 | Li et al. ........................ 398/58 |
| 5,541,914 A | * | 7/1996 | Krishnamoorthy et al. .. 370/427 |
| 5,576,873 A | * | 11/1996 | Crossland et al. ............. 398/54 |
| 6,326,600 B1 | * | 12/2001 | Christensen et al. ..... 250/201.1 |
| 6,414,774 B1 | * | 7/2002 | Scifres ...................... 398/129 |
| 6,683,418 B2 | | 1/2004 | Shoji et al. |
| 7,286,719 B2 | * | 10/2007 | Riley et al. ................. 382/294 |
| 7,450,857 B2 | * | 11/2008 | Dress et al. ................. 398/164 |
| 2002/0001127 A1 | * | 1/2002 | Morishima .................. 359/443 |
| 2002/0112139 A1 | | 8/2002 | Krause |
| 2003/0210409 A1 | | 11/2003 | Huang et al. |
| 2005/0138438 A1 | | 6/2005 | Bodas |
| 2009/0016717 A1 | * | 1/2009 | Zhong et al. .................. 398/51 |

FOREIGN PATENT DOCUMENTS

| | | | |
|---|---|---|---|
| JP | 8-15686 | * | 1/1996 |
| WO | WO 2005/038479 | | 4/2005 |

OTHER PUBLICATIONS

Cloonan, et al., "Shuffle-Equivalent Interconnection Topologies Based on Computer-Generated Binary-Phase Gratings", Applied Optics, Optical Society of America, Washington, vol. 33, No. 8, Mar. 10, 1994, p. 1405-1430.

McCormick, et al., "Five-Stage Free-Space Optical Switching Network With Field-Effect Transistor Self-Electro-Optic-Effect-Device Smart-Pixel Arrays", Applied Optics, Optical Society of America, Washington, vol. 33, No. 8, Mar. 10, 1994, p. 1601-1618.

* cited by examiner

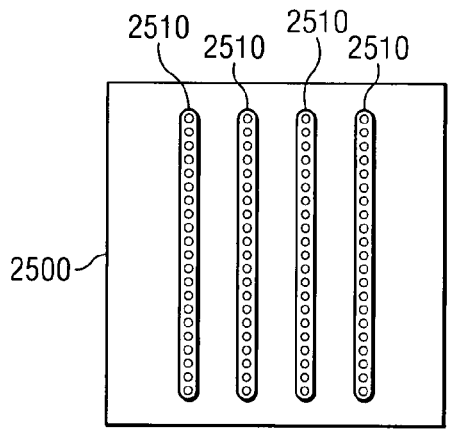
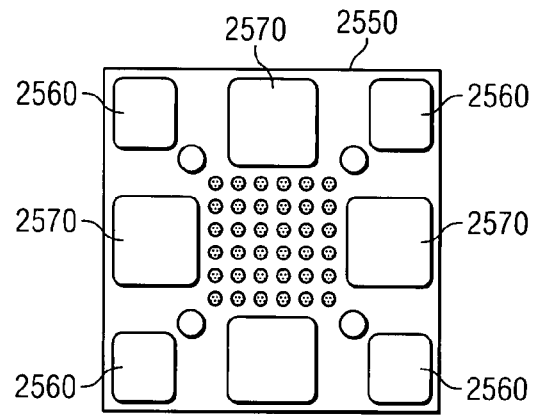
*FIG. 25A*  *FIG. 25B*
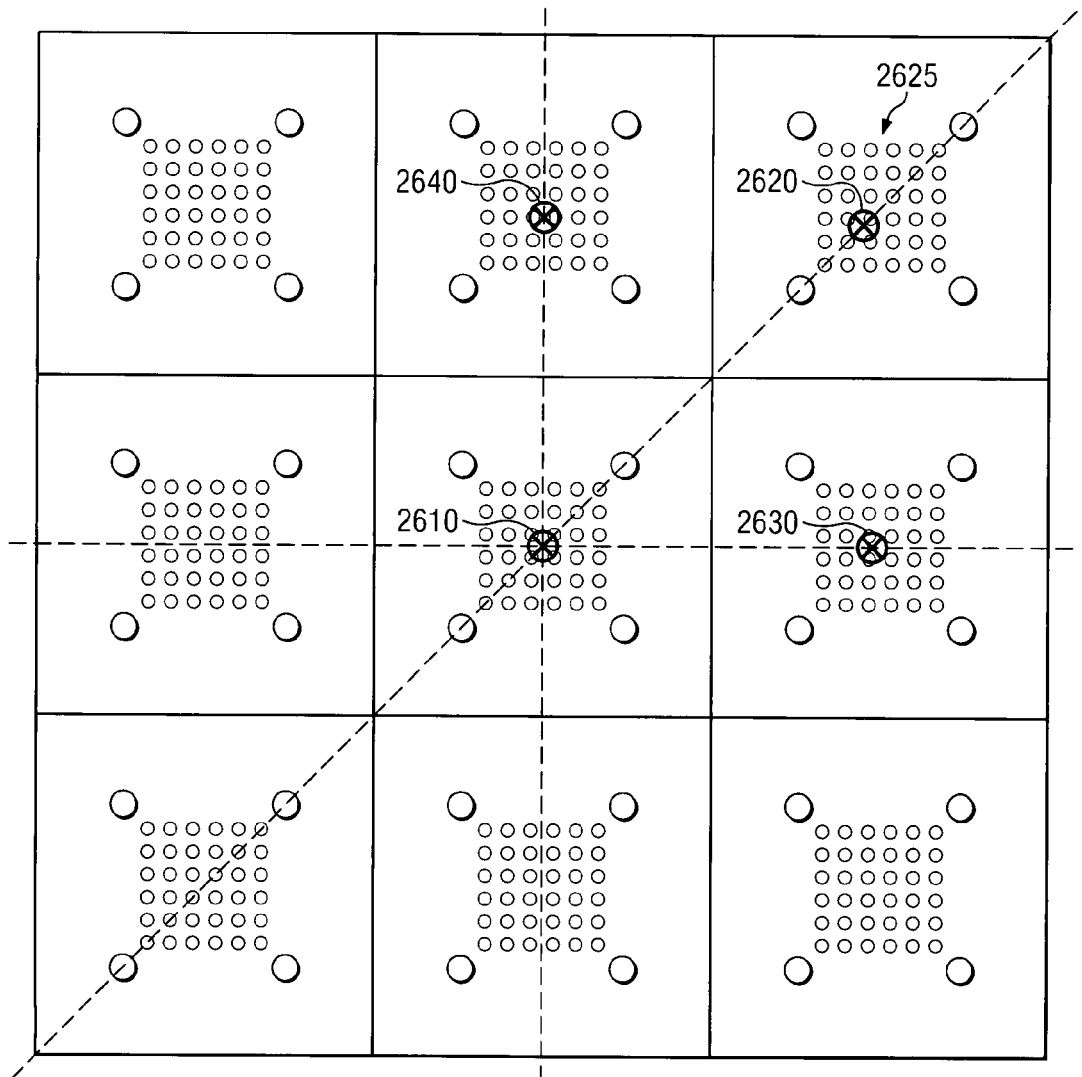
*FIG. 26*

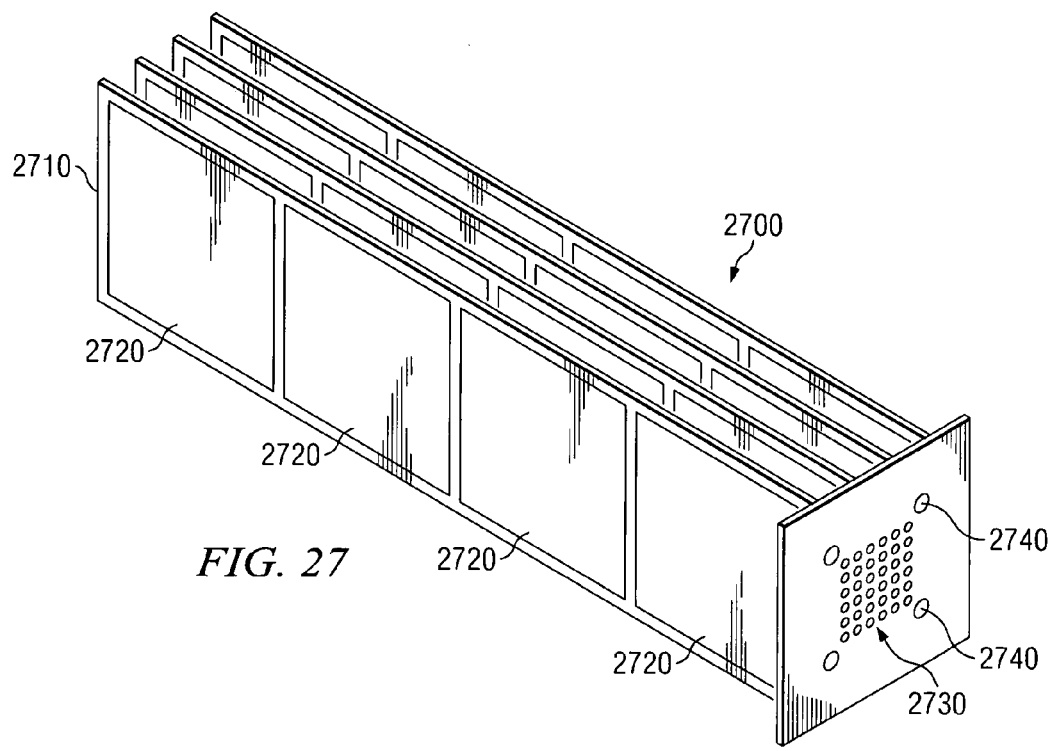
FIG. 27
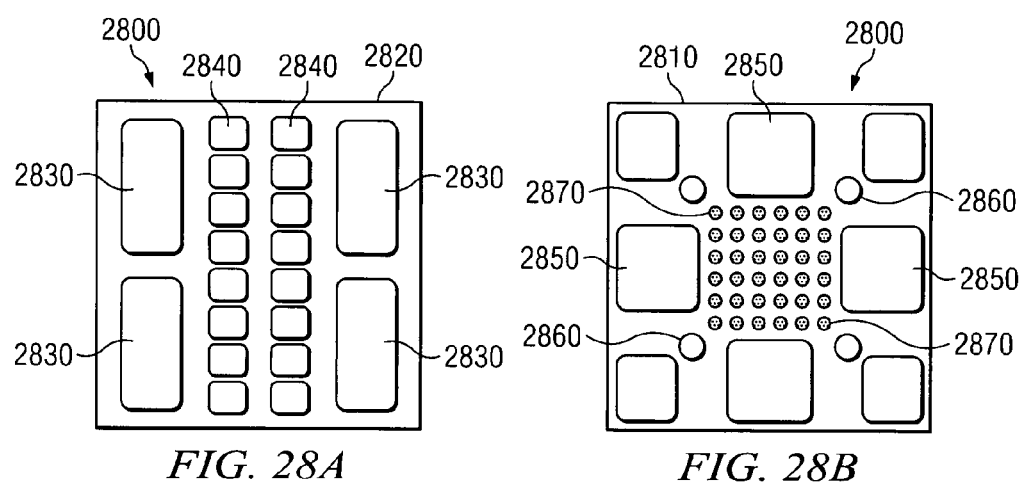
FIG. 28A
FIG. 28B

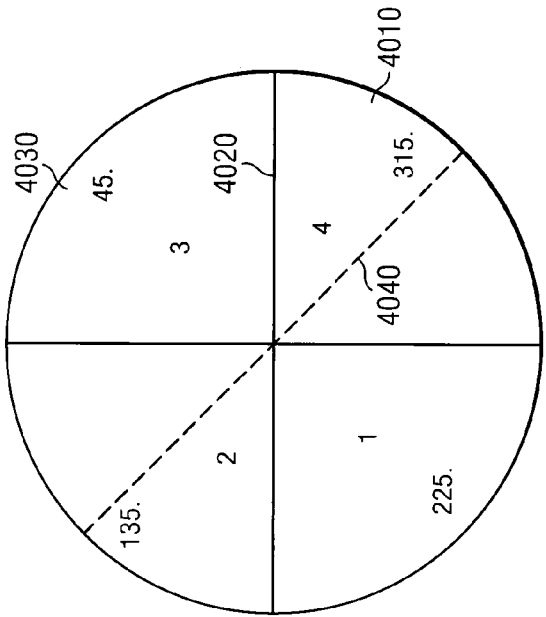
FIG. 39
FIG. 40
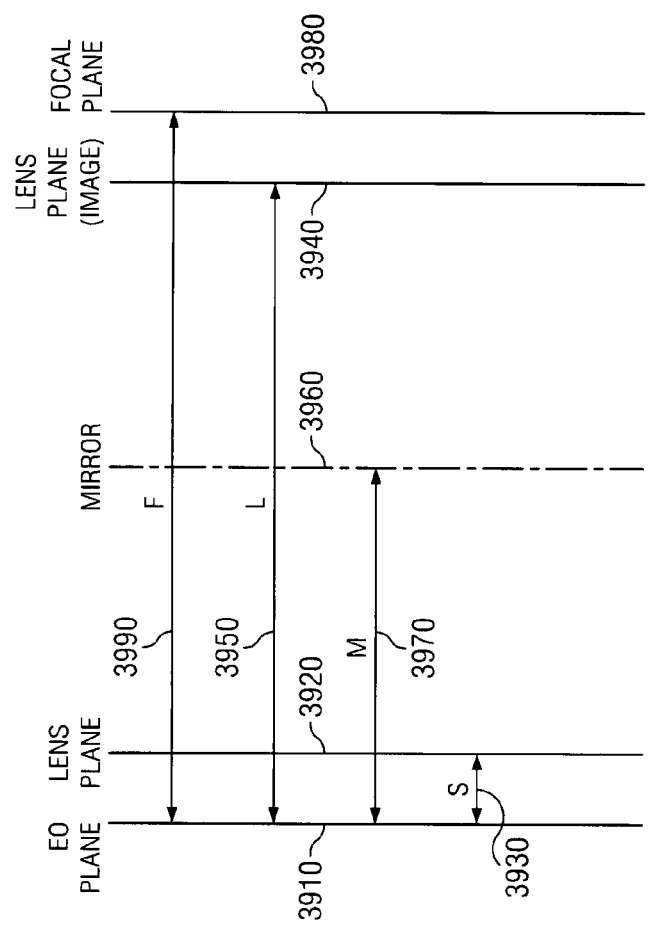
FIG. 38

|   | M1(0)     | M2(90)    | M3(180)   | M4(270)   |
|---|-----------|-----------|-----------|-----------|
| 1 | {1,2,3,4} | {3,1,2,4} | {4,3,1,2} | {2,4,3,1} |
| 2 | {1,2,3,4} | {3,1,2,4} | {4,3,1,2} | {2,4,3,1} |
| 3 | {1,2,3,4} | {3,1,2,4} | {4,3,1,2} | {2,4,3,1} |
| 4 | {1,2,3,4} | {3,1,2,4} | {4,3,1,2} | {2,4,3,1} |
| 5 | {1,2,3,4} | {3,1,2,4} | {4,3,1,2} | {2,4,3,1} |
| 6 | {1,2,3,4} | {3,1,2,4} | {4,3,1,2} | {2,4,3,1} |
| 7 | {1,2,3,4} | {3,1,2,4} | {4,3,1,2} | {2,4,3,1} |
| 8 | {1,2,3,4} | {3,1,2,4} | {4,3,1,2} | {2,4,3,1} |

*FIG. 42*

|    | R     | k      | c     | d     |
|----|-------|--------|-------|-------|
| 1  | 29.71 | -0.962 | 0     | 9.58  |
| 2  | 29.37 | -0.919 | -0.98 | 6.2   |
| 3  | 29.38 | -0.935 | -0.77 | 7.75  |
| 4  | 28.74 | -1.007 | -1.22 | 4.89  |
| 5  | 28.8  | -1.961 | 0     | 5.67  |
| 6  | 30.33 | -0.959 | -0.19 | 11.62 |
| 7  | 31.68 | -1.022 | 0.52  | 16.05 |
| 8  | 35.15 | -0.954 | 1.25  | 20.97 |
| 9  | 29.82 | -0.961 | -0.44 | 9.77  |
| 10 | 33.68 | -1.02  | 0.99  | 19.49 |
| 11 | 30.12 | -0.969 | -0.31 | 10.53 |
| 12 | 32.26 | -0.912 | 0.43  | 15.07 |
| 13 | 34.00 | -1.050 | 1.19  | 19.55 |
| 14 | 33.69 | -0.422 | 0     | 13.85 |
| 15 | 33.47 | -0.922 | 0.80  | 16.97 |
| 16 | 35.07 | -1.017 | 1.29  | 21.05 |
| 17 | 37.05 | -1.009 | 1.84  | 23.38 |
| 18 | 39.97 | -1.002 | 0     | 29.10 |

*FIG. 44*

|    | FACET 1 | FACET 2 | FACET 3 | FACET 4 |
|----|---------|---------|---------|---------|
| 1  | 1       | 18      | 8       | 8       |
| 2  | 2       | 17      | 7       | 10      |
| 3  | 3       | 16      | 6       | 13      |
| 4  | 2       | 17      | 10      | 7       |
| 5  | 4       | 15      | 9       | 12      |
| 6  | 3       | 16      | 13      | 6       |
| 7  | 4       | 15      | 12      | 9       |
| 8  | 5       | 14      | 11      | 11      |
| 9  | 6       | 3       | 16      | 12      |
| 10 | 7       | 2       | 17      | 10      |
| 11 | 8       | 1       | 18      | 8       |
| 12 | 9       | 4       | 15      | 10      |
| 13 | 10      | 2       | 17      | 12      |
| 14 | 11      | 5       | 14      | 7       |
| 15 | 12      | 4       | 15      | 11      |
| 16 | 13      | 3       | 16      | 9       |
| 17 | 6       | 13      | 3       | 6       |
| 18 | 9       | 12      | 4       | 16      |
| 19 | 11      | 11      | 5       | 15      |
| 20 | 7       | 10      | 2       | 17      |
| 21 | 12      | 9       | 4       | 15      |
| 22 | 8       | 8       | 1       | 18      |
| 23 | 10      | 7       | 2       | 17      |
| 24 | 13      | 6       | 3       | 16      |
| 25 | 14      | 11      | 11      | 5       |
| 26 | 15      | 12      | 9       | 4       |
| 27 | 16      | 13      | 6       | 3       |
| 28 | 15      | 9       | 12      | 4       |
| 29 | 17      | 10      | 7       | 2       |
| 30 | 16      | 6       | 13      | 3       |
| 31 | 17      | 7       | 10      | 2       |
| 32 | 18      | 8       | 8       | 1       |

*FIG. 45*

DISTRIBUTION OPTICAL ELEMENTS AND COMPOUND COLLECTING LENSES FOR BROADCAST OPTICAL INTERCONNECT

CROSS-REFERENCES TO RELATED APPLICATIONS

This application claims a benefit of priority under 35 U.S.C. 119(e) from provisional U.S. patent application Ser. No. 60/813,970, filed Jun. 14, 2006 and is also a continuation-in-part of, and claims a benefit of priority under 35 U.S.C. 120 from copending utility patent application U.S. Ser. No. 11/796,133 filed Apr. 25, 2007, which in-turn is a continuation-in-part of, and claims a benefit of priority under 35 U.S.C. 120 from copending utility U.S. patent application Ser. No. 10/702,227 filed Nov. 5, 2003 (now U.S. Pat. No. 7,450,857, issued Nov. 11, 2008), which in-turn claims a benefit of priority under 35 U.S.C. 119(e) from both provisional U.S. patent application Ser. No. 60/423,939, filed Nov. 5, 2002 and provisional U.S. patent application Ser. No. 60/432,141, filed Dec. 10, 2002, the entire contents of all of which are hereby expressly incorporated herein by reference for all purposes.

BACKGROUND OF THE INVENTION

1. Field of the Invention

The invention relates generally to the field of optical interconnects for computer systems and/or their subsystems as well as networks and/or their subsystems. More particularly, the invention relates to a free-space optical interconnect that includes a fan-out and broadcast signal link.

2. Discussion of the Related Art

The concept of parallel-distributed processing (PDP), which is the theory and practice of massively parallel processing machines, predates the first supercomputers of the 1960s. In practice, high-performance parallel-distributed processing machines are difficult to achieve for several interrelated reasons. On the physical side of the equation, interconnections between n processors or nodes increase as the square of the number of processors ($n^2$); the physical bulk increases as n for the packaging and $n^2$ for the interconnecting wiring; latency due to capacitance increases as the average distance between nodes, which is also proportional to n; heat-removal difficulty increases as the square root of the number of processors ($n^{1/2}$) due to the surface-to-volume ratio. On the logical side of the equation, message overhead is constant for broadcast mode and can increase as n for relay mode. The impact on software is roughly proportional to $n^2$ due to the increased complexity of parallel-distributed processing algorithms. The overall cost per node increases more rapidly than the number of nodes when all these factors are considered. What is needed is a method of parallel-distributed processing, design and operation that overcomes some or all of these scaling problems.

The present record holder in performance is NEC's "Earth Simulator" topping out at 35.86 teraflops (a teraflop is 1000 gigaflops and a flop is a floating-point operation while "flops" usually refers to a flop per second). While there are many interesting and novel entries in today's supercomputer marathon, the Department of Energy's Advanced Simulation and Computing Initiative (ASCI) has sponsored several of the top contenders. The latest of these is a fifth-generation ASCI system to be built by IBM. The ASCI Purple (AP), if on time and within budget, will arrive by 2005 at a projected cost of approximately $550 per gigaflop with an ultimate option to have a 100-teraflops performance figure in a single machine. (A gigaflop is one billion operations per second.) This is about 12 times the performance of the previous ASCI Q and ASCI White machines. By contrast, a present-day personal computer is typically priced about $750/GF (the minimum cost is probably about $500/GF, i.e., actually less than the ASCI Purple.) This clearly shows that economies of scale are non-existent to marginal given the factor of nearly 13,000 increase in the number of processors required to achieve the 100 teraflop (TF) figure. (A teraflop is 1000 gigaflops.) The ASCI Purple (AP) is estimated to weight in at 197 tons and cover an area of two basketball courts (volume not specified). The AP will have 12,433 Power5 microprocessors, a total memory bandwidth of 156,000 GBs (gigabytes per seconds), and approximately 50 terabytes (million megabytes) of memory. Power dissipation will be between 4 and 8 MW (megawatts), counting memory, storage, routing hardware and processors.

IBM's Blue Gene3/L (BGL), based on that company's system-on-chip (SOC) technology, will take up four times less space and consume about 5 times less power, it is expected to perform at the 300 to 400 teraflops level. The cost per gigaflop will be about the same at about $600/GF as above. Each of the 65,000 nodes in the BGL will contain two Power PCs, four floating-point units, 8 Mbytes of embedded DRAM, a memory controller, support for gigabit Ethernet, and three interconnect modules. The total number of transistors is expected to be around 5 million, making for a large, expensive, and relatively power-hungry node. The interconnect topology is that of a torus, where each node directly connects to six neighbors. For synchronizing all nodes in the system, hardware called a "broadcast tree" is necessary. Establishing broadcast mode to begin a computation, for example, will require several microseconds. To round out the hardware complement of a node, nine memory chips with connectors (for a total of 256 Mbytes) are foreseen. Four nodes will be placed on a 4 by 2-inch printed-circuit card.

Reliability in these existing machines is a major concern when there are from hundreds-of-thousands to millions of material interconnections (e.g., wires, connectors, solder joints, contact bonding). What is needed is an approach to super computer design that increases reliability.

Moreover, the main, unsolved problem facing today's supercomputers is how to achieve the economies of scale found elsewhere in the industrial world. Machines with tens of thousands of processors cost as much per gigaflop as commodity PCs having only a single processor. Part of the reason for this lack of progress in supercomputer scaling is that the interconnect problem has not yet found a satisfactory solution. Adopting present solutions leads to a reliance on slow and bulky, off-chip hardware to carry the message traffic between processors. A related problem is that communication delays increase as the number of nodes increases, meaning that the law of diminishing returns soon sets in. This issue drives the industry to faster and faster processing nodes to compensate for the communications bottleneck. However, using faster and more powerful nodes increases both the cost per node and the overall power consumption. Smaller, slower, and smarter processors could be effectively used if the communications problem were to be solved in a more reasonable fashion.

Broadcasting is an essential feature of parallel computer interconnects. It is used for synchronization, and is intrinsic to many types of calculations and applications, including memory system coherency control and virtual memory. Many applications running on today's supercomputers were written decades ago for relatively small parallel computers that had good bandwidth for broadcasting. These programs run poorly on today's massively parallel machines. The commonly used interconnects based on cross bars and fat trees as well as all existing parallel computers with n interconnecting nodes consume n channels of bandwidth during broadcasting, so the per port and bisection bandwidths do not change substantially when broadcasting.

Massively parallel high performance computers using fat tree and crossbar interconnect suffer from a mismatch with the software requirement for non-blocking broadcast of short messages. Two of the most common network functions, All-reduce and Sync simultaneously broadcast one-word messages. Such broadcast uses excessive bandwidth in fat-tree interconnects which results in poor system performance. Another function, termed all-to-all communications wherein each computing node in a supercomputer frequently needs to communicate to all other nodes during the course of a computation is an essential functional capability of any modern interconnect scheme. Additionally, these all-to-all messages are typically short, being a few bytes in length. Frequently used algorithms requiring the all-to-all function include parallel versions of matrix transpose and inversion, Fourier transforms, and sorting. The most effective way to implement the all-to-all function is to base it on a true broadcast capability. Present systems can broadcast information, but only by simulating the broadcast function; thus their capability for implementing the all-to-all function is inefficient.

A poor solution to the interconnect problem leads one directly to the general assumption that the most powerful processors available should be crammed into each node to achieve good supercomputer performance, thus hiding the problems inherent in the interconnect by faster processors and higher channel bandwidth. A compromise is possible if some of these other issues are more effectively resolved. The compromise based on a more suitable interconnect would make use of processors not quite on the leading edge of integration and performance to create a supercomputer of lower cost and power consumption with just as great, or more, overall capability. Of course, nothing prevents one from using the ultra-performance processors as nodes in the proposed systems; both cost and capability would rise significantly.

Today's supercomputer architecture at most makes use of 8-way multithreading, meaning that there is hardware support for up to 8 independent program threads. Any multitasking to be found is handled by software. While theoretically alleviating the communications bottle-neck problem and helping to overcome data-dependency issues, the cure is literally worse than the disease since the nodes now spend more time managing the system's tasks in software than is gained by decomposing complex programs into tasks in the first place. What is needed is a scalable and cost effective approach to supercomputers that range in size from a briefcase to a small office building, and in performance from a few teraflops to a few petaflops. (A petaflop is 1000 teraflops.)

Interconnect schemes today are invariably based on material busses and cross bars. As data rates increase and data processors become faster, electrical communication between data-processing nodes becomes more power intensive and expensive. As the number of processing nodes communicating within a system increases, electrical communication become slower due to increased distance and capacitance as well as more cumbersome due to the geometric increase in the number of wires, the volume of the crossbar, as well as its mass and power consumption. Electrical interconnects are reaching their limit of applicability. As speed requirements increase to match the capacity of ever faster processors for handling data, faster electrical interconnects should be based on controlled-impedance transmission lines whose terminations increase power consumption. Even the use of microstrip lines is only a partial solution as, in any fully-connected system, such lines should cross (in different board layers). Close proximity of communication channels produces crosstalk, which is perceived as noise on adjacent channels. Neither of these problems occur in a light-based interconnect.

Optical interconnects, long recognized to be the ideal solution, are still in the experimental stage with practical optical systems connecting only a handful of processors. The main problem with today's optical solutions is conceptual: they are trying to solve a more complicated problem than necessary. This restrictive view has its origins in a limited version of a task or thread: if CPU overhead is required to switch from a computational task to a communications task every time a message arrives, any conceivable computation spread across a multiprocessor system will soon be spending most all of its time on switching overhead. The way around this untenable situation is to create literal, point-to-point connections as is done for the Hypercube™ and Manhattan architectures such as the Transputer™. Thus, the source and destination of every message is determined by hard-wired connections. This idea is carried over into optical schemes where there is an emitter dedicated to every receiver and a single receiver for every emitter. For an optical system serving hundreds of thousands of nodes, the mechanical alignment is an insurmountable nightmare.

Over the years, a number of universities and private and government laboratories have investigated free space optical interconnect (FSOI) methods for multiprocessor computing, communications switching, database searching, and other specific applications. The bulk of the research and implementation of FSOI has been in finding ways to achieve point-to-point communications with narrow beams of light from multiple arrays of emitters, typically narrow-beam lasers, and multiple arrays of photoreceivers. The development of vertical-cavity, surface-emitting lasers (VCSELs) and integrated arrays of VCSELs has been the main impetus behind research in narrow-beam FSOI area. The main problems with FSOI to overcome are alignment, where each laser must hit a specific receiver, and mechanical robustness. U.S. Pat. No. 6,509,992 specifically addresses the problem of misalignment and robustness by disclosing a system of redundant optical paths. When misalignment is detected by a channel-monitoring device, an alternate path is chosen.

Both unfolded configurations, where an array of emitters transmits light across a space to an array of receivers, and folded configurations, where the emitters and receivers lie in the same plane, have been attempted. Most FSOI methods lack direct broadcast capability due to the one-emitter, one-receiver assumption.

Point-to-point optical communications, wherein a narrowly focused laser beam communicates information to a single receiver, represents the extreme case of an optical fan-out of one. A variation is to split a narrowly focused laser beam using one or more beam splitters, each beam splitting producing two beams from the original. In this way, a single narrow beam can be split into $2^j$ beams by j beam splitters, achieving an optical fan-out of a single narrow beam into multiple narrow, but weaker, beams. However, since the receivers are typically small devices, perhaps a tenth of a millimeter in diameter, it is difficult to achieve and maintain optical alignment of the narrow laser beam onto one or more receivers across all but the smallest distances.

A similar method of fan-out has been achieved by use of a diffractive element such as a hologram that splits a single beam into a multiplicity of beams. U.S. Pat. No. 6,452,700 discloses an FSOI backplane based on holographic optical elements mounted on an expansion card. This approach also suffers from sensitivity to alignment which is augmented by temperature sensitivity of the hologram material that affects the size of the fan-out pattern. In a typical implementation of a four-node, point-to-point optical interconnect whose linear dimensions are approximately 100 mm, the constraint on angular alignment of the narrow beam is 1/20th of a degree. Severity of this constraint increases linearly with the size of the interconnect.

What is needed is a cost effectively scalable approach to optical interconnection that is not sensitive to alignment issues.

SUMMARY OF THE INVENTION

There is a need for the following aspects of the invention. Of course, the invention is not limited to these aspects.

According to an aspect of the invention, a process comprises operating an optical fan-out and broadcast interconnect including: fanning-out an optical signal from an optical signal emitter, of one of a plurality of nodes, with a diverging element of one of a plurality of optics; and broadcasting the optical signal to one of a plurality of receivers of all of the plurality of nodes with a light collecting and focusing element of all of the plurality of optics, wherein the plurality of optics are positioned to define an optics array, the plurality of receivers are positioned to define a receiver array that corresponds to the optics array and the plurality of nodes are positioned to define a node array that substantially corresponds to the receiver array and the optics array. According to another aspect of the invention, a manufacture comprises an optical fan-out and broadcast interconnect including: a plurality of nodes positioned to define a node array, each of the plurality of nodes having an optical signal emitter and a plurality of optical signal receivers positioned to define a receiver array that substantially corresponds to the node array; and a plurality of optics optically coupled to the array of nodes, the plurality of optics positioned to define an optics array that substantially corresponds to the node array and the receiver array, each of the plurality of optics including a diverging element and a light collecting and focusing element, wherein an optical signal from the optical signal emitter is fanned-out by the diverging element of one of the optics and broadcast to one of the plurality of receivers of all of the plurality of nodes by the light collecting and focusing element of all of the plurality of optics. According to another aspect of the invention, a process comprises operating a lightnode including: fanning-out an optical signal through a diverging element; broadcasting the optical signal through a light collecting and focusing element; and receiving the optical signal with one of a plurality of receivers, wherein the plurality of receivers are positioned to define a receiver array. According to another aspect of the invention, a manufacture comprises a lightnode including: a diverging element; a light collecting and focusing element optically coupled to the diverging element; and a receiver array optically coupled to the light collecting and focusing element, the receiver array having a plurality of optical signal receivers positioned to define the receiver array. According to another aspect of the invention, a manufacture comprises a node array including a plurality of nodes positioned to define the node array, each of the plurality of nodes having an optical signal emitter and a plurality of optical signal receivers positioned to define a receiver array that substantially corresponds to the node array. According to another aspect of the invention, a manufacture comprises an optic array including a plurality of optics positioned to define the optics array, each of the plurality of optics including a diverging element and a light collecting and focusing element.

According to another aspect of the invention, an apparatus comprises a communications network interconnect including an input layer including a plurality of input channels; a multicast channel branching fabric coupled to the input layer; and a modular output layer coupled to the multicast channel branching fabric layer, the modular output layer including a plurality of individual serial data channels; and a plurality of sets of endpoints, each set of endpoints coupled to one of the plurality of individual serial data channels. According to another aspect of the invention, a method, comprises: inputting a signal into an input layer that includes a plurality of input channels; multicasting the signal through a multicast channel branching fabric that is coupled to the input layer; and outputting the signal through a modular output layer that is coupled to the multicast channel branching fabric layer, wherein outputting includes conveying the signal through a plurality of individual serial data channels; and sending the signal to a plurality of sets of endpoints, each set of endpoints coupled to one of the plurality of individual serial data channels.

According to another aspect of the invention, an apparatus comprises a broadcast interconnect including: a plurality of nodes positioned to define a node array, each of the plurality of nodes having at least one optical signal emitter and a plurality of optical signal receivers positioned to define a receiver array that substantially corresponds to the node array; and a plurality of optics optically coupled to the array of nodes, the plurality of optics positioned to define an optics array that substantially corresponds to the node array and the receiver array, each of the plurality of optics including at least one optical distributing element and an optical collecting element, wherein an optical signal from the optical signal emitter is fanned-out by the at least one optical distributing element of one of the optics and broadcast to one of the plurality of receivers of all of the plurality of nodes by the optical collecting element of all of the plurality of optics. According to another aspect of the invention, a method comprises operating a broadcast optical interconnect including: fanning-out an optical signal from an optical signal emitter, of one of a plurality of nodes, with an optical distributing element of one of a plurality of optics; and substantially simultaneously broadcasting the optical signal to one of a plurality of receivers of all of the plurality of nodes with an optical collecting element of all of the plurality of optics, wherein the plurality of optics are positioned to define an optics array, the plurality of receivers are positioned to define a receiver array that corresponds to the optics array and the plurality of nodes are positioned to define a node array that substantially corresponds to the receiver array and the optics array.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same elements. The invention may be better understood by reference to one or more of these drawings in combination with the description presented herein. It should be noted that the features illustrated in the drawings are not necessarily drawn to scale.

FIGS. 25A and 25B illustrate schematic bottom normal (FIG. 25A) and top normal (FIG. 25B) views of a node including four processing nodes (modules), four emitters and 36 detectors implying deployment of the node in a 3 by 3 node array, representing an embodiment of the invention.

FIG. 26 illustrates a schematic normal view of a 3 by 3 module array showing asymmetric alignment of the optics corresponding to the four modules at the upper right of the module array, representing an embodiment of the invention.

FIG. 27 illustrates a schematic perspective view of a node including four processing nodes (modules) each of which includes four subsections, representing an embodiment of the invention.

FIGS. 28A and 28B illustrate schematic bottom normal (FIG. 28A) and top normal (FIG. 28B) views of a node with four processing nodes (modules), representing an embodiment of the invention.

FIG. 38 is an unfolded side view showing mirror and defining planes, representing an embodiment of the invention.

FIG. 39 is an illustration of a faceted lens, representing an embodiment of the invention.

FIG. 40 is a table of the symmetry properties of the broadcast lenses, representing an embodiment of the invention.

FIG. 42 is a table of the symmetry properties of the 128 facets, representing an embodiment of the invention.

FIG. 44 is a table of Facet Parameters, representing an embodiment of the invention FIG. 45 is a table of facet parameter locations, representing an embodiment of the invention

DESCRIPTION OF PREFERRED EMBODIMENTS

Figure 1:
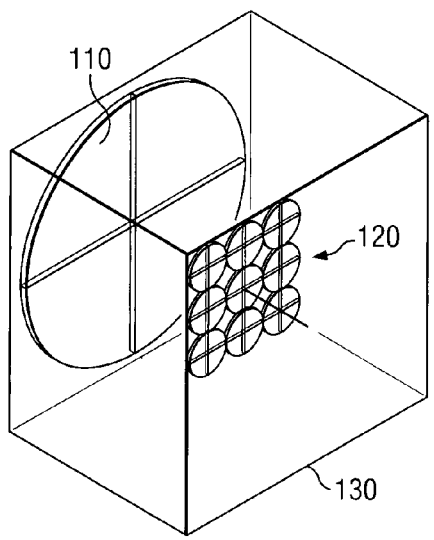
FIG. 1 illustrates a schematic perspective view of a subassembly including a mirror and lens array, representing an embodiment of the invention.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The below-referenced U.S. patents disclose embodiments that are useful for the purposes for which they are intended. The entire contents of U.S. Pat. Nos. 6,538,818; 6,509,992; 6,452,700; 6,445,326; 6,208,672; 6,163,642; 6,016,211; 5,987,601; 5,965,873; 5,864,642; 5,778,015; 5,703,707; 5,541,914; 5,465,379; 5,548,772; 5,546,209; 5,446,572; 5,432,722; 5,420,954; 5,414,819; 5,412,506; 5,297,068; 5,228,105; 5,159,473; 5,146,358; 4,953,954; 4,943,136; and 4,870,637 are all hereby expressly incorporated by reference herein for all purposes. The below-referenced U.S. patent applications disclose embodiments that are useful for the purposes for which they are intended. The entire contents of U.S. Ser. No. 10/175,621, filed Jun. 20, 2002 and PCT/US03/19175, filed Jun. 18, 2003 both by Brian T. Donovan & William B. Dress and entitled "Pulse Width and/or Position Modulation and/or Demodulation" are hereby expressly incorporated by reference for all purposes. The entire contents of U.S. Ser. No. 60/290,919, filed May 14, 2001 and PCT/US02/15191, filed May 13, 2002 (published Nov. 21, 2002 as WO 02/093752) all by Brian T. Donovan et al. are all hereby expressly incorporated by reference for all purposes. The entire contents of U.S. Ser. No. 10/227,050, Aug. 23, 2002 "Dynamic Multilevel Task Management Method and Apparatus" by Brian T. Donovan, Ray S. McKaig, and William B. Dress are hereby expressly incorporated by reference for all purposes.

Optical Backplane Disclosure

A massively parallel processing (MPP) system can include an array of processor modules or computing nodes that are interconnected. In practice, each processor node is an independent die or "chip" that could be individually packaged and would thereby serve as a fully functional microprocessor with its standard power, ground, data buses, memory ports, and so on. Much of the expense in a modern processing system lies in the packaging of an individual die and the extension support necessary to provide power to and communicate with each processor in the system. If the individual processor dies could be connected by nearest neighbor communications buses for example, and the entire array of processors be retained as a single functioning module without destroying the wafer, it might be possible to power each processor node and communicate with the entire array. In this view, the wafer of processors becomes the computing element at a much lower cost and higher throughput than would be incurred by separately packaging, remounting, powering, and communicating with each individual processor.

For the wafer of processors or a collection of multi-chip modules or a collection of printed-circuit board modules to be an effective and functional system, n integration or close geometric coupling of the individual processor node should be implemented. Past efforts have centered around wafer-scale bus architectures for linking all processors together. The disadvantages of this approach are slow communication speed between processors due to the long bus structures and the attendant high capacitance. Other approaches have been attempted to communicate between nodes using various optical methods. A recent favorite is to have n laser emitters and n laser receivers on each node where n is the number of nodes on the wafer. This point-to-point communication allows each node to individually talk directly to any other but involves a total surface area of $2n^2 \times A$, where A is the area of an emitter or receiver, typically a region of about 100 µm on a side. By switching to a broadcast model where each node has a single emitter but n receivers, this overhead is cut in half. More importantly, the communications traffic handled by each node in the case of "fully connected" wafer can easily overload the computational capacity of the node itself for both transmission and reception. In the broadcast model, where each node has but a single emitter, the transmission load is approximately n times less while the receiving communications load can be maximal if needed. Clearly a communications protocol should be established to decide whether a particular transmitted message is for a particular node as any given emitter talks to all nodes. If the nodes are indexed or numbered for identification purposes, a map may be constructed for each node in the array. This map specifies which receiver on a given node is optically linked to which particular emitter. Each receiver is then monitored by a task or a circuit running on the node in question, said task or circuit identifying received messages for the receiving node and ignoring others.

A goal of an optical backplane is to provide a parallel interconnection structure, connecting each node to every other node on the wafer. One approach to providing such an optical interconnect is to employ an array of lenses and a mirror as illustrated in FIG. 1.

Referring to FIG. 1, a mirror 110 is shown on the left of the figure with a 3×3 lens array 120 to the right of the mirror, and centered on the mirror axis. An array of computing nodes (not shown) would lie to the right of the lens array. The mirror 110, the array 120 and the array of computing nodes can all be contained within an enclosure 130, optionally under partial vacuum.

Figure 4:
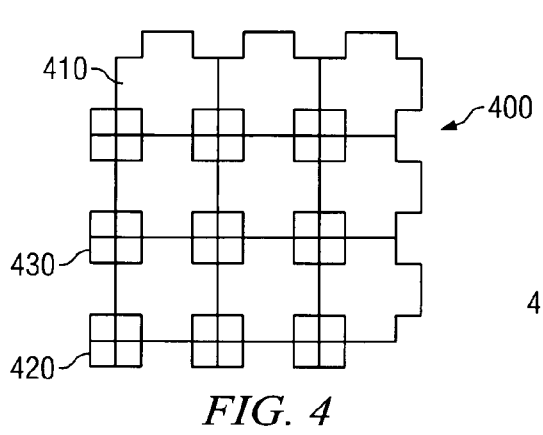
FIG. 4 illustrates a schematic normal view of a composite lens assembly including a converging lens array and a diverging lens array, representing an embodiment of the invention.
Figure 5:
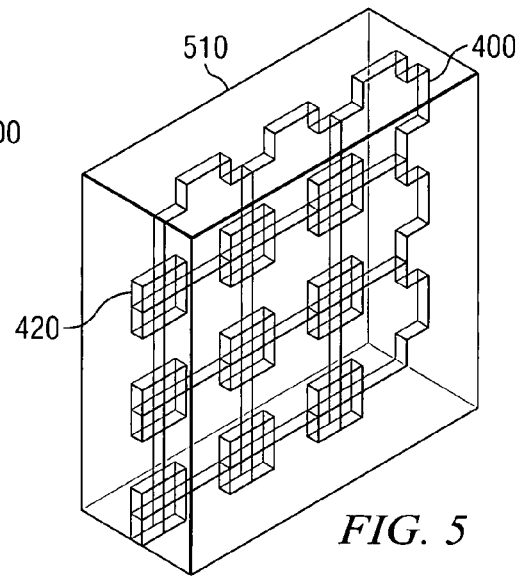
FIG. 5 illustrates a schematic perspective view of the composite lens assembly shown in FIG. 4, representing an embodiment of the invention.
Figure 6:
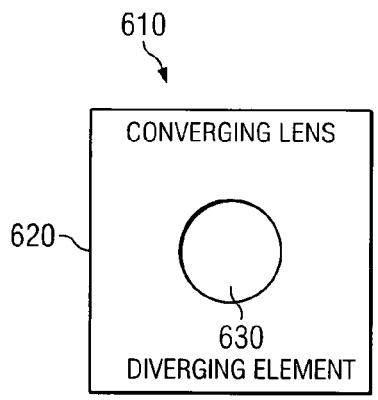
FIG. 6 illustrates a schematic normal view of an alternative composite optic including a converging lens and a diverging element in coaxial alignment with the converging lens, representing an embodiment of the invention.

A design that optimally matches the array of nodes is to place an array of converging lenses where each lens has the same dimensions as the underlying node and the array thus formed is placed directly over the array of nodes. As shown in FIGS. 4-6, the lens array preferably includes both diverging elements and converging elements. The function of the diverging elements, whether light pipes, thick optical fibers, negative conical lenses or the usual diverging (concave) spherical lenses, is to spread the light from each emitter to cover at least half of the mirror area so that upon reflection, the emitter in question illuminates at least the entire lens array so that every node on the wafer receives light from each emitter. This desired property is illustrated in FIGS. 2A and 2B.

Figure 2A:
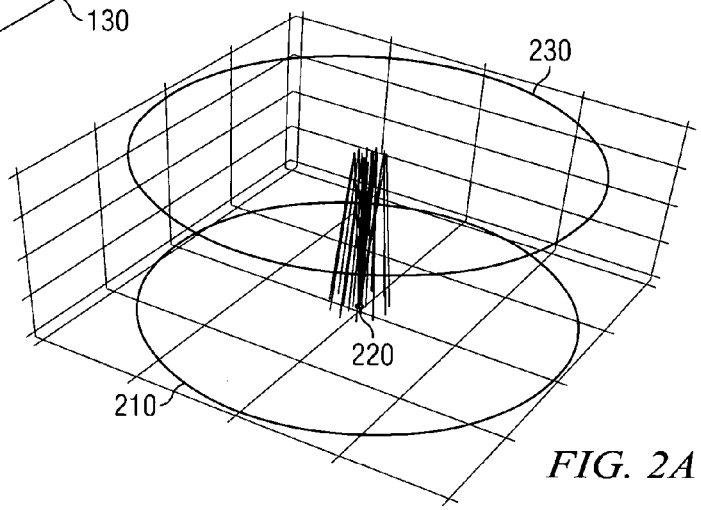
FIGS. 2A and 2B illustrate schematic perspective views of light rays from an emitter on a wafer opposite a mirror without (FIG. 2A) and with (FIG. 2B) a diverging lens, representing an embodiment of the invention.
Figure 2B:
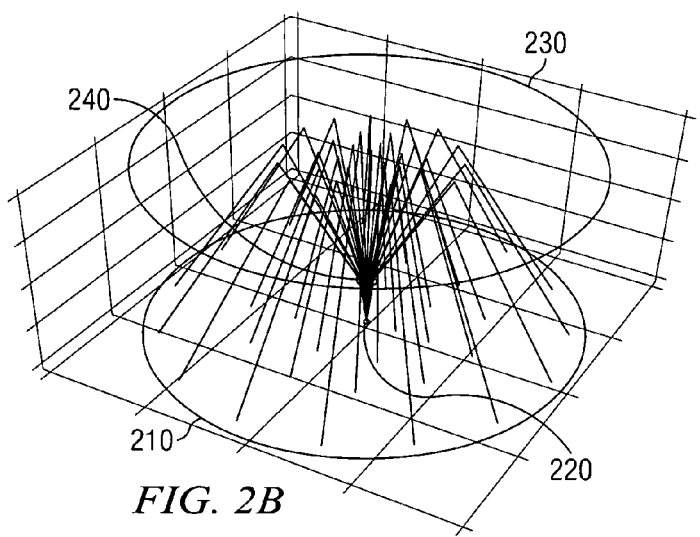

Referring to FIGS. 2A-2B, a wafer 210 is depicted as the bottom disk with an emitter 220 shown as the centered dot and a mirror 230 is represented by the top disk. If the emittance cone of the emitter 220 is 8°, which is typical for a VCSEL laser, a set of typical rays is shown with direct rays diverging from bottom to top and reflected rays diverging from top to bottom. FIG. 2B is similar to FIG. 2A, but includes a diverging lens 240 above the centered emitter 220. In FIG. 2B, the entire wafer array is covered by the reflected light. The diverging lens 220 is shown at the center of FIG. 2B as a small disk.

The invention can include inserting (including) a converging lens to collect the reflected rays and focus the light onto the intended receivers. This situation is shown in FIG. 3.

Figure 3:
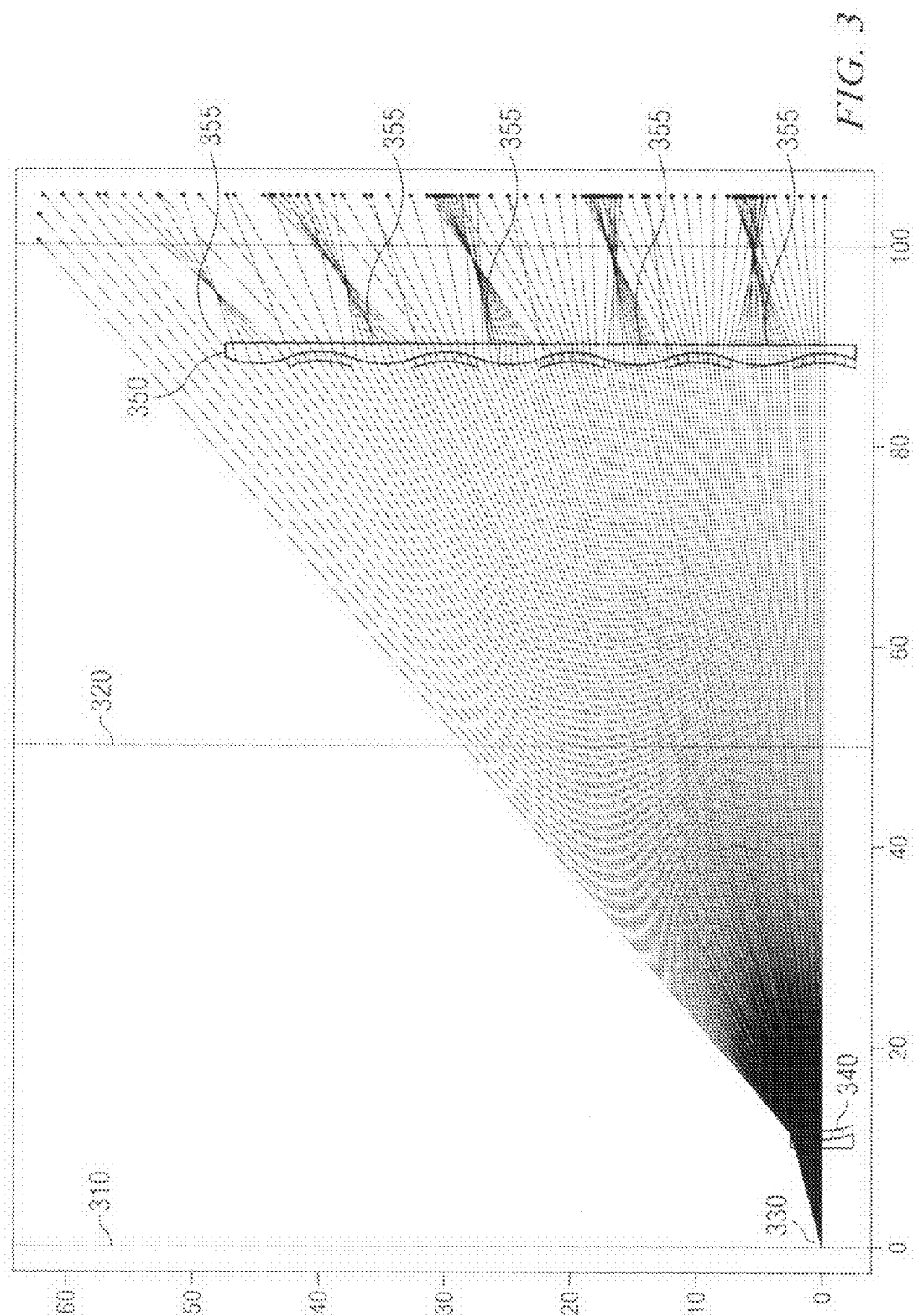
FIG. 3 illustrates a schematic cross sectional view of light rays from an emitter through an unfolded wafer-mirror-lens array assembly, representing an embodiment of the invention.

Referring to FIG. 3, a cross section through the unfolded system is depicted showing only half of the system (the light rays and lenses below zero are inferred by symmetry about the horizontal axis). An array of nodes 310 is on the left, with node centers at every 10 mm (centers are coordinates 0, 10, 20, . . . ). A mirror 320 is shown as the vertical line in the center at distance 50 from the wafer, only a single emitter 330 at coordinate (0,0) is shown for clarity. Its accompanying diverging lens 340 is shown at about distance 10 from the wafer. The lens array 350 is located at about position 90 is has its optical centers characterized by the spatial index reflection of the array 310 on the left, the later of which is not shown in its entirety for clarity. The rays emitted from the light source at the wafer surface diverge slightly and fill the diverging lens 340 where they spread out to cover about half the mirror 320 and then are reflected back onto the lens array 350. The diverging lens 340 further broadens the light while the converging lenses 355 of the lens array 350 focus the light on or near the wafer whose reflection is shown at position 100. In FIG. 3, where the mirror is at a distance of 50 (half the wafer radius), the variation in focal points across the wafer becomes obvious. There are at least two ways to overcome this lack of focus across the entire wafer. The first is to place the mirror at a distance equal to or greater than the wafer radius, essentially flattening the surface defined by the focal points, so the maximum deviation would be cut in half or more than the situation shown above. The second is to insert an array of n micro lenses (not shown) just above each node, providing an additional convergence of the light onto the array of receivers. A microlens can be placed just above each receiver at a distance consistent with good focusing of the converging beams onto the receiving photo transistors.

Referring to FIG. 4, a 3×3 array 400 of cross-shaped converging lenses 410 is illustrated with a 3×3 array of smaller, square diverging lenses 420 nominally residing at the lower left corner of the larger converging lenses 410. The diverging lenses 420 are represented as squares with median horizontal and vertical coordinate axes (defining diverging quadrants 430) drawn through their centers. The depicted array 400 could be optically coupled to a wafer with 9 or 3×3 nodes. For a wafer with 256 or 16×16 nodes, a similar lens array could include 16×16 cross-shaped lenses and 16×16 smaller, square diverging lenses fitted as shown for a total of 512 lenses. If the nodes are 10×10 mm in size, the cross-shaped converging lenses would also have outer dimensions of 10×10 mm and the lens centers would be positioned precisely above the node centers, while the emitters are positioned at the lower-left corners of the nodes.

Referring to FIG. 5, a three-dimensional rendering of the array 400 shown in FIG. 4 is illustrated. The smaller diverging lenses 420 are shown with contour plans in their centers. The array 400, and optionally the array of nodes and the mirror can be contained within an enclosure 510.

Referring to FIG. 6, an alternative embodiment is to center the emitters and place the (round or square) diverging element or possibly light pipe or optic fiber from the emitter passing through the precise center of converging lenses. The receiver map will of course be different in this case than in the case of corner (or edge) emitters. A planar view with a circular diverging lens is shown in FIG. 6. The converging portion is square to just match the underlying node dimensions and an array formed from n of these compound lenses would sit just over the wafer as pictured in FIGS. 4 and 5.

Referring to FIG. 6, an alternative embodiment of an optic 610 including a converging element 620 and a diverging element 630 is depicted. In this embodiment, the converging element 620 including a converging lens and the diverging element 630 includes a diverging lens. The diverging lens is located at the center of the converging lens and they are coplanar.

Optical Backplane Supercomputer

The invention can include a unique, new computer architecture for the construction of backplane optical supercomputers composed of a multitude of processors arranged in arrays reaching to full wafer scale sizes whereby the individual processors are massively but inexpensively interconnected and enabled to simultaneously communicate with each other by virtue of the emission and reception of optical signals from processor to processor through the use of a geometric matrix of divergent and convergent lenses so structured as to precisely position the signals and assure their proper spatial distribution through three dimensional space throughout the computer through the use of a mirrored backplane reflective surface. With signals proceeding between the system's various processors at the speed of light, the invention permits the elimination of the wiring complexities that otherwise exist and are compounded by the square of the number of supercomputer processor nodes as extra processor components are added in current supercomputer array designs. The processors can be arrayed in planar fashion on silicon wafers or other fabrication material wafers in accordance with standard manufacturing procedures. Each processor includes one or more gas plasma, laser, light-emitting diode (LED) or other type of light emitting nodes together with light reception nodes. A lens matrix array containing divergent and convergent lens facets for each separate processor is employed in planar fashion positioned at an appropriate distance above the wafer with its array of processors. When light is emitted by any one or another of the processors, it passes through the divergent aspect of its respective lens facet to a reflective mirror appropriately positioned above the wafer and lens matrix. This light then strikes the mirror and is reflected back to and through the convergent lens aspect of the receiving processor where it is internally converted to a signal for execution within that processor's processing mechanisms. The entire supercomputer system may be chilled and provided with heat dissipation mechanisms as necessary. Software controls and data inputs and outputs may be transmitted to and from the supercomputer by any one of a number of optical fiber mechanisms, or electrical or radio-frequency or other approaches Wafer Scale Super Computer and Optical Switch The invention can include the use of plasma gas discharge optical signal emitters, a fiber optical chip on wafer fiber interface and the use of three fibers for DWDM switch hierarchy. The invention can include cooling the wafer or other microprocessor substrate with a cooled liquid bath on the back of the wafer, preferably inverted. The invention can include a separable refrigerator and radiator. An operating temperature of approximately 5° C. is easy and convenient to maintain. An operating temperature of approximately −50° C. is better because of lower noise and higher speed. An operating temperature of approximately −100° C. is even better but not all CMOS circuits work at this temperature without modification. Condensation should be protected against. The wafer, lens array, mirror and heat sink may be enclosed, optionally under vacuum; a simple glass cover bellows pressure equalized chamber is easy to use as the enclosure and cost effective.

Powering the wafer or array of microprocessors can be done by dual conductor bus bars with a ceramic high capacity bypass capacitor material. These capacitive power supply strips are readily commercially available, and easy to manufacture. For instance, the amount of power can be estimated at between 1 and 2 watts per node for 256 nodes on an 8 inch wafer or 1024 nodes on a 12 inch wafer, for voltages between 1 and 3 volts. With 16 power strips for 256 nodes, only 16-32 watts are carried by any one power bus. These power buses can also act as light baffles and front glass/lens spacer supports. The perpendicular direction can have just light baffle sections, which can be made of glass or ceramic. The temperature coefficient of expansion for the power strips and/or baffles should be matched as well as possible to the wafers. The invention can include power busses having flexible tabs per wafer, glued or soldered to the nodes to allow for mismatched thermal expansions.

Prototypical optics to implement the invention have been ray trace simulated and are characterized by high efficiency in the 50-90% range. Each node can have a spreading lens or lenses over its emitter(s) and then a focusing micro lens array over the sensor array. These lenses may be molded glass or holographic or any other structure that provides the light spreading and then collecting and focusing functions. The invention can include, a few inches above the lens array, a simple flat mirror that is located and optically coupled to the emitters, the lenses and the receivers (detectors). For a single wafer design, this simple flat mirror can be a fully reflective front surface glass mirror.

The invention can include multiple wafers or substrates of microprocessors linked by using a partially reflective mirror instead of a fully reflective mirror and placing another wafer lens assembly equidistant from the other side of the mirror. More wafers or substrates can be added, for example up to a total of approximately 4 with simple optics. In situations employing multiple wafers or substrates that are simply linked together optically, an emission from any one processor node will be received the corresponding processor node on all of the wafers or substrates. In this case, the received power per sensor channel is divided by the number of wafers or substrates plus optical losses. If corresponding processor nodes send at the same time, the message may be garbled. Therefore, embodiment of the invention that have the potential for contention garbling, the software should be capable of collision handling as is done in most communications systems today.

Silicon is not a fast optical sensor material for the normal colors of lights used in optical communications. At infrared (IR) and visible red frequencies, the light penetrates too deeply into the chips and generates carriers that take many 100's of nanosecond to diffuse to the sensing electrodes. An alternate way to get high speed out of silicon is to use blue or UV light. This light penetrates less then 1 um into the sensor. N carriers propagate at 200 ps/10 um, thus allowing the possibility of very high speed sensing in standard CMOS with blue and UV light. UV and blue LEDs are cost effective. Alternative embodiments of the invention can use lasers, LEDs or other emitters in CW (continuous wave) mode, and modulate them, but this is not preferred.

An alternative embodiment of the invention can use multiple emitters per node, but with a single receiver per node. The multiple emitters can be of the same wavelength or of different wavelengths. The multiple emitters can be clustered together or spaced apart. In the case of multiple emitters of the same wavelength, broadcasts may require more power and a given node may send different signals via different node at the same time causing collisions. Although more power may be required, the light from all the emitters can be aggregated and thus much more light can be received. Collisions can be avoided by logic processing within the node.

Another alternative embodiment of the invention can use multiple emitters and multiple receivers per processing node (module). This has the above advantage of allowing the optics to direct all of the energy from an emitter to a single receiver. It may be problematic to locate a large number (e.g., 256) of emitters on each processor node.

A much less powerful alternative embodiment of the invention can use just one emitter and one receiver per node. A simple fallback implementation design of this embodiment can use off-the-shelf laser chips in the red region or shorter wavelengths. Shorter wavelengths may be desirable because red receivers are harder to make fast, while retaining sensitivity. The invention can also include the use of one or more frequency conversion crystal(s).

The interface to the outside world can be readily commercially available color fiber optics which can be picked and placed directly onto the wafer using lower cost 850 nm lasers with one fiber per laser. In this case, a commercial multiplexer can be used to combine the data into a single DWDM fiber or any other standard communications backbone. The invention can include the use of multiple frequency lasers. The standard 850 nm recover devices can be mounted to the wafer. A cooled wafer is a very attractive option for low noise, long life and short fast interconnect.

To provide the electro-optical interface, the invention can include the use of embodiments disclosed in U.S. Ser. No. 10/175,621, filed Jun. 20, 2002 and/or PCT/US03/19175, filed Jun. 18, 2003 for the transceivers wherever external standards do not forbid. Embodiments of the pulse position and/or pulse width modulators and/or demodulators described in U.S. Ser. No. 10/175,621, filed Jun. 20, 2002 and PCT/US03/19175, filed Jun. 18, 2003 are readily commercially available from Xyron Corporation and/or LightFleet Corporation, both of these companies having offices in Vancouver, Wash., USA, and one or both of these companies are identified as the source of these embodiments by the trademark XADACOM™, but the invention is not limited to pulse position and/or pulse width modulation and/or demodulation, much less these XADACOM™ embodiments.

The invention can be combined with standard fiber channels which currently cost about $100-$200 per channel. For state of the art DWDM, 160 channels are preferable.

The invention can include a parallel 2D interconnect wafer scale super computer without any inter-node free space interconnect optics, but with fiber optic interfaces. Nevertheless, preferred embodiments of the invention include the inter-node optical interconnect, thereby allowing massively more interconnect bandwidth. Even without the inter-node free space optical interconnect, the invention can easily include the capability of approximately 10 Gbaud per node throughput to nearest neighbors, for example, to four nearest edge neighbors only. Processing nodes (modules) that are not edge adjacent can send messages through multiple processing nodes (modules) in a sequential manner, albeit with a likely reduced throughput. With the free space optical interconnect, any node can receive from any other node without any blocking and the throughput can be easily effected at 10 Gbaud per node.

The communication to the external fiber network, can use readily commercially available diode lasers in chip form. VCSELS can be used for the vertical signal source optics, and edge emitters can be used for the wafer edge optics. These edge emitters are very inexpensive at about 5-10$ for each 850 nm, 3 mW output laser (1300 nm laser are about 20$, 1550 nm: about 60$). The wavelength of 850 nm seems to be the most popular LAN choice for gigabit Ethernet and fiber channel. The readily commercially available opto receivers at 850 nm, 1300 nm and 1500 nm wavelengths can be used in a 1-5 GHz range may be possible, but die mounted receivers may be preferable. The invention can include the use of plasma gas discharge emitters for these standard telecom wavelengths, further reducing the cost.

The context of the invention can include fiber optic multiplexing equipment connecting the wafer or supercomputer system to a network. Gigabit Ethernet and fiber channel standards are readily commercially available for the 850 nm 1300 and 1500 nm wavelengths.

The invention can include an optical computer that includes 1 wafer, several wafers, or just a few nodes cut from a wafer. Systolic arrays of many, and perhaps unlimited, wafers may be created with a different relaying lens array, that send to the next wafer, but receives from the previous wafer. The last of the array can be looped back to the first array for continuous processing, optionally in a circular, torus or spherical configuration.

For a large switch application, 3 sets of external optical or electrical I/O would work well. Two of these three sets could combine 2 of the outputs from a lower wider level of the hierarchy and 1 set would send the merged stream to the next higher level.

Figure 7A:
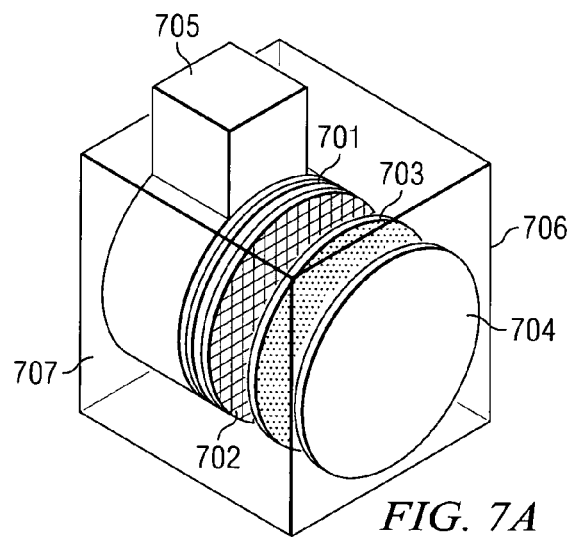
FIG. 7A illustrates a schematic perspective views of an enclosed optical interconnect assembly including a heat exchanger, a power grid, a circuit wafer, a lens array and a mirror, representing an embodiment of the invention.
Figure 7B:
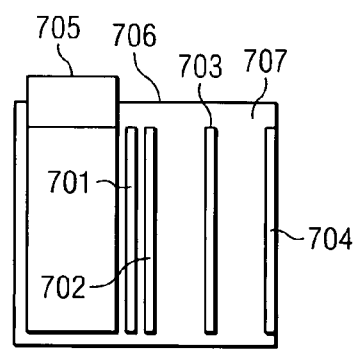
FIGS. 7B-7C illustrate schematic side (FIG. 7B) and normal (FIG. 7C) views of the enclosed optical interconnect assembly shown in FIG. 7A, representing an embodiment of the invention.
Figure 7C:
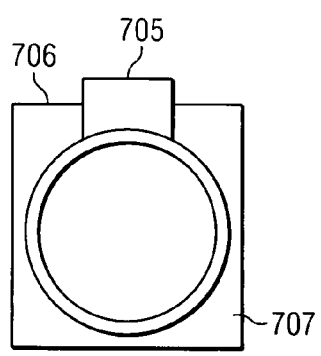

Referring to FIGS. 7A-7C, a circuit wafer 701 is coupled to a cooling structure 705, such as a plate and/or backside bath. The circuit wafer 701 includes gas plasma discharge optical signal emitters. The circuit wafer 701 is coupled to a power grid 702. The power grid can include light baffles. The power grid 702 is coupled to a lens array 703. The lens array is coupled to a mirror 704. The circuit waver 701, power grid 702, lens array 703, mirror 704 are located within a gas tight enclosure 706 that contains a suitable gas 707 such as N, H, He, etcetera. Part of the cooling structure 705 extends through the enclosure 706 to provide a heat sink that can be coupled to a heat exchanger (not shown in FIGS. 7A-7C).

Figure 8:
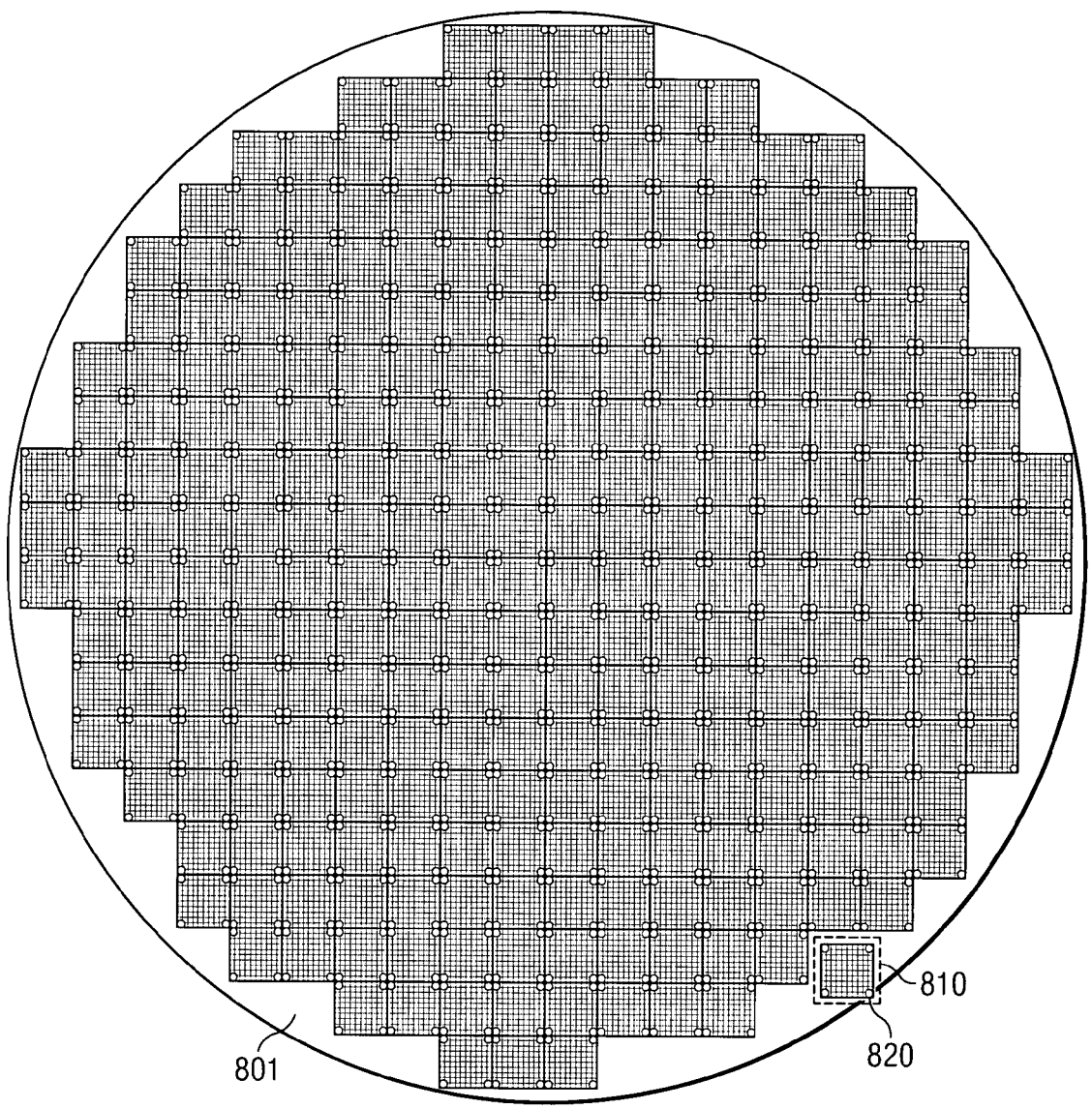
FIG. 8 illustrate a schematic normal view of a circuit wafer including a plurality of computer nodes each of which includes four optical signal sources (emitters), representing an embodiment of the invention.

Referring to FIG. 8, a circuit wafer 801 includes a plurality of individual computer nodes 810. In this embodiment each of the individual computer nodes 810 includes four optical signal emitters 820 located at the corners of each of the individual computer nodes 810.

Figure 9A:
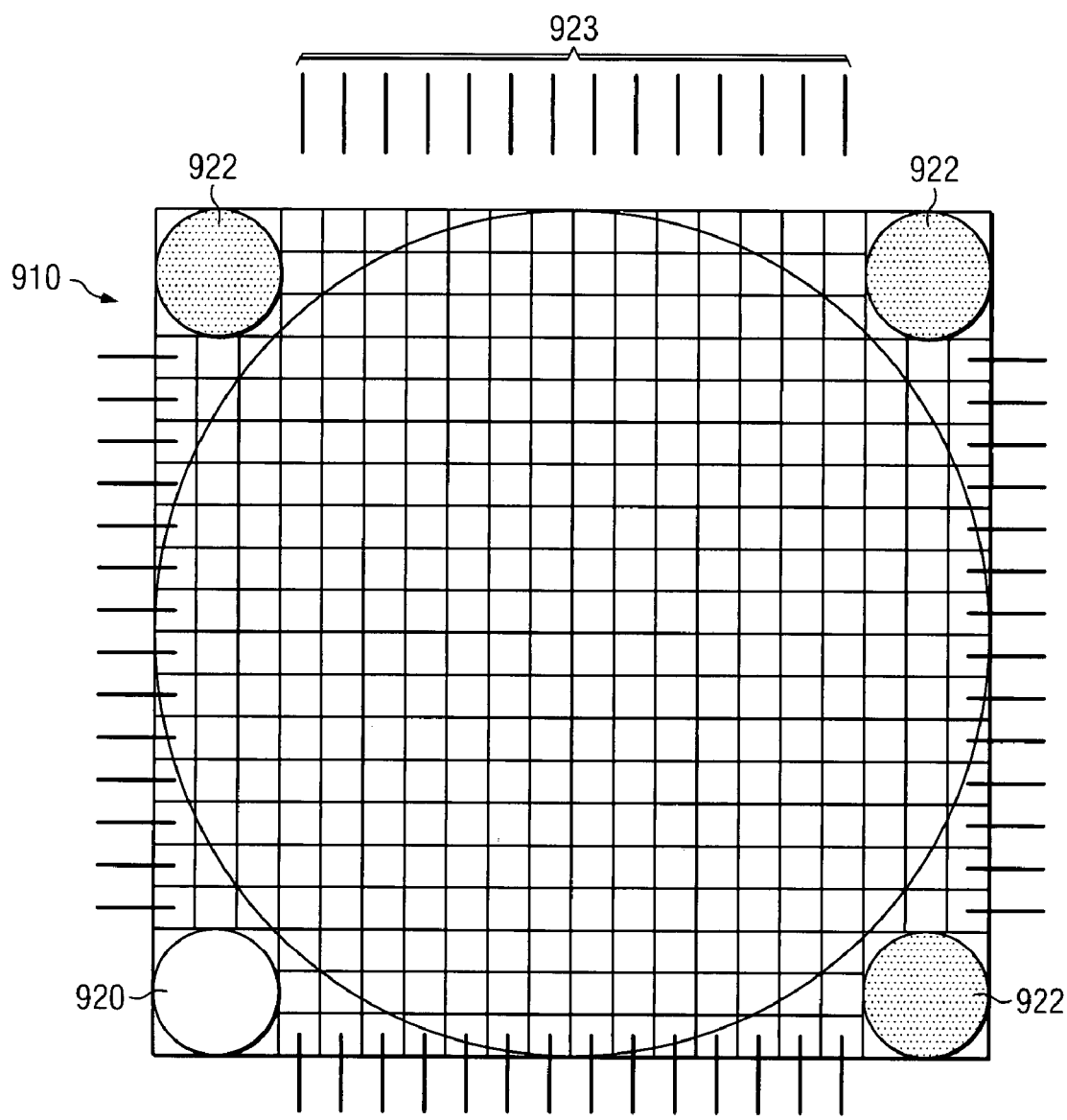
FIGS. 9A and 9B illustrate schematic normal (FIG. 9A) and side (FIG. 9B) views of an individual computer node including four optical signal sources, representing an embodiment of the invention.
Figure 9B:
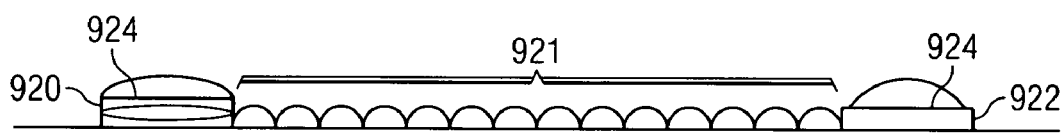

Referring to FIGS. 9A and 9B, the invention can include an integrated circuit embodied in a computer node 910, where the integrated circuit includes one or more optical signal emitters. In this embodiment, the computer node 910 includes i) a wafer carrying a plurality of microprocessors and ii) four optical signal emitters. The invention does not require the presence of the microprocessors and can include the use of any number of optical signal emitters. The optical signal emitters can be plasma gas discharge emitters 920 or laser and/or photo diodes 922. For instance, modulated VCSELs (vertical-cavity, surface-emitting lasers) can provide an alternative to the plasma gas discharge optical signal emitters.

Referring to the top of FIG. 9A, an adjacent computer node 923 is schematically depicted. Communication between nodes/wafers can be provided by readily commercially available fiber-optics modules which may be integrated onto each node/wafer. The nodes can be spaced from approximately 25 um to approximately 5000 um (preferably from approximately 250 um to approximately 500 um) apart from one another.

Referring to FIG. 9B, a side view of the computer node 910 is depicted. The computer node can include an on chip lens array 921 (not depicted in FIG. 9A). An optical signal detector can be located beneath each of the members of the chip lens array 921. Each of the optical signal emitters can include an emitter lens and/or light pipe 924. The emitter lens and/or light pipes 924 of two or more emitters, together with those integrated circuit emitters, can be combined to define an optical backplane, with or without the balance of the computer node 910 components.

Figure 10:
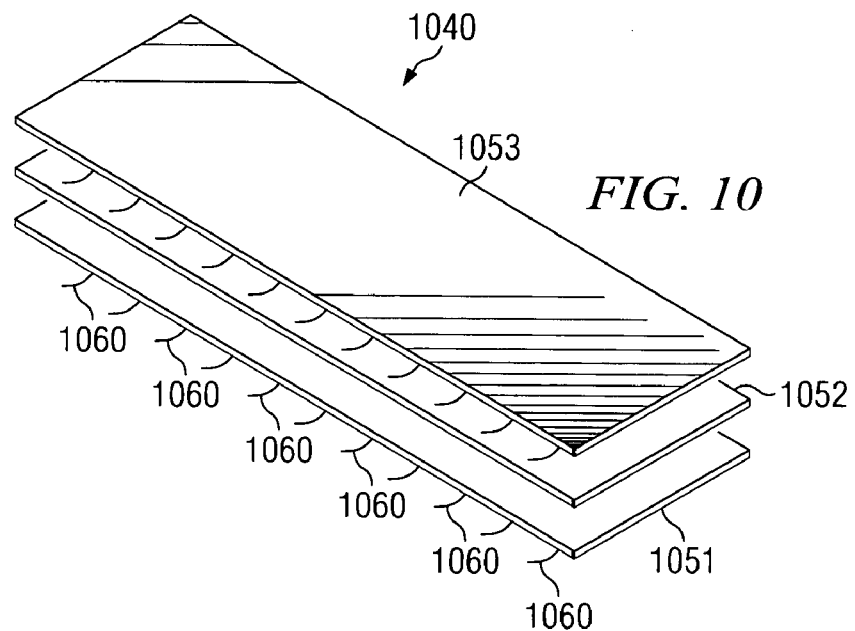
FIG. 10 illustrates a schematic perspective view of a power supply bus bar assembly, representing an embodiment of the invention.

Referring to FIG. 10, a power supply strip 1050 includes a high dielectric insulator 1052 coupled between a first power supply conductor 1051 and a second power supply conductor 1053. Although two conductors and a single insulator are shown in FIG. 10, the strip can include 3, 4 or more conductors. Both the first power supply conductor 1051 and the second power supply conductor 1053 include a plurality of flexible power tabs 1060 that can be electrically coupled o a wafer (nodes).

Figure 11:
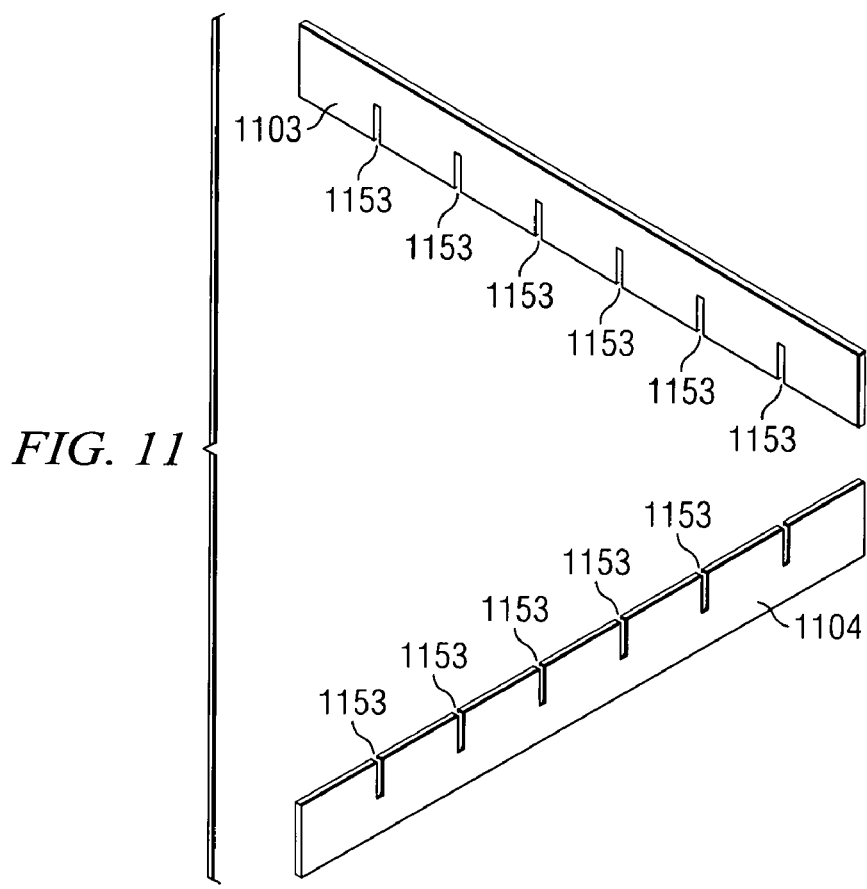
FIG. 11 illustrates a schematic perspective view of two substantially orthogonal components of a light baffle assembly, representing an embodiment of the invention.

Referring to FIG. 11, a first light baffle slat 1103 includes a plurality of notches 1153 for assembling into a grid pattern. A second light baffle slat 1104 also includes a plurality of notches and is shown inverted and perpendicular to the first slat prior to assembly. It can be appreciated that the slats can be fabricated from power supply strips if both exposed sides of each strip are covered (e.g., coated) with an insulator layer.

Figure 12:
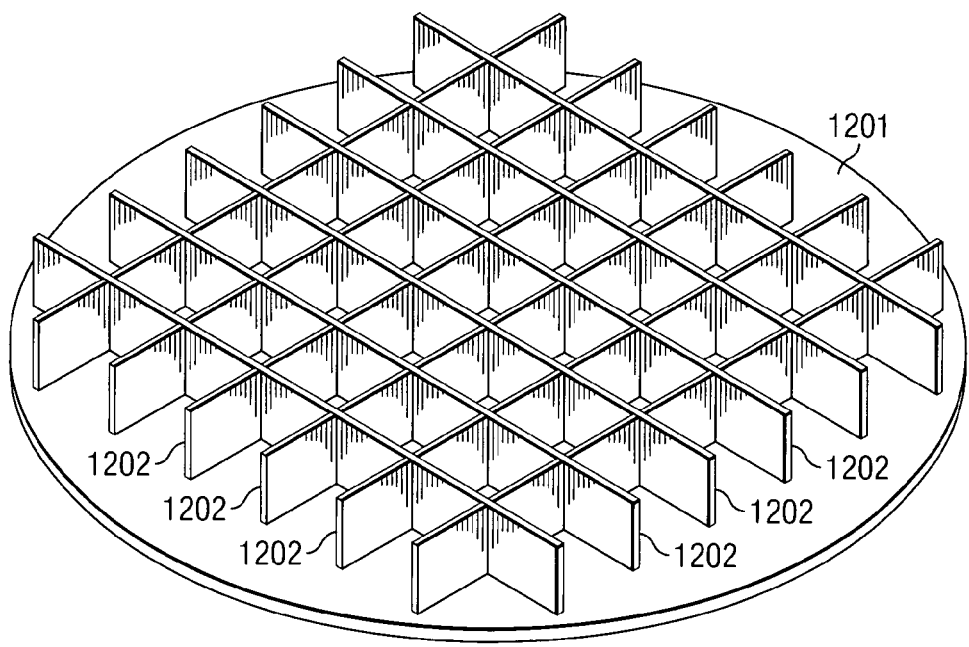
FIG. 12 illustrates a schematic perspective view of a light baffle assembly coupled to a plurality of individual computer nodes arranged in a wafer configuration, representing an embodiment of the invention.

Referring to FIG. 12, a plurality of power supply strips are shown being assembled into a combined power supply bus and light baffle 1202 that is coupled to a circuit wafer 1201. This combined structure, as well as individual structures in alternative embodiments, can be connected to the wafer directly, or to the wafer closely through tabs and/or spacers, or to the wafer in a spaced apart from relationship through leads and/or stand-offs.

Figure 13:
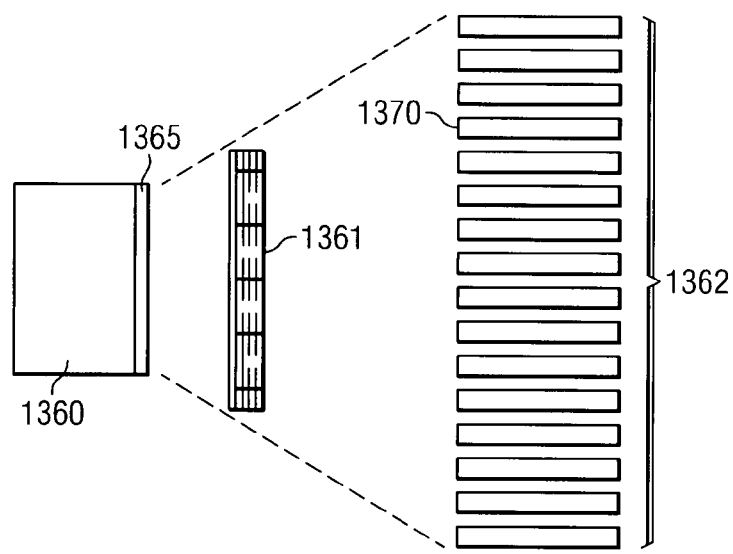
FIG. 13 illustrates a schematic side view of a system including an optical computer assembly with a partially transmissive mirror coupled to an interface array via an optical link, representing an embodiment of the invention.

Referring to FIG. 13, the context of the invention can include free space optical coupling to other components, such as a 2D blade array 1362 with edge mounted optical transceivers 1370. A computer or network device 1360 includes a fan-out free spaced optical interconnect backplane having a partially silvered mirror 1365. The device 1360 is optically coupled to a wafer to blade array lens or lens array 1361 through the partially silver mirror 1365. The wafer to blade array lens or lens array 1361 is optically coupled to the edge mounted optical transceivers 1370.

Figure 14:
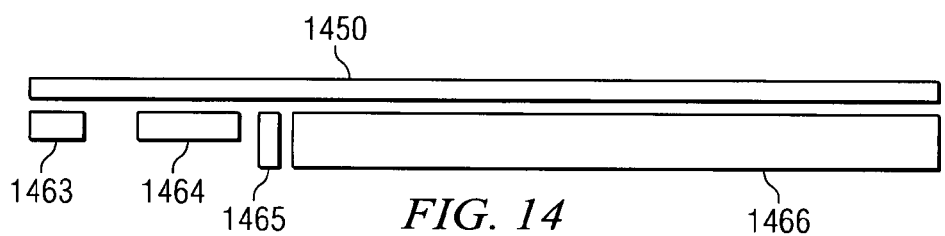
FIG. 14 illustrates a schematic side view of an interface array subassembly, representing an embodiment of the invention.

Referring to FIG. 14, an individual blade 1450 includes an optical transceiver 1463. The optical transceiver 1463 is coupled to a blade processor 1464, a dynamic random access memory circuit 1465 and a hard drive 1466.

Figure 15A:
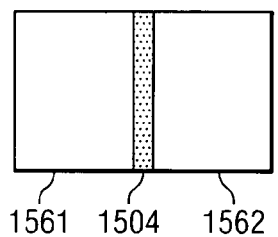
FIGS. 15A-15C illustrate schematic side views of three optical computer meta-assemblies, representing embodiments of the invention.
Figure 15B:
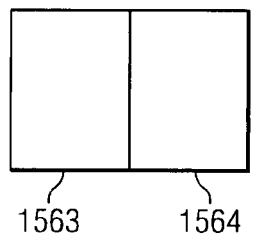
Figure 15C:
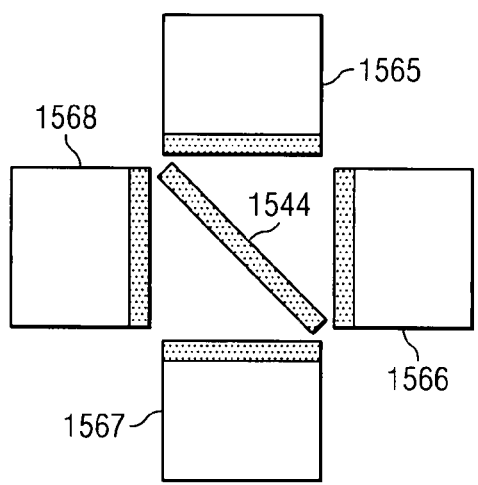

Referring to FIGS. 15A-15C, several different configurations of combinations having multiple fan-out free space optical interconnect backplanes are depicted. The invention can include a two, or three, dimensional combination of multiple fan-out free space optical interconnect backplanes. Referring to FIG. 15A, a first optical super computer 1561 is coupled to a second optical supercomputer 1562 via a partially silvered mirror 1504. Referring to FIG. 15B, a first optical super computer 1563 is coupled to a second optical supercomputer 1564 without a mirror. Referring to FIG. 15C, four optical super computers 1565, 1565, 1566, 1567, each having a partially silver mirror, are coupled together via partially silvered distribution mirror 1544.

Figure 16:
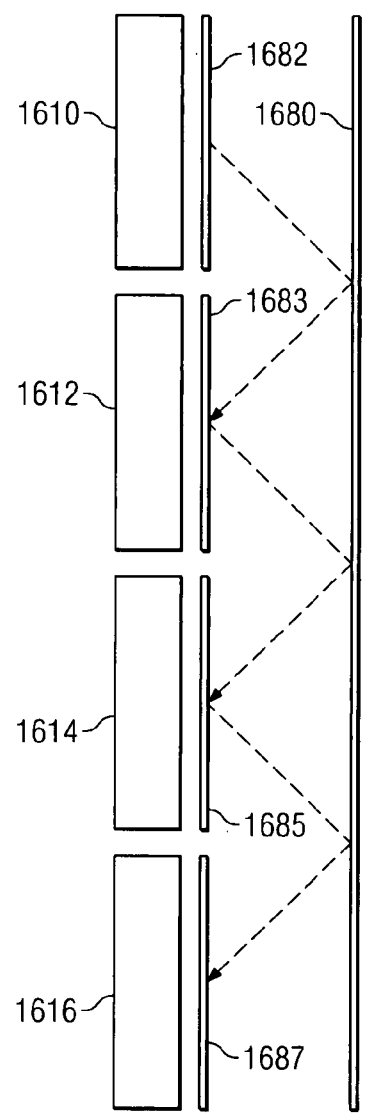
FIG. 16 illustrates a schematic side view of a systolic optical computer meta-assembly including four optical computers, representing an embodiment of the invention.

Referring to FIG. 16, a first optical super computer 1610 is optically coupled to a first alternative lens array 1682 for systolic operation. The first alternative lens array 1682 is optically coupled to a multi wafer mirror 1680. The multi wafer mirror 1680 is optically coupled to a second alternative lens array 1683 that is coupled to a second optical super computer 1612. The multi wafer mirror 1680 is also optically coupled to a third alternative lens array 1685 that is coupled to a third optical super computer 1614. The multi wafer mirror 1680 is also optically coupled to a fourth alternative lens array 1687 that is coupled to a fourth optical super computer 1616. Thus, a systolic mirror can be defined as an add-drop relay mirror.

Cost Effective and Mobile Super Computing

The invention can simultaneously increase the upper limits of computing power of the largest machines by a factor of 1000 and dramatically reduce the size and cost of existing supercomputing installations by an order of magnitude. The invention is compatible with existing supercomputer software and provides orders-of-magnitude greater connectivity than present-day supercomputers, obviating the need for hardware reconfigurability.

The invention can open new markets for a wide range of applications that are now simply not possible for reasons of size, cost, or power consumption. Once these inventions are fully developed, it will be possible to build a teraflop computer in the form factor of today's desktop computer. The world's first petaflop computer, fitting into a single office room, could soon follow. The idea scales simply to the exaflop range allowing a truly massive, parallel machine, only dreamed about today. Comparing these numbers to the world's currently most powerful computer, the NEC "Earth Simulator" at 36 teraflops (a mere 0.036 petaflops), should engender an appreciation of the power of the invention.

A further implication of these improvements in size, cost, and power, is to enable the portability of teraflop computing to on-site, mobile, airborne, or space applications where supercomputing today is simply not an option. Tremendous amounts of time and expense are consumed in remotely recording large amounts of data and transporting those data to a fixed supercomputer center where they are processed, analyzed, and acted upon. The time elapsed from collection to action is typically measured in days to weeks. A portable supercomputer would allow simultaneous data collection and analysis resulting in real-time decisions on search vectors. This capability would greatly improve the productivity of the equipment, compress the time to complete a given task, and make possible the completion of tasks which today are simply not contemplated.

The invention can allow a new generation of supercomputers to exceed, by several orders of magnitude, the performance-to-cost ratio of existing and planned systems. The invention can include zero-overhead task switching with hardware scheduling and synchronization of tasks coupled with a high-performance data-flow architecture allows complex yet inexpensive computing nodes to be built. Optical integration of arrays of such nodes enables the possibility of a teraflop computer system in a desktop-sized package. The invention enables scaling a wafer-sized supercomputer to assemble components that range in capability from teraflop to petaflop to exaflop machines.

As noted above, reliability in existing supercomputing machines becomes a major concern when there are hundreds-of-thousands to millions of material interconnections (wires, connectors, solder joints, contact bonding). If these mechanical, off-chip connections can be replaced with integrated circuitry and light beams, both the rate of the data flow should be greatly enhanced and the reliability of the entire system greatly increased.

The invention can include wafer-scale integration, a topic that has been extensively studied for over 30 years. A wafer-scale computer system can include an array of processor modules or computing nodes that are interconnected. In practice, each processor node is an independent die or "chip" that could be individually packaged and would thereby serve as a fully functional microprocessor with its standard power, ground, data buses, memory ports and so on. Much of the expense in a modern processing system lies in the packaging of individual dies and the support necessary to provide power to and communicate with each processor in the system. If the individual processor nodes could be connected efficiently and the entire array of processors retained as a single functioning module, it would then be possible to power each processor node and to communicate with the entire array. In this model, an entire wafer becomes a computing element with a much lower cost and higher throughput than would be achieved by separately packaging, remounting, powering, and communicating with discrete and individually packaged chips.

As also noted above, the problems with previous optical interconnection schemes have been precision placement of light emitters and alignment of the optical elements. The solution proposed here avoids these problems by using the inherent registration precision of wafer manufacturing, employing a broadcast model with at least a single emitter on each node, and by using an optic array for spreading a focusing light from the emitters.

Computational Hardware

The Gigaflop Node

Each individual node can include a single processor die containing multiple processing units, communications hardware, and a local networking or communications bus. Specialized nodes can be devoted to memory (RAM) supported by communication hardware and memory-control hardware. By interspersing memory nodes and processor nodes on a wafer or on alternate wafers, any desired ratio of compute-performance to memory-capacity can be achieved.

To make efficient use of processor cycles in a single node where multiple clients should be serviced in a timely fashion, the zero-overhead-task switching described in U.S. Pat. No. 5,987,601 can be used in combination with a hardware-based, real-time-operating-system (RTOS) kernel. In this way, the invention can include a highly efficient, transparent managing of hundreds of interacting tasks using dynamic-priority scheduling. Thus, each receiver on each node could be viewed as an elementary task for that node so parallel messages over the entire node can be effectively managed. Embodiments of the zero-overhead-task switching described in U.S. Pat. No. 5,987,601 are readily commercially available from Xyron Corporation and/or LightFleet Corporation, both of these companies having offices in Vancouver, Wash., USA, and one or both of these companies are identified as the source of these embodiments by the trademark ZOTS™, but the invention is not limited to zero-overhead task switching, much less these ZOTS™ embodiments.

A computation can be broken into multiple tasks much as the multithreading processors treat programmed threads quasi-independently. Multithreading can hide some latency but requires state of the art compiler or very clever programmers to achieve even modest performance improvement. The zero-overhead-task switching multitasking is a super set of the multithreading concept. It allows the latency hiding of multithreading, then adds dynamic priorities, and hardware semaphore for synchronization; this is accomplished without thread-switching overhead. Zero-overhead-task switching hardware multitasking decouples the storage and switching elements of the task management, thus allowing very large numbers of tasks, easily exceeding 256, to be stored compactly in on-chip RAM, without seriously impacting the single task clock speed and performance. This is critical in a large, multiprocessor system where hundreds of cycles may be required to access a remote piece of data.

The zero-overhead-tack switching processing engine makes effective use of data flow. However, in the case of the invention, data flow can be on a conceptually higher level than routing bits and microcode within a central-processing unit (CPU). The invention can include a fully asynchronous data-flow path connecting each of the functional modules comprising the node. This data-flow interconnect (DFI) becomes much more powerful and practical that the usual bus architectures in making use of message packets. These packets are controlled on a local level, obviating the need for bus arbitration. The DFI bus is transparent to the system programmer who only need worry about data destinations and not how or when data arrives.

For a wafer including n nodes, each node can have at least one optical transmitter to broadcast information to the entire wafer and each node can have n photo-diode receivers to accept information from all nodes in the wafer. Since each receiver has its own associated communications module that talks to the DFI bus, only packets destined for the node in question are placed on the node's DFI bus. The receiver's communication module decodes the packet header, places the packet on the DFI bus with the appropriate destination code, and waits for the next packet. Data acknowledgment is routed on the DFI bus to the node's transmitter station as required. This local processing allows asynchronous communication to take place without global control, greatly simplifying the communications protocol and speeding up data flow throughout the system.

For purposes of comparison with planned supercomputers, assume that the core CPU is an 8 gigaflop (GF) equivalent Power PC™, MIPS™, or ARM™, machine that has been augmented for multitasking by with zero-overhead task switching. As above, assume that there are multiple, special-purpose processors within each node such as the communications receivers and the transmitter station that communicate with the main and auxiliary processors (FPUs, matrix processors, etc.) by accessing the DFI bus.

In summary, the main features of the node processor can be (1) the zero-overhead task switching multitasking technology allied with a state-of-the-art processor, (2) the DFI bus for intra-node communications, (3) the DFI-enabled multiprocessing capability, (4) the multiple communication modules with their photo-diode receivers, and (3) the single, optical-transmitter module.

The 1000 Gigaflop Wafer

For the wafer to be an effective and functional element in a computer system, or even a supercomputer in its own right, wafer-scale integration of the individual processor nodes should be achieved. Past efforts have centered around wafer-scale bus architectures for linking all processors together. The disadvantages of this approach are slow communication speed between processors due to the long bus structures and the attendant high capacitance. Other approaches have attempted to communicate between nodes using various optical methods. A recent favorite is to have n laser emitters and n laser receivers on each node where n is the number of nodes on the wafer. This point-to-point communication allows each node to talk individually and directly to any other node.

By switching to a broadcast model where each node has a single emitter but n receivers, the chip area required for communications is approximately halved. More importantly, the communications traffic handled by each node in the case of a fully connected wafer can easily overload the computational capacity of the node itself for both transmission and reception. In the invention with the broadcast model, where each node has but a single emitter, the transmission load is approximately n times less while the receiving communications load can be maximal (the wafer can run with all nodes transmitting simultaneously).

In addition to the optical-based broadcast mode of communications, each node on the wafer communicates with its nearest neighbors in the usual fashion. That is, each node has four data buses (north, south, east, and west) so that the entire wafer is connected in a Manhattan grid. This "grid bus" not only provides an alternative path for messages but may be used for diagnostics as well as systolic-array applications.

Clearly, a communications protocol should be established to decide whether a particular transmitted message is for a particular node since any given emitter talks to all nodes. If the nodes are indexed or numbered for identification purposes, a map may be constructed for each node in the array. This map specifies which receiver on a given node is optically linked to which particular emitter. Each receiver is then monitored by a circuit or task running on the node in question, this task identifying messages for receiving node and ignoring all others.

Messages across the wafer are delayed only due to the finite speed of light and the length of the modulation sequences.

Present-day machines requires message passing or a means of relaying from node to node for messages to across an array of processors.

The wafer broadcast model also makes use of the data-flow model in that the material DFI bus is now replaced with light. Data is accepted by a receiver on a target node if that data packet is addressed to that node. This allows controlled point-to-point communications to be achieved within the broadcast model as well as broadcasting system-wide information from a single transmitter. Hierarchical control of an inter-wafer communications is then a matter of software rather than specialized hardware.

More than 256 dies of dimension 10 by 10 mm can fit on a 200 mm diameter wafer and over 600 such dies can fit on a 300 mm wafer (the area of the 300 mm wafer is 2.25 times larger than a 200 mm wafer). Larger dies mean fewer nodes, of course, but more area for additional processors and support circuitry per node. This trade-off between the number and size of the nodes is a key variable in the design equation for tailoring supercomputer installations for specific uses.

In summary, the features of the wafer module can be (1) its full, optical, global interconnect based on a designed optical interconnect; (2) local interconnect on an x-y (Manhattan) grid; and (3) one or more modulated light emitters on each node.

The Teraflop Briefcase

A single 300 mm (12 inch) wafer with optics can fit into a space of 12 inch by 12 inch by 4 inch plus room for access hardware (wires, connectors, etc.), housing and mechanical support, and auxiliary hardware. With 2 to 8 GF nodes, the performance figure would be between 1 and 4 teraflops (one teraflop is one thousand gigaflops) and depends on the silicon technology use. Such a package would fit nicely inside a briefcase and consume a few kilowatts of power, making a fully portable device (battery powered with a heavy-duty auxiliary battery pack).

Two wafers facing each other through a half-silvered mirror comprise a fully connected system of 1024 processors. The nodes on wafer A can talk to each other by reflection from the mirror or talk to wafer B by transmission through the half-silvered mirror; a similar situation obtains for wafer B with respect to wafer A. At 8 GF per node, the performance figure for this configuration is approximately 8 teraflops. Power consumption would be between 1 and 100 KW depending on design particulars (choice of silicon technology and clock speed). For the low-power version, the cooling fluid could be a gas such as helium or even air. In the high-power configuration, the can be bonded to a force-cooled heat-sink, for instance a copper plate. The size of the package would be about that of a thick briefcase—about 12 inches by 15 inches by about 8 inches thick. At a kilowatt, battery operation would require an auxiliary package; the faster versions (up to 8 teraflops with present-day technology) would not support portable operation, but require external power and additional cooling in the form of a high heat-capacity fluid and a heat-exchange system.

A similar system based on multi-chip modules (MCMs) or printed-circuit boards (PCBs) having 10 optical communications nodes arranged as a 2 by 5 array of optical communication nodes, with each communication node supporting four processing nodes (modules) each, and each processing node (module) having quad 8 GF processors can be built today. Such a device would also fit into a standard briefcase and consume about 1 kilowatt of power and have a peak performance of over 1 teraflop.

In summary, a briefcase version of a teraflop supercomputer is not only conceivable but achievable with today's component technology. True portability depends on battery and cooling technologies and desired auxiliaries such as storage, input, and output devices.

The 200 Teraflop File Cabinet

A convenient cabinet containing 300 mm wafers, optics, and cooling can be about 0.5 m on a side by 1 m in length. Spaced at 20 cm apart, there can be 50 such wafers in a cabinet, giving a total of approximately 25,600 processor nodes in a cabinet. This is about twice the number of processors in the AP 100-TF machine, yet, due to the optical-interconnect feature, the invention can take up far less space and power. Wafer-to-wafer communication can also be by wire connections or SONET-like optical interconnects for those wafers not facing each other.

Wafers, interconnects between wafers, cooling plates, and mounting hardware all contribute to the weight of the teraflop cabinet. The estimated total weight is about 150 kg for a fully functional cabinet, excluding power supply and cooling.

In summary, the main features of the cabinet system can be its (1) mounting and cooling systems, (2) on- and off-cabinet fiber-optic communications, and (3) modularity of function and design.

The Petaflop Room

A small room containing 5 to a few dozen of the cabinets will provide a computing power in the petaflop (PF) range. (A petaflop is one thousand teraflops or one million gigaflops.) Five cabinets, taking up a few square meters of floor space, yield a 1 PF computer while two dozen such cabinets in a single layer would require about 120 sq. ft. of floor space, 5 megawatts of power, and result in a performance figure of about 5 petaflops. In contrast, previously planned versions of a petaflop machine are considerably larger and more power-hungry than the machine envisioned here.

Interconnection between the cabinets can be by standard fiber-optic communications technology with transmitters and receivers integrated on the wafers themselves. Multiple fibers between cabinets, with several fibers between each wafer, can fully connect one stack of wafers to another using the same zero-overhead-task switching and DFI technologies as described above.

The Exaflop Suite

One quarter of a million wafers, 512 nodes per wafer, 8 GF per node gives a 1 exaflop (EF) total performance figure. (An exaflop is one thousand petaflops, or one million teraflops, or one billion gigaflops.) A convenient cabinet, as discussed above, contains 50 wafers, meaning approximately 5000 such cabinets in all, for a total volume of 1250 m$^3$. Stacked three layers high to form 1.5 m high units, the floor space covered by these 5000 cabinets will be approximately 833 m$^2$ (excluding access corridors), or about the floor space of an office suite (less than 9000 sq. ft.). The interconnections can be optical (light beams) and contained in the spaces between the wafers along with the power grids and cooling fluid as described above. Although such a machine occupies an area equal to the ASCI Purple, it weighs 3 to 4 times more. However, the specific area and weight (per teraflop) is several thousand times less than ASCI Purple in area and several hundred times less in weight. This extreme contrast underscores that this new family of supercomputers can easily span the range from the portable to the massive using the same modular technology and zero-overhead-task switching based DFI interconnect.

The specific power consumption is about 30 kW/TF for AP and is about 2 kW/TF for the invention, depending on the processor used. This is approximately 15 times lower than AP and still considerably better than BGL. However, the specific power density (watts per cubic meter per teraflop) of the invention is even more favorable, being less than one hundredth of that of the AP. The processing density of the invention, primarily due to the wafer-scale integration, is between 2 and 3 orders of magnitude higher than AP. The total cost is expected to be about the same to 10 times more for a full scale embodiment of the invention than for the AP, while the specific cost (in dollars per teraflop or price-to-performance) is two to three orders of magnitude more favorable for the invention than for the AP. This extreme contrast in specific power and price performance underscores the essential affordability of the invention.

In summary, the main points of the inventive family of supercomputers are (1) wide scalability as evinced by the specific size, cost, capability, and power consumption, (2) modular construction; (3) inherently low cost, and (4) high reliability of optical interconnections.

Auxiliary Hardware

Optical Interconnect

A significant feature of the wafer-scale interconnect system is a lens array that both spreads the light from each individual emitter and collects this spread light, reflected from a plane mirror back onto the wafer, focusing light beams onto each of the individual photo-diode receivers. The emitters themselves should be modulated light sources in the form of gas plasma discharge devices, light-emitting diodes (LEDs) or solid-state lasers.

In the invention, light from each emitter illuminates the entire wafer after reflection from a mirror held parallel to the water surface. A compound-lens array focuses this light on to each node. Since the emitters are varying distances from a given target node, the focal points at the target node are at different locations, effectively imaging the array of nodes onto each node in the array. An additional microlens array can be placed just above each node so that the focused light from the main lens array is further concentrated on the individual receiver photo-diodes distributed across each node.

Mass Storage & RAM

In addition to local memory at each node, each wafer may be serviced by a conventional RAID array or blade computer including a single CPU (perhaps the same processor as used on the wafer), mass storage and random-access memory as needed. Some configurations may require a single RAID array or blade computer per cabinet, while others may need one or more servers per wafer. A supercomputer used primarily as a video or image server might require more mass storage than one configured primarily as a weather simulator, for example.

This marriage of the blade computer or RAID array with the wafer level free space fan out optical backplane interconnect concept dramatically increases the flexibility of configuring a supercomputer out of standard components yet tailored to specific applications. Interconnection options could be built in to the modules, allowing a given installation to easily reconfigure its hardware to solve a wider range of problems as the need arose. This is a variation on the scalability issue where one design tends to fit a very wide range of needs.

Communications

Connections to the outside world (console devices, other computers, the high-speed internet) can be by standard, off-the-shelf fiber optics modules and components. Indeed, each wafer or certain designated wafers can have integrally mounted optical modulators and demodulators for such fiber communications.

Power Considerations

For the briefcase model, there will be 256 nodes per wafer running about 5 Watts per node. Thus, a wafer will dissipate about 1.25 kW of power. Increasing this to 512 nodes per wafer and a power density approaching that of the Power PC or Pentium™, (upwards of 100 W per node) means a wafer will dissipate about 50 kW per wafer. With 50 wafers to a cabinet, 65 kW should be removed for the low-end system and over 2.5 MW from the high-end system on a per-cabinet basis. Therefore, the space required by the cooling system may be roughly the same as required by the wafer-containing cabinets.

This heat is distributed across each wafer and should be removed in such a fashion as to keep the entire wafer at a uniform and reasonably low temperature. Two different approaches are suggested: (1) circulate a cooling fluid throughout each cabinet such that each wafer is uniformly cooled and (2) mount each wafer or pair of wafers on a copper-alloy cooling plate, each plate having a cooling fluid circulated to, through and away from it. The cooling-plate solution has an additional advantage of forming a superstructure for precise mounting of the optical components.

Software

Operating System Software

This primary operating system for the invention can be Linux, configured to handle multiple modes as ccNUMA capable processors executing a single operating-system image. A single Linux 2.6 image can be run on each wafer, allowing 65,000 to 130,000 tasks under a single Linux image to be managed across a wafer. Optional operating system software supported can include packages capable of creating Beowulf clusters, a proven technology for building supercomputers from clusters of Linux workstations.

Communications Software

Low overhead communication between nodes can be implemented using the emitter-receiver optical technology outlined previously. This technology can underlie the ccNuma implementation, and may be exposed for use by programming libraries (e.g., MPI), or for direct usage by bespoke applications.

Compilers

The inventive system can provide standard compilers for languages such as C, C++, Java, etc. For scientific computing, languages like HPF, Fortran90, and Fortran77 can be supported, as can extended versions of C and C++. The invention can include compilers that can generate code to the particular strengths of the inventive architecture, including optimization to map intermediate representations of dataflow to the fine grained zero-overhead-task switching multitasking.

Programming Libraries

Various portable supercomputing libraries, such as OpenMP, MPI, and PVM, can provide portable programming APIs for supercomputer applications.

System Management

When very large machines are built, supercomputers or otherwise, there is a requirement for system management packages. For the invention, there can be packages for system backup, system volume management, hardware fault detection and isolation, resource allocation, and system partitioning.

Multitasking and Hypertasking

The invention can include zero-overhead task switching (e.g., ZOTS™) and the hardware methods for managing a multitasking system based on dynamically changing task priorities and round-robin scheduling disclosed in U.S. Ser. No. 10/227,050, filed Aug. 23, 2002. Embodiments of hardware methods for managing a multitasking system based on dynamically changing task priorities and round-robin scheduling described in U.S. Ser. No. 10/175,621, filed Jun. 20, 2002 are readily commercially available from Xyron Corporation and/or LightFleet Corporation, both of these companies having offices in Vancouver, Wash., USA, and one or both of these companies are identified as the source of these embodiments by the trademark hwRTOS™, but the invention is not limited to a hardware method for managing a multitasking system based on dynamically changing task priorities and round-robin scheduling, much less these hwRTOS™ embodiments. A hardware, real-time operating system may be thought of as an essential kernel of a real-time operating system (RTOS) embodied in hardware. The combination of zero-overhead-task switching and hardware methods for managing a multitasking system based on dynamically changing task priorities and round-robin scheduling, enables on-chip multitasking to be performed with optimal efficiency such that all CPU cycles are applied to the computational task and none wasted on management overhead functions. Potential costs of some embodiments of the invention are latencies associated with priority management and silicon area required for the circuitry. The former is typically a few gate delays while the latter scales as n in n tasks. These costs remain negligible for up to 512 tasks per node, meaning that the benefits of fine-grained multitasking are achievable for a wide range of applications for very little cost.

The same multitasking idea manages communications and messages between nodes on a wafer and between wafers. At the wafer scale, hardware methods for managing a multitasking system based on dynamically changing task priorities and round-robin scheduling, residing on each node means hundreds of thousands of individual tasks across the system are available for fine-grained decomposition of difficult problems; the term "hypertasking" distinguishes this pan-wafer task management and switching from on-chip multitasking. In a supercomputer configuration, many of these tasks, to be sure, will be dedicated to handling the myriad messages that must crisscross the wafer, but a substantial portion will be available to the programmer, allowing greater computational efficiency than presently achievable. For example, certain supervisory nodes on each wafer will be responsible for multitask decomposition of code fragments. These supervisors then distribute the multiple tasks across the wafer or the entire system as necessary. Interplay between various nodes concerning issues of priority, scheduling, and task completion communicated by the optical backplane to supervisory nodes form the logical basis behind hypertasking, which may be thought of as distributed but inter-coordinated multitasking.

Hypertasking allows the effective degree of parallelism to be significantly higher than previous computational models once the interplay between software and the hardware-enabled multitasking are understood and used to advantage.

Data Flow Interface

The data flow interface (DFI) architecture allows multiple processors, some of which can be small and dedicated, to reside on a single node while retaining effective and efficient data pathways between the functional parts. Imagine an asynchronous, high-speed bus connecting the CPU, multiple FPUs, math coprocessors such as multiply and accumulates or MACs, communications-stack processors, and other functional units. Enough local intelligence resides in the DFI to achieve dynamic routing of data packets, allowing control messages and data to directly reach destinations without traveling over circuitous paths. This flow is managed locally within the DFI, freeing the CPU for more useful work. Local control means that specialized hardware modules typically used for DMA and bus control, so essential in conventional architectures, are not required in DFI-based zero-overhead-task switching machines.

It is envisioned that each photodiode receiver station will reside on such a data path and be managed by a local task or stack processor. Since the communications system operates in broadcast mode, most messages received at a given station will probably be meant for another node. Local processing of data packets ensures that messages will not collide nor delay one another even though all nodes may be simultaneously broadcasting information. Messages not meant for the receiving node are simply ignored; as such they do not contribute to DFI traffic within that node.

Optical Backplane

What is not often realized, is that the synchronization and coordination between the set of receivers and set of emitters is also a very difficult problem when fine-grained multitasking should be avoided. It is important to appreciate that the two problems of point-to-point connectivity and message synchronization are solved by a broadcast model coupled with the zero-overhead-task switching and DFI techniques.

A fully connected wafer of processors has never been attempted. Such a task involves a nightmare topology of interconnect busses and bus-arbitration devices. Any implementation would involve multiple metal layers and require enough wafer area as to lower the processor density. The only practical approach to full and direct interconnect is optical. The invention can include a broadcast model where each node has one emitter that is optically connected to all other nodes on the wafer. A lenslet placed above each emitter forms a shaped light beam before the beam reaches the diverging element residing in the main compound-lens array. As explained above (Optical Interconnect), a compound lens array is placed between the wafer and a mirror. This array both spreads the light from each emitter so that it illuminates the entire wafer upon reflection and focuses light onto each node's receiver array. An additional n×n lenslet array can sit atop each node to adjust the focus of the main, compound-lens array onto each of the photodiode $n^2$ receivers on each node. These several lens arrays may be optical holograms, cast optical elements, or assembled from individual lenses.

The zero-overhead-task switching approach addresses the problem of message synchronization by replacing issues of strict communication coherency with fine-grained tasks that allow asynchronous messaged to flow from node to node. The broadcast concept allows messages to cross an entire wafer in a single step whereas the point-to-point optical interconnect requires nearly twice as much hardware to accomplish the same result and introduces message delays due to the relaying process.

Parallelism Issues

A good way to finesse Amdahl's law has not yet been found. Since the serial portion of a calculation dominates the time to perform the calculation as the number of processors increase (Amdahl's law), one should redefine the serial portion so that it may be more effectively executed. While respecting the serial nature of a given problem, it is possible, in many cases, to speed up any sequence of serial steps by means of multithreading. The zero-overhead-task switching architecture with its priority-based task scheduling forms the basis for a fine-grained superset of multithreading, yielding a substantial speed improvement over simple, high-level multithreading. The result is an effective way to circumvent Amdahl's law since an erstwhile serial portion of code, if written at a sufficiently abstract level (removed from hardware), can be decomposed into a large number of small tasks that have little or no dependencies. The result is an apparent parallelism of a serial section of code in that the processor executing this code runs at greatly enhanced efficiency due to removal of memory and data-access latencies achieved by hardware-controlled inter-task reshuffling.

In carrying this latter idea across processing nodes (modules), it is easy to see that the zero-overhead-task switching concept enables parallel algorithms to perform at their optimum. First, decomposing a given problem into a set of parallel and serial portions allows each portion to be efficiently mapped onto a set of fine-grained tasks which are then managed and coordinated by the hardware task manager across a set of nodes and executed with little to no overhead by the zero-overhead-task switching mechanism. Second, hardware multitasking avoids latency associated with message passing and communications between parallel tasks. This, in turn, alleviates the problem associated with inter-node data dependencies in the same fashion as above.

The zero-overhead-task switching and hardware methods for managing a multitasking system based on dynamically changing task priorities and round-robin scheduling, mechanisms allow efficient and effective use of multitasking within nodes and hypertasking across a network of nodes. The result is lower latency, a method of handling data dependencies, and more effective use of all processors in the system. Additionally, auxiliary hardware found in conventional supercomputers for direct-memory access, bus hardware and controllers, cross-bar mechanisms and controllers, system broadcast modules, and the like are simply not needed since the functions performed by the specialized hardware listed above are effectively performed as software tasks in a priority-managed system based on zero-overhead-task switching and hardware methods for managing a multitasking system based on dynamically changing task priorities and round-robin scheduling. The absence of the suite of communications hardware greatly reduces the need for complicated communications software.

The broadcast model coupled with the compound lens array means higher tolerance to mechanical misalignment, eliminates the need of strict coordination between messages, and achieves faster communications at lower power and cost. Material busses and cross bars are eliminated meaning that less hardware and power dissipation are required; the result is lower overall system cost.

The combination of these technologies, innovations and off-the-shelf components results in a scalable, modular supercomputer system that takes advantages of economies of scale and allows dynamic reconfigurability far beyond that of present and planned machines.

Thermal Considerations

Commercial off-the-shelf MMC (metal matrix ceramic) such as copper with pitch based graphite can be matched to the coefficient of thermal expansion of silicon and conduct heat away from the circuits and toward a heat sink. The invention can also utilize a gold eutectic bonded to the circuits or wafer. In addition, the wafer can be thinned if necessary. The invention could include the use of a wafer made from pure silicon-28 isotope which has a 60% improved thermal conductivity. Preferred embodiments of the invention can operation at temperatures of from −50 to 25 C, held to within 1 degree. Based on a calculated thermal differential for a 200 um thick silicon wafer at 5 kW dissipation and 1 degree C. estimates a cost of approximately $1000 per 5 kW wafer for a chiller.

A more complicated version of the invention can include a clear cooling bath placed on the front side of the wafer as well. In that case, if gas plasma discharge devices were used as the signal emitters the gas discharge cells could include roughly 2 mm diameter microspheres filled with an appropriate gas at the appropriate pressure.

Power Supply

The need for 5 KW at 1.5V and 4000 A is non-trivial. Preferred embodiments of the invention can include a full 3-phase solution at 400 VAC in a standard "Y" configuration. Unisolated direct PWM buck converter to 1.5V. Multiple stages may be used if necessary, but the main point for cost is to avoid the use of active transistors or diodes at the 1.5 voltage level. The final filtering can be done with small passive inductors and capacitors (using a 1 MHz switching frequency). Isolation is desirable, albeit at added cost and weight, and should be done in the first stage, by converting the 400 VAC to 48-120 VDC. Calculations indicate that the power supplies can be about the size of the PC power supply for each wafer. Of course, the invention can use conventional off the shelf power supplies.

To minimize writing losses at the low voltages, the power supplies should be mounted within a foot or so of the wafer. A 1 cm (0000' gauge) copier wire can go from the power supply to the copper graphite MMC wafer TCE matched xy power grid. To provide a large amount of bypass capacitance, barium titanate dielectric or other high capacitance material can be integrated into the power plates. Dead and shorted nodes can be removed via laser. Wafers with too many bad nodes, can be cut up and used as standard IC's.

Mechanical

Matching thermal coefficients of expansion is important to reliable operations. Pitch derived graphite in a copper or Al matrix, can be matched to any thermal coefficients of expansion from the base metal coefficients to −0.002 ppm/K.

Optical alignment requirements are in the 0.3 mrad or about 100 microns vertical edge to edge for a 12 inch wafer. In view of the fact that the invention can include cooling and controlling the temperature of the entire assembly, there will be no trouble achieving the optical alignment needed. For instance, the invention can be embodied in an 8 inch high by 13 inch square processing box, with a half inch ID insulated cold liquid input and an uninsulated half inch ID output tube going to a chiller.

Mounting of conventional off the shelf laser die and IR receivers can be implemented using standard pick and place systems. The invention can include the use of standard IC process wire bonding pads to ease alignment requirements. For example, silver filled epoxy has enough flexibility to accommodate the TCE differences inherent in these connections.

Testing

The high speed integrated optical receivers can be testing using a small solid state laser attached to a testing head that uses the broadcast mode to illuminate all 512 photodiodes at once while probing the wafer to insure that all receivers work. Many companies including Agilent make optical testing heads, so they are readily commercially available.

Pick-and-Place of Optoelectronic Die on Wafer

The invention can including pick and place of a chip onto a 12 inch wafer with 30 micron xy accuracy and the inclusion of a precision drop of conductive silver adhesive. Equipment that can place within +5 microns is readily commercially available.

Optical Interconnect Layer

As previously discussed, it has long been recognized that electrical interconnect methods are approaching their limit in spite of advances in photo-lithography and the miniaturization of high-speed electrical delay lines. Another way of viewing the situation is that electrical interconnects are reaching a limit whereas free-space optical interconnects continue to scale according to an optical Moore's Law dependent on the information capacity of modulated light and the achievable density of photoreceivers. The inherent advantages of optics rests on the non-interference of light in free space. While fiber optics retains some of the disadvantages of electrical delay lines, namely the physical space occupied by the fibers or electrical wiring, free-space optical communication has no such disadvantage.

The invention overcomes most all of the problems and difficulties of present approaches to FSOI by making simultaneous use of two key concepts, that of optical fan-out and broadcast. Both of these concepts have been widely recognized as enabling ideas for FSOI, however they have yet to be combined into a unified approach. The novel lens structure disclosed here allows both fan-out and broadcast to be combined in a simple and inexpensive yet powerful FSOI.

The invention provides a way of fully interconnecting a plurality of associated circuit modules lying in a plane or other geometric configuration. Conceptually and functionally, the circuit modules are grouped into heterogeneous functional sets, which may be termed a node or processing node or processing module, whether or not the set performs computations in the sense of a computer. A multiprocessing system can include a number of processing nodes linked by either electrical or optical connections, or a combination of the two. The invention can be based on a free-space optical interconnect (FSOI) between multiple nodes. Associated with each node are one or more emitters (transmitters) and one or more detectors (receivers). If there are n communicating nodes in a system, there can be n emitters and n(n−1) receivers, or n(n) receivers if desired. Each emitter broadcasts information via optical fan-out to all other n−1 nodes in the system. Each node also has a receiver for each of the other n−1 nodes in the system (or for n nodes by allowing each node to communicate with itself, in which case the information is broadcast to all n nodes in the system). The mapping of the entire set of n emitters to the receivers within a single node is one-to-one so that the simple presence of a message at a receiver automatically identifies the emitter or source of the message. However, since each emitter is broadcasting to all of its receivers when sending a message, the desired destination of a message may be ambiguous. That is, a given message might be meant for all nodes in the system, a particular subgroup of nodes, or a single particular node. This ambiguity can be resolved by supplying each message with a short header that identifies the intended recipient. This message header may be decoded by circuitry located at the receiver site. A message for a particular receiver will then be passed on to a subsequent stage of processing. Any message not intended for a particular receiving node is simply ignored. Message contention or collision is not an issue in the interconnect described herein.

Optionally, there can be one or more modules associated with each node. If there are two or more modules associated with a node and two or more emitters associated with that node, then each of those emitters can be associated with one, or two (or more) of those modules. (If there is only one emitter associated with a node, it can be associated with all the modules associated with that node.) For instance, if there are four laser diode emitters associated with a node and four computational processing modules associated with that node, then each of the computational modules may have a one-to-one association with one of the diode emitters. Further, each of the optical signal detectors associated with that (multi-module associated) node then needs to query not merely whether an incoming received data signal is addressed to that node, but whether and to which of the four associated modules that incoming data signal is addressed.

This new broadcast capability should lead to substantial performance gains as a percentage of peak performance. The broadcast method derived from the invention is a simultaneous non-blocking broadcast capability for short messages. While the 8-byte bandwidth provided by the invention is already over 100 times higher than in competing systems, the peak broadcast bandwidth is a multiple, by the number of communication nodes, beyond. For a 64-communications-node system, this translates into a peak broadcast bandwidth of over 7 gigabytes per second per communications and a peak bisection broadcast bandwidth of 448 gigabytes per second, all based on commercial Sonet OC48 electro-optical components operating at 2.5 gigabits per second. This unexpectedly advantageous result is due to the ability of all 64 laser transmitters to optically broadcast to all receiving nodes where each individual receiver or pixel(s) has an associated short-message buffer.

Optical Fan-Out & Broadcast

The invention has been reduced to practice and demonstrates interconnecting large numbers of processing elements within a small volume. The invention makes use of optical fan-out wherein a single light emitter can broadcast its signal to multiple receivers. Although a given emitter can broadcast to multiple receivers efficiently and effectively, a single receiver should not receive information from more than a single emitter, otherwise message contention as well as confusion of origin can arise. Electrically, this fan-out function would be achieved by an electrical fan-out or multiplexing circuit, often referred to as an electrical cross bar, along with buffer amplifiers for each pathway from a given emitting node. Optically, a simple way to accomplish fan-out is by spreading the output of an emitter with an optical element and then refocusing portions of the fanned-out beam with multiple collecting lenses. Since a broadcast message reaches all receiving nodes in the system nearly simultaneously, a destination code is required to identify the desired recipient or recipients of the transmitted message; such a code is necessary for broadcasting messages both electrically and optically.

Figure 17:
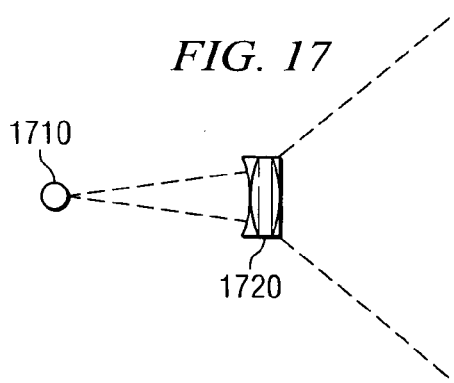
FIG. 17 illustrates a schematic side view of fan-out (broadcast) from an optical signal emitter via a diverging lens, representing an embodiment of the invention.

FIG. 17 illustrates the concept of optical fan-out. The broadcast approach disclosed herein is both simultaneous (to all nodes in the system at the same time) and non-blocking (multiple nodes may simultaneously broadcast information). In this document, "broadcast" will be taken to mean "simultaneous, non-blocking broadcast" unless stated otherwise.

Referring to FIG. 17, fan-out (divergence) from a light source is depicted. The light source 1710 is represented by the circle at the left of the figure. The shaded triangle with apex at the light source represents the inherent spread or divergence of the light beam from the light source. The light source (emitter) can be one, or more than one, optical signal emitter(s). The optical signal emitter can be gas plasma discharge optical signal emitter, a light emitting diode and/or a laser diode or any other signal emitting capable light source. In the case of more than one emitter, the plurality of emitters can define a cluster of optical signal emitters. The cluster can include emitters that operate on different frequencies to enable frequency (wavelength or color) multiplexing and/or emitters that operate on substantially the same frequency to enable parallel output power aggregation. (Similarly, the light receiver (detector), described elsewhere in more detail, can define a cluster of receivers, of the same or different types.) Throughout this document, when the terms emitter or receiver (or their equivalents) are recited, the corresponding clusters that can be defined are deemed to also be described.

Still referring to FIG. 17, a spreading element 1720 can increase the fan-out of the original light beam to cover an entire set of collection and focusing optics that are described elsewhere and shown in other figures. The spreading element 1720 can be one, or more than one, lens or any other light diverging capable optical spreading structure. The spreading element 1720 can include a concave lens, a concave-concave lens and/or a convex-concave lens. The spreading element can include a Fresnel lens. The spreading element can include a holographic element.

Light from each emitter in the interconnect can undergo an initial optical fan-out by integral optics that are coupled to the emitter(s), such as a spreading and shaping lens commonly packaged with one or more gas plasma discharge emitters, lasers or light-emitting diodes (LEDs). Further, the integrated optic and emitter can be integral with the circuit(s) that provide the signal and/or the power to the emitter(s). In the invention, fan-out can be increased as needed through the use of one or more optic(s) placed in line with the emitter and preferably lying substantially in the plane of the light-collecting optics. (These light-collecting optical elements will be described in more detail in a subsequent section.)

Once the light from an emitter is sufficiently spread out so as to cover or illuminate an entire set of receiving elements, or at least a subset of the receiving elements, the light should then be sufficiently concentrated so that individual receiving elements (e.g., photoreceivers) will have sufficient intensity to allow detection of the signal being broadcast. If the originating light beam is sufficiently powerful, then no additional concentrating element is required. Such an arrangement is practical only for broadcast to a set of receivers lying within a small area. The larger this receiving region, the more powerful the light source should be to supply sufficient power to each detector (e.g., photoreceiver).

The invention overcomes the problems of inadequate light intensity at the receivers as well as the problem of maintaining precise alignment of the emitter beam with the receiver position by a novel configuration of diverging and converging optics. In contrast to the usual approach to the FSOI problem, maintaining a precise direction of the emitter beam is no longer a critical parameter. In the invention, a critical parameter becomes the position of the emitter with respect to the set of receivers; something that is relatively easy to achieve in printed-circuit boards (PCBs) and multi-chip modules (MCMs). The lithographic processes presently used in fabrication of silicon micro-electronics are at least an order of magnitude more precise than needed to achieve the accuracy that is required for the invention. Thus, the constraint on beam direction in point-to-point systems is replaced by the easier-to-achieve positional constraint provided by the invention.

Registration of the image of the array of emitters with each receiver array depends on the placement and design of a lens structure above each receiver array. The constraint on the placement of this structure is primarily lateral in nature and should be met to within a fraction of the receiver spacing, something that is again relatively easy to achieve using mounting posts or stand-offs precisely located on the PCB or MCM. All location and angle tolerances in the system disclosed herein are roughly multiplied by the optical power of the lens structure. For example, if an array of emitters of linear dimension d is focused onto an array of receivers of linear dimension r by the system optics, a linear tolerance of t mm becomes t d/r mm, where d/r is typically preferably approximately 10 or greater. Thus, if the constraint is to maintain beam focus on a receiver to within 50 microns, the placement of the lenses or mounting posts or other elements should collectively contribute no more than 0.5 mm to the misalignment. This is a tolerance that is quite easy to achieve.

Figure 18:
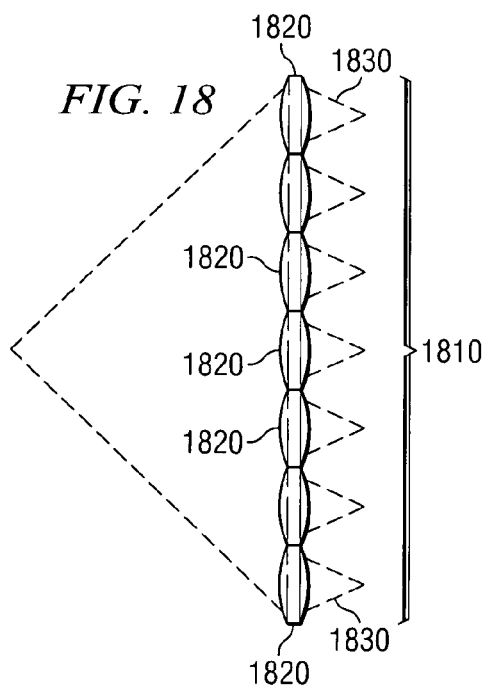
FIG. 18 illustrates a schematic side view of convergence from fan-out via a plurality of converging lenses, representing an embodiment of the invention.

Referring to FIG. 18, a form of optical multiplexing is enabled without the need for multiple amplifiers or buffers as in the case of an electrical multiplexer or fiber-optic star multiplexer. FIG. 18 illustrates how information from a single emitter can be broadcast to multiple receivers using a set of light-collecting and focusing (e.g., converging) elements.

FIG. 18 illustrates optical broadcast from a single emitter located at the apex of the cone of light on the left of the figure, representing an embodiment of the invention. The light from this single emitter has been fanned-out by appropriate optics not shown in this figure (e.g., a diverging concave-concave Fresnel lens). An array of light-collecting and focusing optics 1810 is represented by the column of ovals shown on the right side of the figure. Each element 1820 of the light-collecting and focusing optics 1810 can be one, or more than one, lens or any other light converging and focusing capable optical spreading structure. The light-collecting and focusing elements 1820 can include a convex lens, a concave-convex lens and/or a convex-convex lens. The light-collecting and focusing elements 1820 can include a Fresnel lens.

Fanned-out light incident on each collecting optic can be focused onto a photoreceiver located at the apex 1830 of the light cones to the right of the optic array. Thus, light from a single emitter is made available to multiple receivers through the use of fan-out with the result that information contained in the light is broadcast to all receivers that lie at an appropriate focal point of the collecting optics. It can be appreciated that the receivers can be located in a coplanar arrangement. Any particular receiver can ignore a message by examining a code (e.g., header in a broadcast packet) designed to specify message destination, and determining that the message is earmarked for another node. The combination of the fan-out and multiplexing nature of the exemplary lens structure disclosed in this document comprises a particular approach of achieving a fully interconnected, broadcast, optical-interconnect system and the invention is of course not limited to the described examples.

Optical Interconnect

The invention significantly avoids joining and splitting problems associated with confined light beams as in light pipes or fiber optics. Moreover, the invention significantly avoids the more severe problems associated with electrical interconnects and point-to-point FSOI methods.

Figure 19:
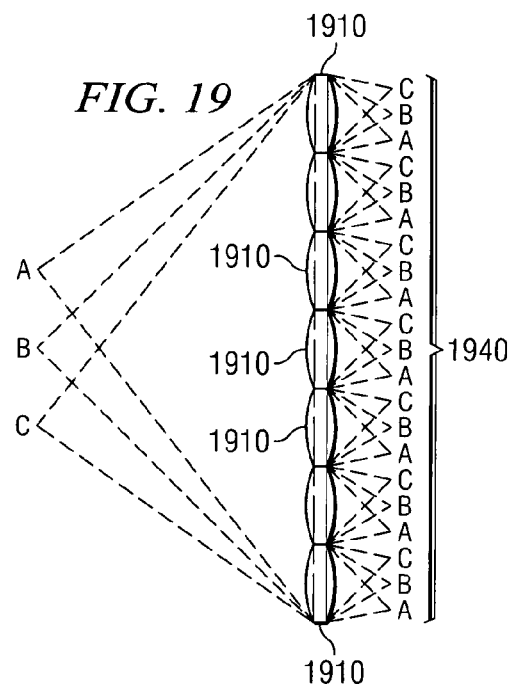
FIG. 19 illustrates a schematic side view of convergence from a multiplicity of fan-outs via a plurality of converging lenses, representing an embodiment of the invention.

Referring to FIG. 19, a set of three emitters A, B, C are located on the left side and a set of receivers are located on the right side of the illustration. FIG. 19 illustrates the concept of broadcasting optical information from a plurality of emitters to a plurality of receivers. All three of the fanned-out signals from emitters A, B, C are collected and focused by the set of light collecting and focusing optics 1910. It is important to appreciate that FIG. 19 represents an "unfolded" configuration wherein the emitters and receivers lie in different planes. It is possible, and it is a preferred embodiment of the invention, to employ a folded configuration wherein a mirror is placed substantially parallel to a plane containing both the emitters and the receivers. FIG. 19 can adequately represent a folded configuration by simply imaging the mirror to lie precisely halfway between the emitter plane on the left and the receiver plane on the right, with its reflective side towards the emitter-receiver array. In this interpretation of the graphic, the illustration has been unfolded, not the device itself and the receiver array on the right is the mirror image of the actual receivers which lie in the plane of emitters on the left. Please note that the sequence of A, B, C on the left from top to bottom is reversed to c, b, a on the right from top to bottom, consistent with a (reversed) mirror image. Where convenient, an unfolded graphic will be used to illustrate both folded and unfolded configurations of the optical interconnect.

Referring to FIG. 19, fan-out from multiple sources falling on the same set of collecting and focusing optics 1910 is depicted. This optical multiplexing establishes an optical fabric that connects n sources to n×m receivers in broadcast mode, where there are m receiver arrays in the system (n need not equal m). Each emitter is labeled by an upper-case letter (A, B, C) on the left. Each of the set of receiver arrays 1940 on the right (7 are depicted in FIG. 19) receives light from each of the three emitters. The individual receivers are labeled by lower-case letters (c, b, a). Since light from mutually incoherent sources does not interfere at an optical element and light from different sources does not interfere in free space, light reaching a particular receiver, say any of the a receivers, originates only at a single emitter (A in this case).

The mirror element (not shown in FIG. 19) need not be a specularly reflecting device such as a first-surface, metalized glass substrate. It is possible to replace the mirror with a diffuse reflector as found in a movie or projector screen. In this screen implementation, the light from the emitters is not spread out, but kept in narrowly focused beams. The array of beams then impacts the screen in a precise grid of points. Each beam then undergoes a diffuse reflection from the screen and illuminates the entire array of collecting lenses. More light is lost in this approach than in a specular reflection from a metalized mirror, so the emitters should be correspondingly brighter. Alignment is more difficult in this case as each emitted beam should be directed precisely onto a location on the screen to within an accuracy that is approximately half the size of the active portion of a receiver (usually a few hundred microns or smaller) multiplied by the optical power as explained above. The angular constraint on the parallelism of the plane of the screen with the plane of the receivers remains as before, but the overall effect of an optical broadcast interconnect is achievable.

The arrangement of emitters, receivers, lenses, and mirror or screen form the optical backplane or fabric that interconnects each processor node optically to every other processor node in the computing cluster. The fundamental concepts that allow this interconnect method to function effectively and efficiently are the aforementioned optical fan-out and optical broadcast. This document discloses several methods to achieve effective optical coupling between emitter and receiver stations.

The Preferred Lens Structure

A goal of the invention is to provide a method of optically imaging an array of emitters onto multiple arrays of receivers. Each receiver array should lie in the image plane of an optic that views the entire emitter array. A single node or group of nodes or circuit modules communicating with a receiver array lying in the focal plane of a single collecting lens, including the receiver array, the collecting lens and any required optics for spreading the output from one or more emitters can be termed a lightnode. The lens structure associated with a lightnode both spreads out the light from the emitter so as to illuminate the entire array of nodes and images light from all emitters in the system onto the particular receiver array of that lightnode.

Typically, a node has one emitter for each processor node (module), although this is not a required constraint as processing nodes (modules) can have more than one light emitter each, or may well share light emitters by temporal multiplexing. The receiver array belonging to a lightnode may belong to a single processing node (module) or be shared among a group of processing nodes (modules) that may be associated with the particular lightnode.

In one embodiment of the invention, each node has an associated emitter and an associated receiver array. Any of a variety of configurations are possible under the constraint that each receiver array is configured as an image of the entire array of emitters. Two possible emitter and receiver configurations are shown in FIGS. 20A and 20B.

Figure 20A:
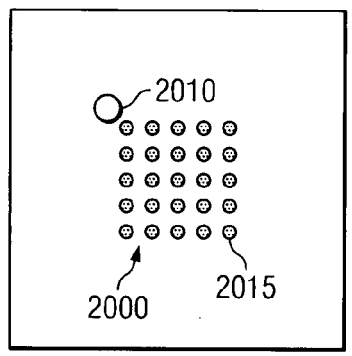
FIGS. 20A and 20B illustrate schematic normal views of single emitter modules having detector arrays configured for deployment of the modules as part of a 5 by 5 interconnect array, representing an embodiment of the invention.
Figure 20B:
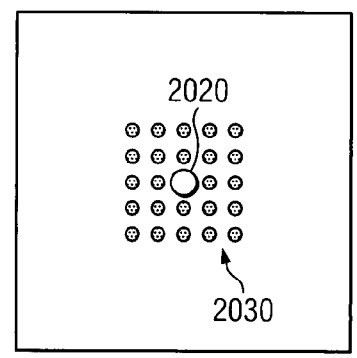

Referring to FIGS. 20A and 20B, two of many possible configurations for the front surface of a node having but a single emitter are depicted. The single emitter is shown as the open circle and the receivers as the array of black dots centered in the larger square, which represents the boundary of the face of the node. The corresponding lens structure (not shown) lies above the plane of the page.

In both FIGS. 20A and 20B, the receiver array is centered in the node face. FIG. 20A shows the node's emitter 2010 above and to the left of the receiver array 2000. Here, the lower-right receiver 2015 in the node receives light from that node's emitter. In the node face layer depicted in FIG. 20B, the emitter 2020 is placed in the center of the receiver array 2030. The image formed by the node's lens structure maps its own emitter's light back onto the emitter 2020, however this causes no problems since this particular light path is not focused by the collecting optic that lies directly above the emitter, but spread twice by the diverging optic. This action also occurs in FIG. 20A, but the central ray from the emitter 2010 to the mirror and back through the center of the collecting optic, which is centered above the receiver array, actually reaches the receiver 2015 on the lower right.

Figure 21A:
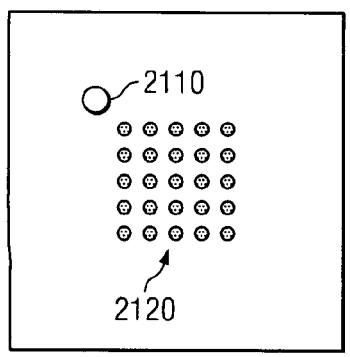
FIGS. 21A-21C illustrates schematic normal views of a one emitter module (FIG. 21A), a four emitter module (FIG. 21B) and an eight emitter module (FIG. 21C), representing an embodiment of the invention.
Figure 21B:
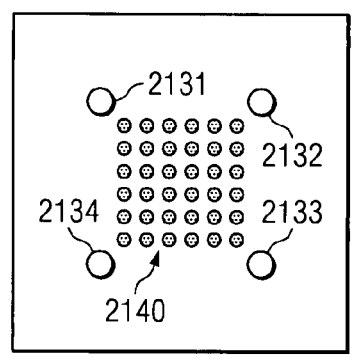
Figure 21C:
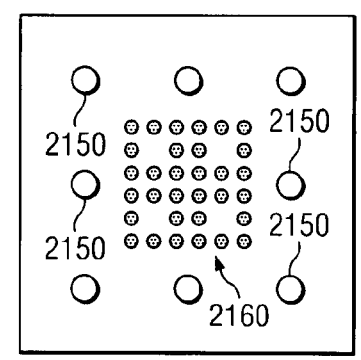

Although a node can contain any number of emitters and processing nodes (modules), practical considerations usually limit this number to 1 or 4 or 8. The larger the number, the more processing nodes (modules) are required to receive information from each receiver in a node. At some point, the electrical fan-out circuitry connecting multiple circuit modules to a single receiver becomes unwieldy. Several configurations are illustrated in FIGS. 21A-21C Referring to FIGS. 21A-21C, three preferred embodiments of node faces are depicted. The large, open circles represent emitters and the arrays dots represent the receiver arrays. The embodiment depicted in FIG. 21A has an emitter multiplicity of 1, and shows a single emitter 2110 and its associated receiver array 2120. It can be appreciated from the 5×5 configuration of the members of the receiver array 2120 that this node is configured for deployment as part of an array of 25 nodes. If the emitter 2110 is shared by more than one module, than each of the receivers in the receiver array 2120 will need to determine if an incoming signal is for any of the more than one modules. The embodiment depicted in FIG. 21B has an emitter multiplicity of 4 and is a more preferred embodiment of a node configuration. Four emitters 2131, 2132, 2133, 2134 are located outboard the corners of the receiver array 2140. It can be appreciated from the 6×6 configuration of the members of the receiver array 2140 that this node is configured for deployment as part of an array of 9 nodes. If each of the four emitters 2131, 2132, 2133, 2134 is associated with one of four modules, than each of the receivers in the receiver array 2140 will need to determine if an incoming signal is for any of the four modules. The embodiment depicted in FIG. 21C, has an emitter multiplicity 8. The eight emitters 2150 are located in a spaced apart relationship around the perimeter of the receiver array 2160. It can be appreciated from the configuration of the members of the receiver array 2160 that this node is configured for deployment as part of an array of 4 nodes. If each of the eight emitters 2150 is associated with one of eight modules, than each of the receivers in the receiver array 2160 will need to determine if an incoming signal is for any of the eight modules. Each of these three arrangements may be repeated in an array of nodes where the spacing of emitters in such an array has regular and uniform spacing so that the image of the emitters is a regular array of focal points that is set to match any of the receiver arrays in the system.

In a more preferred embodiment of the invention, each node has a multiplicity of 4 meaning that there are 4 emitters associated with each node. These emitters can be spaced as shown FIG. 21B. The spacing shown allows a square array, for example, of nodes to be assembled where the spacing between emitters is the same across the array in both vertical and horizontal directions. The face of the nodes can be square, this being a most convenient form, but the invention is not limited to square face nodes.

The advantages of a multiplicity-4 array of nodes over an array having a single emitter per node is that there is 4 times the light intensity per unit area for a given sized array and 75% fewer receivers in the entire system. The overall system size depends, among other factors, on the physical dimensions of the receivers. Thus, a multiplicity-4 array of nodes can occupy roughly 75% less area than a multiplicity-1 array. Although there are also 75% fewer lens structures, these structures (optics) are typically larger since the each now contains 4 fan-out elements. On the other hand, keeping the mirror close to the receiver-emitter plane so as to limit the physical dimensions of the interconnect then requires lens elements with larger numerical apertures.

An important element of the optical interconnect can be a lens structure that effects simultaneously the fan-out of individual emitters to achieve broadcast of messages and the spatial de-multiplexing of intermingled messages carried in the various light beams onto the various receiver arrays as illustrated in FIG. 19. Since light from the plane of emitters is focused on the plane of receivers, which lies as close to the emitter plane (or, equivalently, the folding mirror lies close to the plane containing both emitters and receivers), the optimal lens design for imaging the emitters onto a receiver array should be designed with finite conjugate focal lengths as illustrated in FIG. 22.

Figure 22:
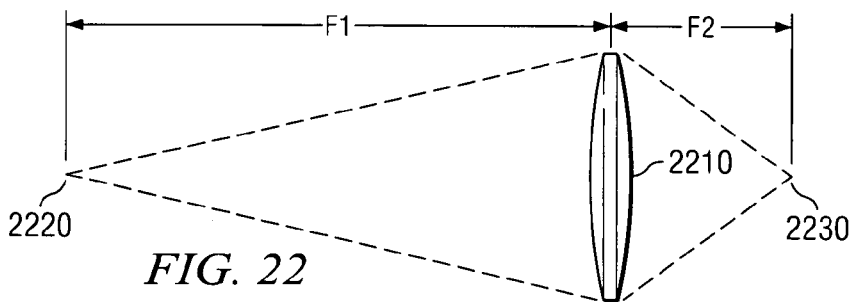
FIG. 22 illustrates a schematic side view of a single converging lens, representing an embodiment of the invention.

Referring to FIG. 22, conjugate focal lengths defined by the converging element of an optic are depicted. In a typical lens, the focal length, $f_1$ is at infinity (for a parallel beam of light), while $f_2$ is 50 mm in a typical camera. For an exemplary converging element 2210 for use in an optic of a lightnode, $f_1$ is the distance from the emitter 2220 to the lens and $f_2$ is the distance from the lens to the receiver 2230. These distances may be quite different depending on the inherent spread in the emitter 2220 and the optic required to adjust this spread.

Each lightnode can have an associated focusing lens as illustrated in FIG. 22. Light from all emitters in the array of nodes falls on the lens, which is idealized as the shaded region to the left in FIG. 22. The function of the lens is to focus all incident light onto a receiver 2230 in the face of the node; this is represented as the shaded region to the right of FIG. 22, where the receiver 2230 in question lies at the apex of the shaded region on the far right. In a preferred embodiment, this collecting and focusing optic can be an aspheric, Fresnel lens with conjugate focal lengths that match the dimensions chosen for the optical interconnect system.

Since the set of emitters on the face of a node should illuminate the entire node array and the collecting and focusing lens should be as efficient as possible so as to reduce the requirement for optical power of each emitter in the system, the diverging light from the emitters and the converging light to the receivers should pass through the same optical system. This presents an inconsistency since any converging element will focus light incident from either side of that element. The solution to this dilemma is to place a "spreading aperture" in the converging lens to allow light from an emitter to pass through the region of the converging lens without being focused. If the inherent divergence of an emitter allows light to reach the entire array of nodes and is not so great as to demand a large aperture through the collecting optic, a simple hole in the collecting optic will suffice. It is usually the case, however, that the light emitted from the devices most convenient for the implementation of the invention emerges within a fairly narrow cone of a few degrees, and with an oval cross section. Compensating optics can be placed at the emitter and produce a circular spreading beam of a few degrees. When this beam reaches the position of the lens structure, it may be a few mm in diameter. Allowing it to spread to cover the entire array of nodes usually requires a distance many times larger than practical. In this case, the spreading aperture can contain a small diverging lens that may also correct for an elliptically shaped beam should that be necessary. A multiplicity-4, Fresnel lens structure is illustrated in FIGS. 23A-23B.

Figure 23A:
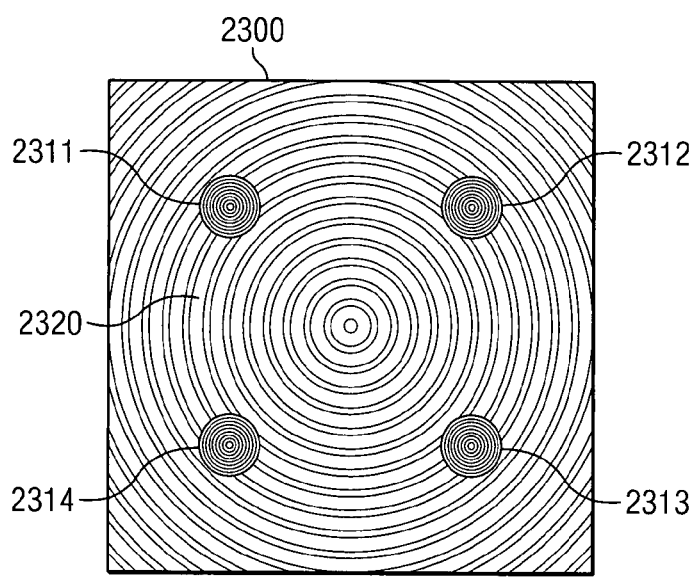
FIGS. 23A and 23B illustrate schematic normal (FIG. 23A) and cross sectional (FIG. 23B) views of a composite diverging-converging optic configured for deployment in conjunction with modules having four emitters, representing an embodiment of the invention.
Figure 23B:
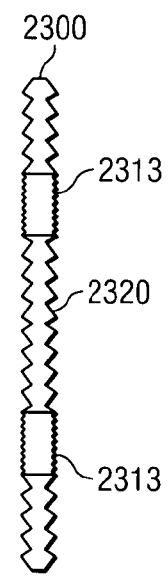

Referring to FIGS. 23A-23B, a compound lens structure 2300 for a single lightnode (module) servicing four processing nodes (modules) is depicted. FIG. 23A is a top view of a Fresnel lens structure designed to spread out four emitter beams using four Fresnel lenses 2311, 2312, 2313, 2314 which are depicted as the four smaller sets of concentric circles. The light-collection portion 2320 of a lens structure can include a square section of a large-diameter compound aspheric Fresnel lens or a smaller-diameter Fresnel lens lying within a square. The dimensions of the square match those of the surface of the node face for optimum light-gathering efficiency. FIG. 23B shows a cross section of the compound Fresnel lens structure 2300. A multiplicity-1 lens structure to match the structure depicted in FIG. 20A would have the three small Fresnel lenses depicted in FIG. 23A (upper left 2311, lower right 2313, and lower left 2314) removed with the grooves of the large lens continuing into those regions.

The light-collection part of a lightnode's lens structure is generally any structure capable of gathering and focusing light such as spherical lenses, aspheric lenses, diffractive elements (binary optics and holograms), light funnels, and so on. A particular embodiment is can be an aspheric, compound Fresnel lens specifically designed with two different conjugate focal lengths as shown in FIGS. 23A-23B. The overall design constraints are to minimize the volume occupied by the light (determined by the area of the lens structure and the sum of its conjugate focal lengths) while allowing an optimal size for the array of receiver elements (receivers should be placed far enough apart to minimize or reduce cross talk between focal points and should be placed close enough to ensure that the array fits within the desired area on the face of a node).

Aspheric Lens Design

The design equation for an aspheric lens surface is given by $$z = \frac{\kappa \rho^2}{\sqrt{1-(k+1)\kappa^2 \rho^2} + 1} + \sum_{j=1}^{m} \alpha_j \rho^j \qquad (1)$$

where z is the height of the lens surface above the x-y plane and has dimensions of length. κ is the curvature and has dimensions of inverse length and ρ is the axial distance from the lens axis measured in the x-y plane and also has dimensions of length. The expansion coefficients $\alpha_j$ have dimensions of inverse length to the power j−1. The parameter k is dimensionless and lies between −1 and +1. For k<0, the lens has a high aspect ratio (k=−1 produces a parabolic surface). A spherical lens results for k=0, and a low-aspect ratio lens with steep edges for k>0.

The parameters κ, k, and the coefficients α are selected by a minimization or evolutionary programming process to minimize the focal region of the lens at the desired distance. Referring to FIG. 22, the first step is to consider the focal point at $f_1$ and the lens surface on the right with parallel rays incident from the right. The design equation is used to concentrate the parallel bundle of rays traced throughout the right lens surface using Snell's law of refraction. As few expansion coefficients as are required to accomplish this task are chosen. Once a lens surface that correctly focuses the left-traveling parallel rays has been found, a left lens surface is then placed as shown in the figure and a new bundle of rays is traced from the focal point on the left, through the first lens surface (left surface) into the material of refractive index n and thence through the second lens surface (right surface). For this step, a new set of surface parameters for the left surface are chosen. The parameters of the right surface are then varied. This process is repeated until the bundle of rays originating on the left of the figure at focal length $f_1$ are properly focused at conjugate focal length $f_2$ on the right of the figure. In the case of a Fresnel lens, the surface height z is stepped as shown in FIG. 23B before rays are traced through the system. This process generally converges fairly quickly to a satisfactory set of parameters that then can be used in the manufacturing process.

Asymmetric, Aspheric Lens Design

The above design process produces an axially symmetric lens that is optimized for both light source and focal point situated on the axis of the lens. In the optical interconnect disclosed here, most light sources are far from the lens axis. This is especially true for large systems with many emitters and receiver arrays. To accommodate off-axis sources, a given lens can be made slightly asymmetric so that it is biased towards focusing light whose source is a point lying away from the lens axis. Equation 1 expands the lens surface in a simple polynomial in ρ. Replacing the sum over powers of ρ with a sum spherical harmonics allows a general representation of a surface that is not necessarily axially symmetric. Such a surface will have lumps or bulges to correct for off-axis light sources.

The design process to asymmetrize a lens is to first design an axially symmetric lens as in the previous section. To this approximate lens surface add a spherical harmonic of the form $$\alpha_2(A^2-\rho^2)\times\rho^{-1} \text{ or } \alpha_2(A^2-\rho^2)(x^2-y^2)\rho^{-2} \quad (2)$$

where $\alpha_2$ has units of inverse length, A is the aperture radius, $\rho=(x^2+y^2)^{-1/2}$, and x and y are Cartesian coordinates in the plane with z the axis of the lens. The coefficient $\alpha_2$ is adjusted as described above to place the lens focus of an off-axis source at the desired position and minimize the focal region, which will now exhibit coma and spherical aberration. This process may be repeated with the next spherical harmonics of the next higher order until the desired tolerances on the focal position and size of the focal region are achieved. Any reference on orthogonal expansions, such as *Orthogonal Functions* by G. Sansone, Dover Publications, New York will provide the necessary functional forms for use in this procedure.

Light Budget for a Square Array of Nodes

The light from each emitter should be spread so that every receiver is illuminated. In practical terms, this implies that the lens above each receiver array should be sufficiently illuminated by each emitter in the system. Unless optics, such as prisms and optical wedges, are used, the light from any emitter should effectively span the largest dimension across the array of nodes. If the array is square or rectangular in shape, this dimension is the diagonal. If the array is circular, this dimension is the diameter of the circle. This maximum dimension of the planar array is reduced slightly by the twice distance of an outside emitter to the edge of the array. Thus, if the emitters are as shown in FIGS. 20A-20B or FIGS. 21A-21C, and the node face is a 50×50 mm square, the reduction is approximately $25(2)^{-1/2}$ mm. If there are 25 such nodes arranged in a square, the radius of the light cone, when reflected to fall back onto the array of lens structures, is $(2)^{-1/2}(5\times50-25)$ mm or approximately 320 mm. Without optics to fold back light that would otherwise fall outside the node array upon reflection or miss the mirror entirely, the light will be uniformly spread over an area of about 320,000 mm², assuming a uniform illumination within the emitter beam. Since the maximum area of the collecting lens, in this example, is 50×50 mm² with a 10 to 20% reduction for the area required by the diverging optics, the fraction of light falling on any lens structure and hence focused onto any receiver is the ratio of these two areas, or about 0.8%. This is further reduced by reflective losses and irregularities in the various optics.

In a square array with the light-collecting per node area proportional to the dimensions of the face of the node, the fraction of light collected is given by $$\frac{2}{(2n-1)^2\pi}\varepsilon \quad (3)$$

where $n^2$ is now the number of nodes in the array and $\varepsilon$ is the efficiency of the optics and accounts for reflective losses, loss in area due to the diverging optics (the small lens inserts shown in FIGS. 23A-23B), and any empirical imperfections in the optics. Typically, $\varepsilon$ is about 0.4 for the multiplicity-4 structure (see FIG. 21B) and 0.3 for a multiplicity-1 lens (see FIG. 21A).

The typical, commercially available photoreceiver has a sensitivity of about −21 dBm (about 8 μW of optical power). The active region is in the neighborhood of 0.2 mm on a side for an area of 0.04 mm². Ideal optics would focus the image of each emitter precisely onto a spot of 0.2 mm in diameter centered on the photoreceiver. If the spacing between photoreceivers is a small fraction larger than their width, any small imperfections in focus or alignment, or any mechanical vibration, would cause unwanted cross-talk between receivers. From a mechanical alignment and robustness perspective, it is a good idea to place the photoreceivers as far apart as possible within the constraints imposed by the physical size of the node face. Robustness against misalignment and mechanical instabilities is then achieved by focusing the light in an area centered on each receiver. Of course, an additional micro lens may be placed just above each receiver to concentrate the spread-out beam onto the receiver.

Suppose the configuration constraint is to choose an emitter-to-corner-receiver distance to be the same as the receiver-to-receiver distance, then a node such as depicted in FIG. 21B (i.e., four emitters or a multiplicity of k=4), would have a spacing of s/2(2n+1) between receivers where s is the dimension of the side of the node face. This is shown in the node depicted in FIG. 21B with n=6. The optimum diameter of the focused spot is now s/2(2n+1) instead of the more restrictive 0.2 mm. The ratio of the areas of the optimum-diameter spot to the ideal spot is the excess power factor needed to adjust the emitter powers so the receivers have adequate power with this mechanically optimum receiver spacing. For small arrays, the spot size calculated by this method is usually larger than the 1 mm or so that is sufficient to satisfy all but extreme cases of misalignment or vibration. For larger arrays, this spacing can be in the few hundred micron range, indicating that custom-designed and fabricated receiver arrays are required.

Mechanical Stability & Focal Spot

If the collecting and focusing optic is placed at the optimal position with respect to the receiver array, each emitter image formed by the optic will lie in precise registration with the corresponding active area of each receiver. Since the receivers are typically a few tens of microns in diameter, and a larger area implies a slower response, the optimum focus position is also the most unstable to lens imperfections, mechanical misalignments, and mechanical vibrations. Such imperfections will lead to momentary loss of communications while misalignment to mechanical shock may lead to permanent loss of communications. By moving the collecting and focusing optic closer the receiver array, the focal point on the node face becomes a focal region surrounding the receiver's active area. The optimal diameter of this focal region is the spacing between receiver centers. Of course, the light intensity at a receiver is lower within the focal region than at a focal point with the smaller diameter of the receiver's active area. To compensate for this loss of intensity at the receivers, more powerful emitters can be used.

The distance from the node face layer to the plane of the lens structure can be adjusted to establish the proper focal region. The configuration of regions is shown in FIG. 24.

Figure 24:
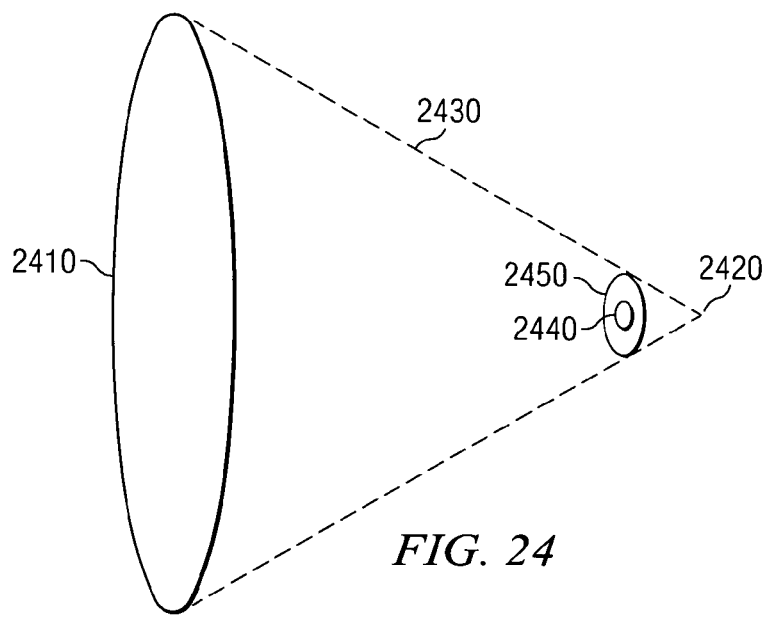
FIG. 24 illustrates a schematic perspective view of a collecting and focusing lens optically coupled to a detector, showing a focal point and a plane defined by the detector, representing an embodiment of the invention.

Referring to FIG. 24, the concept of under focus is depicted. The collecting and focusing optic 2410 is represented by the large oval on the left. The dot on the far right is located at the focal point of the optic 2420. The cone of light 2430 is represented by the triangular shaded area and the receiver in the plane of the node face 2440 by the small white oval. The dotted oval surrounding the receiver lies in the plane of the node face and shows the extent of the focal region associated with the each receiver 2450.

By choosing a lenslet array to include converging lenslets (positive focal length), the array of lens structures can be placed closer to the node face. On the other hand, an array of diverging lenses (negative focal length) allows the array of lens structures to be placed farther from the node face. Such fine-tuning might arise when the divergence of the emitters needs to be matched to a certain sized diverging optic in the lens structure.

Electro-Optical Layer

To achieve an efficient coupling of n nodes, each emitting and receiving modulated light in a broadcast mode, where each node can receive optical signals from every other node simultaneously, an optical system is required. First, the optics should sufficiently spread out light from each emitter so that each receiver is illuminated. Second, this mixture of light from all emitters that falls onto each receiving node should be spatially de-multiplexed into separate beams so that each node receives a distance light beam from each emitting node. This can be accomplished by the optical interconnect layer disclosed herein.

The next stage in establishing an interconnection of an array of processing modes should consider the conversion of electrical signals to be sent from processing elements to optical signals for transmission within the device. This stage also needs to consider the reception of optical signals by a suitable optical structure, and a conversion of the optical signals back to electrical signals for use by the processing elements.

The receivers and emitters, along with associated drivers and amplifiers comprise the electro-optic portion of the node. These parts can be mounted on a printed-circuit board (PCB) or a multi-chip module (MCM) substrate; this submodule can be termed the electro-optic (EO) layer. The context of the free-space, optical fan-out broadcast interconnect disclosed herein can include an electro-optical interconnect that performs an electrical-to-optical (EO) conversion as well as an optical-to-electrical (OE) conversion. The optical interconnect is the structure that interfaces the EO portion to the OE portion so that the resulting system has the desired property of establishing fast and efficient communication channels between processing nodes (modules). An EO layer including emitters, receivers, and associated electronics is depicted in FIGS. 25A-25B.

Referring to FIGS. 25A-25B, a node face 2550 is depicted in FIG. 25B and the node back 2500 is depicted in FIG. 25A. The node face 2550 is depicted without the lens structure, which would be mounted on stand-offs above the face 2550 shown in FIG. 25B. These illustrations show a conceptual rendition of an MCM node with the EO layer in FIG. 25B and the processor nodes 2510 (modules) in FIG. 25A. The shaded squares in FIG. 25B represent the circuitry necessary for transducting electrical signals for conversion to and from light signals. This circuitry can include serdes (serializer-deserializer) elements 2560. Other modules 2570 contain the necessary transimpedance amplifiers, decoding circuitry, and any required local storage. The four open circles represent the four emitters, one serving each processor node. The black dots represent the photo-receivers, one for each emitter in the system. A fully functional interconnect for a multiprocessing system will also include logic and local memory for routing and temporary storage of messages.

Simple and Compound Lightnodes

Typically, a lightnode has one emitter for each processor node, although this is not a required constraint as processing nodes (modules) may well share light emitters by temporal multiplexing. A lightnode also contains an array of receivers that belong to a single processing node (module) or are shared among a group of processing nodes (modules) associated with the particular lightnode. If the emitters and receivers lie in the same plane, the emitted light passes through the array of lens structures before it reaches the mirror which folds the light back onto the collecting optics.

As previously noted, a preferred embodiment of a node in the invention includes four emitters. In this case, a receiver array services four processing nodes (modules) by local (within the node) electrical fan-out from each receiver to all four processing nodes (modules) and electrical fan-in to each receiver from all processing nodes (modules). Local logic within this electrical multiplexing of signals from receivers to processing nodes (modules) controls the multiplexing switches by allowing information destined for a particular node to reach that node.

As also previously noted, advantages of an interconnect constructed from multiplicity-four nodes (four emitters to one node) include a factor of 4 less receiver arrays and associated circuitry within the system, 4 times the light intensity at any given receiver for an emitter of a given power, and four times fewer nodes and associated lens structures. Other advantages include a larger node face with more space for the receivers. This also implies that the daughter cards for the processing electronics (discussed in the section on processing nodes) can be larger. Disadvantages are that the lenses are larger implying that the numerical apertures of the individual collecting lenses should be larger for a given mirror distance.

Each lightnode should contain local multiplexing circuitry in addition to the header-decoding circuitry. The lens structures are more complex in containing four diverging elements instead of one. By increasing the number of processing nodes (modules) per lightnode beyond 4, the electrical multiplexing issues become more severe and the wire lengths become longer. At some point, diminishing returns of advantages over disadvantages will arise. Certain configurations of processing nodes (modules) are better met with multiplicity 4 or multiplicity 8 lightnodes in spite of the rising disadvantages.

Emitters

Emitters may be lasers, groups of lasers of different wavelengths, light-emitting diodes, plasma light sources, or any other structure that is capable of supplying modulated light, whether visible, infrared, or ultraviolet. Each emitter or light source within a compound emitter (cluster or group) requires driving (modulating) circuitry to modulate the device itself or an external structure capable of modulating light emitted by the device.

Receivers

Receivers may be photodiodes of suitable sensitivity. A receiver may be sensitized to a particular wavelength by design as in U.S. Pat. No. 5,965,873 by Simpson et al. or by a wavelength filter placed over the receiver either separately from or integral with a light-collecting microlens. Receivers based on photomultipliers and photo-sensitive channel plates are also possible approaches to light detection for the invention.

Receiver Array

The electronics (transimpedance amplifiers, limiting amplifiers, and deserializers) associated with a lightnode's receiver array may be integrally contained with the receivers or separately bonded to a circuit board containing the receivers and emitters. An integrated receiver array or a discrete array of receivers may be covered by a microlens array to gather more of the incoming light onto each receiver element.

Methods of Light Modulation and Demodulation

U.S. Ser. No. 60/290,919, filed May 14, 2001 and PCT/US02/15191, filed May 13, 2002 (published Nov. 21, 2002 as WO 02/093752) all by Brian T. Donovan et al. all disclose generating electrical pulses of widths precisely controlled to sub-cycle precision. Donovan et al, U.S. Pat. No. 6,445,326 discloses approaches to providing sub-cycle precision in measuring pulse widths. Dress and Donovan, U.S. Ser. No. 10/175,621, filed Jun. 20, 2002 and PCT/US03/19175, filed Jun. 18, 2003 both entitled "Pulse Width and/or Position Modulation and/or Demodulation" disclose modulating and demodulating electrical or optical pulses with sub-cycle precision. By applying aspects of these modulation and demodulation technologies directly to the laser driver for modulation and at the receiver array for demodulation, it is possible to achieve a spectral efficiency significantly greater than 1. Thus, the bandwidth of the optical interconnect disclosed herein can be increased by 4 or 8 or more times over that of simple pulse-amplitude modulation of light as presently practiced. The choice of which modulation and demodulation techniques to utilize in an embodiment can be made based on achieving higher data rate and achieving higher noise immunity.

The laser drivers may be directly modulated or modulating signals may be applied to acousto-optical devices positioned after the light source, whether lasers, light-emitting diode, plasma, or other such source of light. Pulse-width demodulating circuitry may be integrated with the receiver array, allowing an inexpensive and compact receiver array complete with electronics to be achieved.

Additional light modulation may achieved by using modulated radio-frequency signals to drive an acousto-optic element as in U.S. Pat. No. 5,146,358 by William M. Books. Such modulation and attendant demodulation can achieve higher signal-to-noise ratios and increased sensitivity over the simple modulation and demodulation discussed above.

Lens Placement

Since light impinges as different angles depending on the source and location of the lightnode within the lightcube, lens structures all centered over their receiver arrays will image the array of emitters at different locations with respect to the center of the node face. However, ease of manufacturability suggests that a single design for the node face be replicated and identical parts be used to construct the interconnect system. There are several ways to overcome the problem imposed by the manufacturability constraint being inconsistent with the fact that different lightnodes receive light at different angles. Since the effect of different reception angles appears as an optical distortion of the image plane that contains multiple images of the array of emitters, an optical correction is possible by replacing the planar mirror with a spherical mirror centered over the center of the array of nodes. The method preferred in the present embodiment, however, is to position each image of the array of emitters so that the image is in perfect registration with the receiver array and each receiver array is centered in the face of its node for ease of manufacturability. This requires a translation of the collection optic of the lightnode's lens structure in a direction towards the center of the array of nodes and at an amount proportional to the distance of a given lightnode's receiver array from the center of the EO array. An example of this translation is illustrated by FIG. 26 and can be term asymmetric optic alignment.

Referring to FIG. 26, the placement of lens structures for a 3×3 node array is depicted. The lens structure belonging to the center lightnode is placed precisely at the center of the receiver array as shown by the bold, circled cross 2610 in the center of the FIG. 26 since the lens structure is illuminated symmetrically from all directions in that there is an equal amount of light coming from the left of the vertical dotted line and impinging on the center lens structure as there is light coming from the right. Two of the other three axes of symmetry are also shown as dotted lines through the center of the figure. The position of the lens structure in the upper-right corner is shown by the bold, circled cross 2620. Note that this center is no longer at the center of the receiver array 2625, represented by the array of 36 small circles in the upper-right lightnode square. Two other lens-structure centers are shown, one to the right of the center and the other above the center. The marked positions 2630, 2640 are closer to their respective receiver arrays than the center in the upper right, but are still biased towards the center of the figure. This asymmetric optic alignment when applied to all of the non-central optics results in the image of the array of emitters being in substantially perfect registration with all of the receiver arrays. In an alternative embodiment of the invention, one or more of the receivers can be spatially biased (asymmetrically positioned) with regard to the node array and/or the optics array to improve registration of optical signals with the plurality of receivers that define the receiver array.

Processing Layer

The optical interconnect or backplane or fabric disclosed herein provides a simple and effective solution to fully interconnecting large numbers of intercommunicating functional elements or circuit modules. The set of elements can be homogeneous or heterogeneous in their operation on the received messages or data. Examples of homogeneous processing elements would be a supercomputer including a large number of identical computing nodes or a communications switch likewise including a large number of identical identification, correction, and routing nodes. A heterogeneous system might have a mixture of general-purpose computing nodes, as well as specific purpose nodes for carrying out such functions as encryption and decryption, message-traffic analysis, image processing, mathematical functions such a matrix inversion or polynomial expansion, high-level symbolic processing, as well as many other possibilities. A reconfigurable, heterogeneous processing system would allow the replacement and regrouping, either physically or logically, of a mixture of such specific- and general-purpose processing nodes. The only requirement is that communications nodes in the electro-optic layer are properly interfaced to processing nodes (modules) in what can be termed the processing layer. The communications layer (optical interconnect layer and electro-optical layer) would be consistent in function across the system and that each processing node (module) have a consistent interface to the communications layer. In a homogeneous view of communications, the processing layer is simply an array of processing nodes (modules) that communicate with the EO layer through the optical interconnect layer.

Processing Node and Lightnode

The electro-optical portion of a lightnode may be thought of as including of a single compound lens structure that spreads out a light beam (from a laser, light-emitting diode, etc.) from one or more emitters and is able to focus light reflected off a mirror or screen onto one or more focal points. Each focal point has a receiver or photo-sensitive detector for detecting or receiving a light signal from an emitter residing on the same lightnode or elsewhere in the optical system. Thus, a lightnode can defined by a single compound lens structure that forms an image of all emitters in the system onto a smaller array of receivers plus the associated electronics including the associated emitters and receivers. In addition to forming an image of each emitter in the system, the lens structure contains structure that spreads out the associated emitter's light (fan-out) so that each part of the system receives a portion of the emitted light (broadcast).

If there are $n^2$ emitters in the system under consideration (note change of notation for convenience only) and each emitter has its own lens element, then that lens element can focus all $n^2$ emitter images onto an array of $n^2$ receivers located in the focal plane of the lens element. The lens structure can be larger than the EO layer only for those lightnodes not in the interior of the lightnode array. Light at the edges of the node array that escapes collection by the various lightnodes can be used for off-array communication. FIG. 27 illustrates the portion of the processing layer associated with a lightnode's EO layer. Note that this configuration is not uniquely determined by the lightnode geometry. A smaller number of wider processing daughter boards could span a collection of nodes and be attached thereto by a system of connectors or cables.

Referring to FIG. 27, a lightnode 2700 is depicted without the lens structure, which would be mounted on stand-offs to the right of FIG. 27. A PCB version is depicted including four processing modules 2710 each of which includes four package chips 2720 (e.g., processors, memory, etc.) represented by shaded rectangles. The EO layer is at the right of the figure with the array of black dots representing the receivers 2730 and the four open ovals representing the emitters 2740 (e.g., lasers or LEDs or plasma emitters).

Another configuration of the processing layer segmented to match each node is shown in FIGS. 28-28B where daughter boards are replaced by the dense packing allowed by MCM techniques. In this embodiment, the processing layer associated with the node is located on the back side of the EO layer whereas in FIG. 27, the processing layer included four processing modules mounted on daughter PCB cards attached to the back of the node's EO layer.

Referring to FIGS. 28A and 28B, a node 2800 is depicted without the lens structure, which would be mounted on stand-offs above the face shown on the right. This illustration shows a conceptual rendition of an MCM node with the EO layer on a front side 2810 in FIG. 28B and the processor nodes on a back side 2820 in FIG. 27. This version illustrates four processor modules 2830 in this single node. The shaded rectangles (representing unpackaged die) in FIG. 28A depict the four processors, each of which may contain multiple processing elements. Memory 2840 is represented by the small shaded squares. The shaded squares in FIG. 28B represent the circuitry 2850 necessary for transducting electrical signals for conversion to and from light signals, namely the serdes (serializer-deserializer) elements, as well as the necessary transimpedance amplifiers, decoding circuitry, and local storage. The four open circles represent the four emitters 2860, one serving each processor node. The black dots represent the photo-receivers 2870, one for each emitter in the system.

The Full Optical Interconnect

A multiprocessing system can be defined to include a number of individual processors linked by either electrical or optical interconnections, or a combination of the two. Additional linkages connect processors to local and/or remote memory. One or more processors can reside on a single chip or die. Groups of processor chips, along with power, random-access and other forms of memory storage, memory control circuitry and other elements form a processor node (module) as described above.

A processor node including packaged chips will typically reside on a separate PCB that is attached to the EO layer either directly, through a connector, or through a cable. If the processors are based on bare die, which are much smaller and can be assembled in higher densities than packaged chips, processor nodes can be placed on the back side of the EO layer greatly reducing the volume of the node. The node concept can be thought of as containing multiple general-purpose computing nodes serving as a component of a high-performance computer or supercomputer as well as multiple specific-purpose switching or routing nodes. In addition, there are other specific-purpose devices such as message examination nodes, encryption and decrypting nodes, processing nodes for mathematical functions, etcetera. A combination of these functions, depending on application requirements, is achievable by populating various nodes with different functional processing nodes (modules) are required by any particular application.

The Electro-Optical, Optical-Interconnect Cube

A collection of nodes (with their associated lens structures) can be arranged in a square array and support attached or remote processing nodes (modules), form the computing cluster or computing array. A mirror or screen placed above the plane of the lens structure couples the light emitted from each node to other nodes in the system. The entire assembly including the mirror or screen layer, the array of lens structures, the EO layer and the processing nodes (modules) can be termed a lightcube because the shape of the complete system is roughly that of a cube with the dimensions of the mirror being similar to the dimensions of the array of EO submodules, and the distance of the mirror from the EO layer being close to a side of the array of EO submodules.

An individual lens structure may be mounted on each node or an array of lens structures may be similarly mounted above or beyond a planar array of nodes. The electro-optical and optical interconnect portions of a lightcube are shown in FIG. 29.

Figure 29:
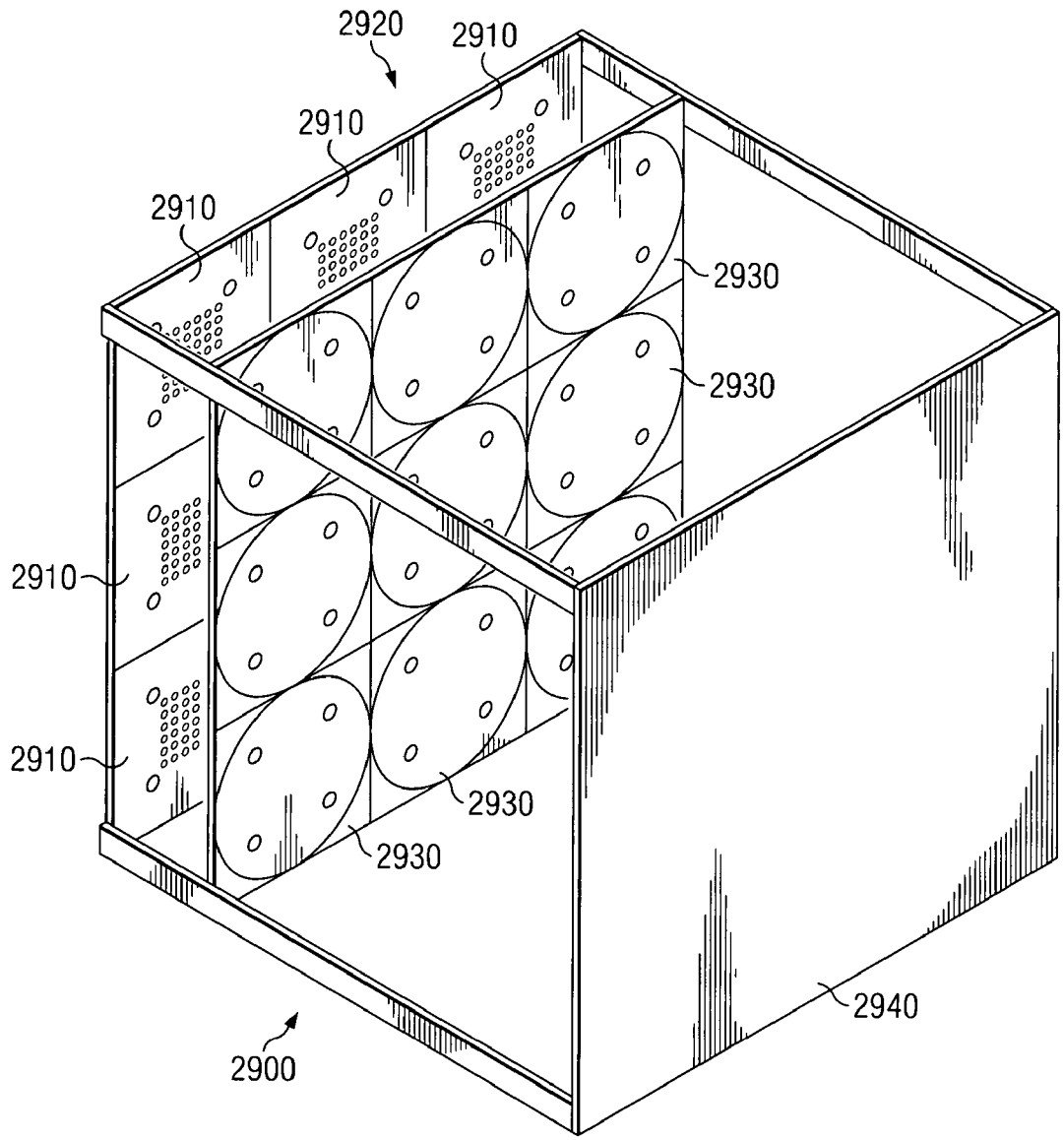
FIG. 29 illustrates a schematic perspective view of an optical interconnect including a 3 by 3 node array, a 3 by 3 optic array and a mirror, representing an embodiment of the invention.

Referring to FIG. 29, a lightcube 2900 is depicted based on a 3 by 3 array of nodes 2910 where each lightnode contains four processor nodes (modules). The lightcube can include three layers. On the left is the EO layer 2920 of 9 nodes 2910. Only the emitters and receivers are shown. In the PCB version, circuit boards (not shown in FIG. 29), attached to the back of the EO layer, would extend farther to the left. In the MCM version, processing nodes would be mounted directly on the back of the EO layer with signal-conditioning circuitry mounted on the front as illustrated in FIGS. 28A and 28B. The next layer, slightly to the right of the EO layer, represents an array of 9 lens structures 2930. Each lens structure can include four diverging elements to achieve fan-out consistent with the overall image forming geometry. These optical elements are shown as the four small ovals in each lens structure, for a total of 36, matching the number of emitters in the EO layer. Each lens structure also contains a large light-collecting and focusing optic represented by the 9 large shaded ovals. A mirror 2940, shown on the right, comprises the third layer. In this configuration, all three layers lie in parallel planes, with the distance between the planes constrained by the distance from the far left layer to the mirror on the right, the spacing of receivers in the receiver array, and the type of focusing optic used.

The lightcube may have processing nodes (modules) attached to the left of the EO layer, in which case the system is a multiprocessing system fully interconnected by a FSOI. If connectors to remote communications or remote processing elements replace the processing nodes (modules), the lightcube then serves as an electro-optical switch and/or router having full broadcast capability.

Mirror Alignment

Geometrically, by considering the central ray from an emitter in one corner of the array to a receiver in the other corner, the angular tolerance on the mirror is approximately the receiver spacing divided by the array diagonal. In practice, the collecting optics considerably reduce the severity of this constraint. The tolerance on mirror alignment is reduced by the same factor as the optics reducing the image of the emitter array to the much smaller receiver array size. This increase in tolerance is also given by the ratio of the two conjugate focal lengths, or, more accurately, the ratio of the size of the receiver pattern to the emitter pattern. For a node tile of side s, the receiver pattern fits into a square of about s/2 on a side. The emitters fit into a square that is (2n−1)s/2 on a side. Since the lens structure images the larger square onto the smaller square, the angular tolerance is increased by 2 n−1 over an unlensed, central ray.

Feedback Control on Mirror Angle

In a typical system represented by FIG. 29, with a receiver array of about 30 mm and an emitter spacing of 50 mm, this ratio is 1/5, relaxing the tolerance on the mirror angle from about ½0th of a degree to about ¼ degree. The absolute mirror tolerance is roughly constant as the array size increases since the reduction in size of the emitter image to the receiver array should be increased. In certain situations, active control of mirror alignment might be required. This can be achieved by adjusting the mirror angle via electro-mechanical positioners deriving their control signal from one or more dedicated lasers reflected from the mirror itself back onto CCD arrays in the receiver plane might be required. It is known how to derive an error signal from such an arrangement of a narrow light beam impinging on a photosensitive array of small pixels.

Consider a narrow-beam laser mounted at one corner of the EO array and a CCD array in the opposite corner. The error signal is an x-y vector of pixel deviations from the nominal center of the CCD array. A microprocessor containing a table or simple algorithm converts the x-y position error into three differential drive signals, one sent to each of three electro-mechanical positioners located on three of the four corner mounts supporting the mirror. As the signals are applied to the positioners, the error signal is reduced. When the correct mirror alignment is achieved, the error signal vanishes, leaving the mirror in its desired position. Should mechanical dimensions change due to temperature or vibration, the error signal will reappear and the mirror will be re-aligned.

Receiver Lens Array

By mounting lenses directly over the receivers, for example a small lenslet array that matches the receiver array, optical alignment becomes less critical. In this case, the main focusing optic would be designed by taking the optical action of this additional lens into consideration. The resulting optical system would be able to focus more of the light onto a smaller spot aligned with the active area of each receiver.

Optical amplifiers can be placed above each receiver to pre-amplify the light collected by the lens structure. Thus, the invention can function even though the emitted light is too weak to directly excite a receiver element.

Alternate Embodiments

The array of nodes may be configured in arrangements other than a square. For example, a linear array of nodes, while not making optimal use of the light, might be a more suitable configuration for some applications. For example, an array of 50 by 50 mm nodes in a 2 by 4 configuration would measure 100 mm by 200 mm by perhaps 300 mm. This would be a convenient size for portability as a flat package.

The invention can include optics designed to optimize light usage within a given configuration of lightnodes. For example, the light output of an emitter can be confined to a square or rectangular region by using specific purpose optics. Such specific purpose optical devices include prisms, conical lenses, diffractive elements, binary-optical elements, and holographic elements.

The invention can be configured with unfolded optics where the emitters are removed from the EO layer and placed beyond the mirror position (i.e., with at least a portion of the mirror omitted). Two EO layers can then communicate across a lightcube assembly without a mirror. Even in the entire mirror is removed the individual EO layers can continue to communicate internally electrically, at a local level.

The invention can include the use of mirrors that redirect light into different regions, angles, and directions for communication with receivers not in the emitter plane. That is, a configuration of nodes can be arranged in other forms than lying in a plane.

The invention can include the use of corner reflectors or corner mirrors to replace the planar mirror. This concept can be extended to more complicated geometric shapes having more than four corners.

The invention can include the use of dichroic mirrors allow multiple use of the light cube space. For instance, 6 EO layers can be connected to the same cubic volume, where each layer has an associated dichroic mirror that reflects its own associated color. Light from each lightcube would then occupy the same volume while the different colors would allow the various lightcubes to operate independently. Three lightcubes can also use the same lightvolume without dichroic filters.

The invention can include simultaneous, non-blocking broadcast of information. Most interconnect schemes, whether optical or electrical, allow messages and information to be broadcast. However, because of the intrinsic nature of the broadcast techniques and structures disclosed herein, the invention can include broadcast that is simultaneous to all nodes in the system in that the same physical message is distributed simultaneously throughout the system. It is also important to note that the version of broadcast disclosed herein is non-blocking in that a message being broadcast to all nodes in a system does not block any other messages from being sent from a different node at the same time as the given node is broadcasting.

The invention can include wavelength-division multiplexing (WDM) at emitter sites & filters at receiver clumps (clusters). Multiple lasers at different wavelengths (heterogeneous, monolithic laser arrays) can be used at the emitter location in place of single lasers. Since the lens structure reduces the image of the emitter array onto the receiver array, each receiver becomes an array of receivers such that the multiple wavelengths from an emitter array are focused onto the receiver array. The spacing between receivers in this local group can be larger than the optically reduced spacing of the laser array of the corresponding emitter. For example, a laser array with spacing of 240 µm in a system with emitters (arrays of lasers) spaced by 40 mm would have the corresponding receiver with a spacing of perhaps 1 mm between groups of receivers (a 40-to-1 reduction in image size). If this spacing ratio were to be maintained between receivers in the local group corresponding to the lasers in an emitter group, a spacing of 240 µm divided by 40, or approximately 6 µm, would be needed. This small spacing may be impractical from an optics and electronic circuitry standpoint. The solution is to space the receivers corresponding to a given emitter array of lasers at a physically and electrically reasonable distance (e.g., from approximately 2 microns to approximately 2 mm) and then focus the light from the corresponding emitter to illuminate this larger bundle of receivers. Each receiver could then have a dichroic filter matching the wavelength of the particular laser in the emitter's array of lasers. This would ensure that an array of different wavelength lasers operating within a small region can communicate with an array of receivers in a one-to-one manner. Alternative embodiments of the invention can direct the various wavelengths from the emitting array of lasers onto the appropriate receivers through the use of diffractive elements (gratings) or dispersive elements (prisms).

The invention can include the use of diffractive lenses and binary optics. All techniques of forming images with light or collecting dispersed light or dispersing light may be used with the invention. For instance, the invention can include the use of refractive optical elements (the commonly used lenses), lenses with graded indices of refraction (so-called grin lenses), diffractive optical elements such as binary optics and holograms, light funnels, conical prisms, as well as collecting mirrors.

Emitter types: plasma, lasers, light-emitting diodes.

All light sources may be used for the emitter as long as they are capable of being modulated either directly or indirectly. Direct modulation is defined, in the case of a laser, to be that the laser cavity or other intrinsic property is modulated electrically by appropriate circuitry. Indirect modulation is defined to be that an external modulation device such as an electro-optical absorber or acoustic-optic modulator is coupled to (e.g., placed above) the light-emitting element so that light leaving the emitter can be modulated before it is fanned out to reach the receiving elements.

The invention can include the use of specific purpose elements in the fold-back optics. Specifically, the invention can use prisms or diverging lens or diffractive optics to shape and expand the emitter output so that, after reflection, it illuminates the collecting-lens array uniformly as possible and with little or no light spilling over the edges of the collecting-lens array.

The invention can include extending the folded optics in broadcast into a spill over mode. Specifically, the invention can include adjusting the fold-back optics so that sufficient light from one or more lightnodes is reflected past the collecting-lens array. Any light uncollected and unfocused by the emitting lightcube can then be used to communicate, edge-to-edge, with another lightcube or other device such as i/o devices or other processing elements.

The invention can include wavefront compensation. When communicating at high data rates, a wave front correction should be made so that light arriving at the edge or corner of a lens reaches the intended receiver within the same time interval as light passing through the center of the lens. As these geometrical distances are different, arrival times of a wave front will be different. A signal of sufficiently short duration would have its shape spread out in a time longer that the duration of the signal. Thus, one signal pulse could be confused for another signal pulse. Such a situation could arise for a system with large lenses or short signal pulses.

The invention can achieve wave front temporal compensation by including placement of a conical refractive element above or below each converging lens in the lens structure. Light travels more slowly in a material with an index of refraction greater than 1 than it does in air (having an index of refraction only slightly above 1). Typical transparent materials (glass, plastics) have indices of refraction between 1.3 and 1.9. All of these materials can be configured in a conical shape where the material is thicker at the center than at the edges, forcing light traveling through the center of the lens to pass through more optical material than light at the edges, thus compensating for the longer geometrical distance covered by light passing through the edges of the lens. Such a conical element affects the focal properties of the lens structure and should be taken into account during the design phase of the lens structure.

Since the temporal dispersion of the light wavefront grows as the size of the lens aperture, another way compensate for such temporal dispersion is to restrict the aperture of the collecting optic. A compensating increase in emitter power should accompany the loss in light intensity at a receiver.

The invention can also achieve the same effect by using a flat plate of optically graded material where the central portion has a higher index of refraction that the outer portions. The grading of the index of refraction can be continuous to precisely compensate for the time differential in wave front arrival. The lens structures themselves may be made from graded material and the design process would have two control parameters to consider. In addition to the focal properties of the lens, the wave front properties should be taken into account during the design process.

The invention can include the broadcast of information contained in a wavefront or the broadcast of a wavefront itself. A wavefront is any measurable physical change in the property of a wave. A wave is a physical phenomenon that is describable by a wave equation. Examples are acoustic waves (both in bulk and surface) and electromagnetic waves (radio-frequency waves and light). Measurable physical changes may occur in the amplitude, intensity, polarization, phase, and frequency of a wave. Any of these properties may be used to carry information by appropriate modulation techniques.

Additional Embodiments of the Invention

The invention can include a general approach to achieving the results of the above described optical implementations. These embodiments of the invention relate generally to the field of fully connected interconnects for computer systems and communication systems and/or their subsystems as well as networks and/or their subsystems. More particularly, these embodiments relate to a non-blocking, all-to-all, congestion-free interconnect for communicating between multi- or parallel processing elements or other devices requiring tight message coupling.

Overview of Method

Let n be the number of endpoints served by the interconnect and k be the number of endpoints per physical group or module, where there are m modules in the system served by the interconnect. Choose n and k such that k divides n (not essential, but easier to describe).

Figure 30:
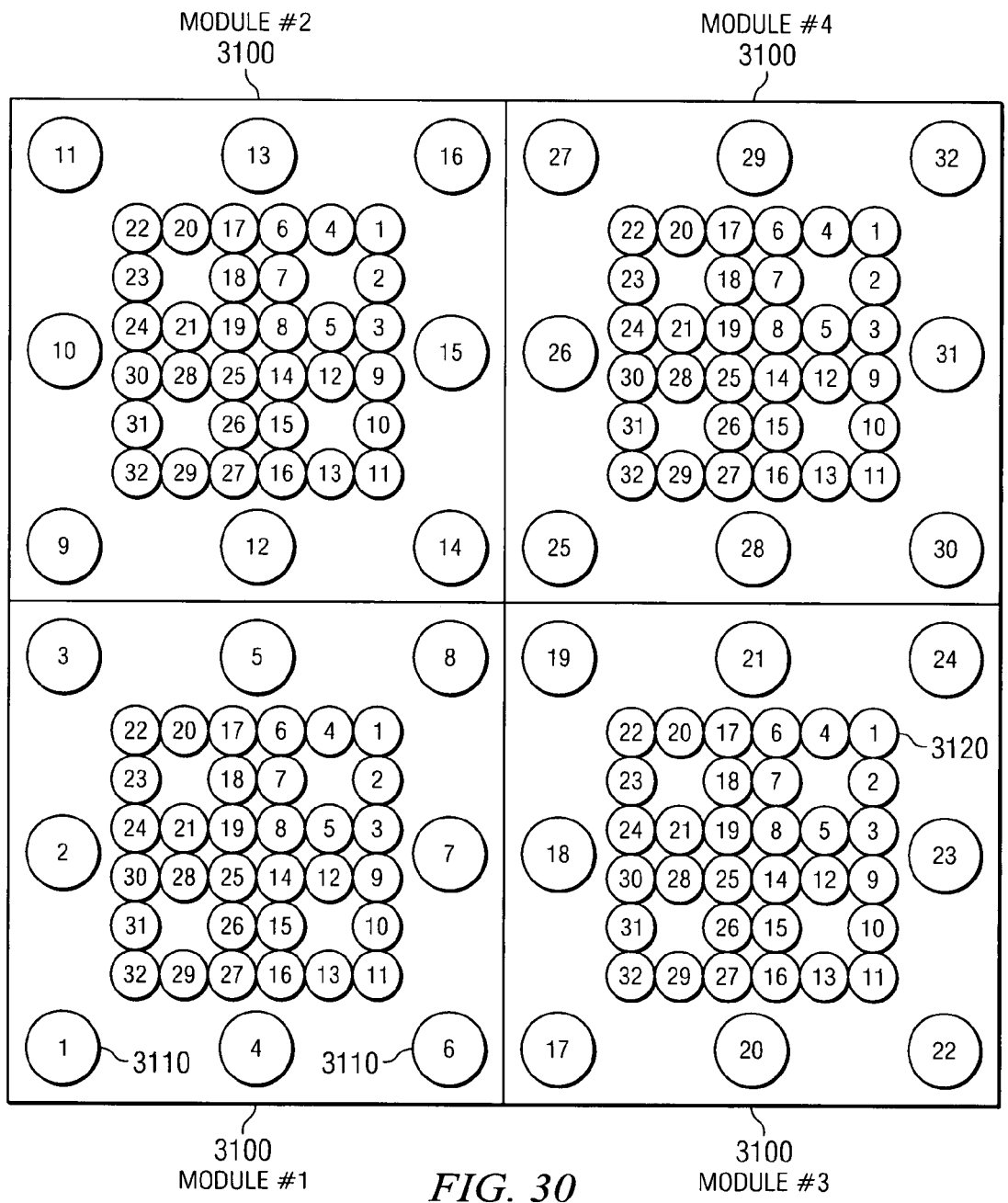
FIG. 30 is a schematic view of a transmitter-to-receiver mapping for an 8-way, 4-module interconnect, representing an embodiment of the invention.

A particular preferred embodiment consists of an 8-way, 4-module system with k=8 nodes or endpoints in each of the m=4 modules resulting in n=32 nodes in the interconnect. Referring to FIG. 30, the four squares 3100 labeled "Module #1" through "Module #4" represent the groupings of nodes and receiving stations into physical modules. Circles 3110 represent the four sets of 8 nodes and each circle is labeled with an index from 1 to 32. Each receiving station 3120 is labeled with a number corresponding to its transmitting endpoint node. Thus, circle 3110 with label 1 represents a broadcast channel that sends messages to receiving station 3120 (small circles) with label 1 in each module 3100 labeled "Module #1" through "Module #4". It is clear that any convenient grouping of transmitters and receiving stations can be considered to comprise a module and that any number of modules can be assembled into a system of grouped nodes or endpoints. This modular construction is capable of subsuming any number of endpoint nodes and is expandable module-by-module. As long as a module contains a sufficiency of receiving stations, the expansion can continue until other physical limits are reached.

In general, a module of the disclosed invention has provisions for n receivers so that a message from a particular transmitter is received in each module at a dedicated and corresponding receiver. Thus, a 32-endpoint system with 4 modules has 8 transmitters per module and 32 receivers per module. The system total is 32 transmitters and 4×32, or 128 receivers.

Since a message from a given node, say node 3110 labeled 1 in module 3100 labeled "Module #1", could be destined to any of the 32 nodes 3110 in the preferred embodiment, there must be a structure and/or process of directing any message to any or all of its possible destinations. Such a structure and/or process is associated with filtering logic located at receiving station 3120 in each module. As an example, suppose a message reaching receiver 3120 labeled 16 in module 3100 labeled "Module #1" is meant for node 3110 labeled 6. First, note that this message must have originated at node 3110 labeled 16 in module 3100 labeled "Module #2" since destinations labeled 16 can only receive messages from transmitters labeled 16. A message need not contain origination information as the latter can be added locally in the receiving station by the logic associated with each receiving station. The packet leaving receiving station 3120 labeled 16 is potentially passed on to a queue serving each of the 8 nodes in module 3100 labeled "Module #1". However, decoding logic at the receiving station examines the packet header. If the packet is destined for none of the nodes 3110 in module 3100 labeled "Module #1", it is simply dropped at the receiving station. If the packet is destined for only the node 3110 labeled 6, it is routed to the queue serving that node. If it is destined for a group of nodes within module 3100 labeled "Module #1", it is sent in parallel to that group of queues. In summary, transmitting node 3110 labeled k for $1 \leq k \leq 32$ sends its messages to each of the four receiving endpoints 3120 having the same label k in each of the four modules 3100.

Receivers 3120 represent the second stage of information fan out discussed in this disclosure, as will be explained below. Queues associated with each node or endpoint 3110 of each module 3100 are physically and electrically close to the node ports, discussed below, allowing efficient flow-control information to be inserted into message output queues for transmittal to the fabric.

The problem solved by the invention is to efficiently transmit and direct messages from the input layer to the output layer. There is no routing or path selection occurring at any point in either the input layer or the fabric, thus, there are no switches within the interconnect. Decision logic in the output layer at each receiver provides a simplified form of routing by opening a normally closed gate, depending on the destination header decoded at the receiver, to one or more endpoints locally situated in the destination module. There is no routing or path selection required to direct a message to a module since any message sent to the fabric arrives at all modules simultaneously.

The input layer, described below, closely follows the usual approach to interconnect technology; there are differences in the details of the complexity of the header added to each frame or flit and similarities in that buffering and flow control from input buffers back to the transmitting nodes are used. The fabric layer, also described below in detail, contains no hardware other than a fan-out structure and/or process; that is, there are no buffers, no switches, and no routing in the fabric layer. The output layer, described below in detail, has approximately the same complexity as the input layer in that packet buffering, header decoding, and path gating are all required.

Physical realizations of serial message multiplexing that form the basis of implementing the disclosed invention include the two broad categories of (1) physically confined channels and (2) free-space or unconfined channels. Physically confined channels may be implemented using electrical or RF pulses over wires, differential pairs, shielded cables, circuit-board traces, waveguides, and other structures and/or process. There are also optical implementations of physical channels as fibers, light pipes, and etched channels in conductive or non-conductive materials. Free-space channels include free-space optical transmissions as well as RF, microwave, terahertz beams, as well as acoustic beams or pressure waves, which might find application in a mechanical control system.

Fan-out structure and/or process for the various physical channels are based on the physics of the particular medium consistent with distributing confined and free-space energy. For example, optical fan out can be effected with lenses, multiple-faceted optical elements, branching light pipes (optical wave guides), diffractive elements, holographic optical elements, photonic structures, and so on. In the electrical case, the standard multiplexer structure and/or process provides the fan-out function, as do a set of buffer amplifiers (the output channels) excited by a single source (the input channel). In the RF and microwave instances, fan-out is accomplished by standard signal splitters, wave guides, and other structures and/or process commonly employed. In the terahertz realm, fan-out is accomplished by MEMS wave guides and larger-scale photonic structures. Acoustic fan-out is accomplished by simple channel (physical tube) branching much as in a water-distribution system.

The connectivity achieved by the disclosed method is equivalent to a bi-directional, fully connected, non-modular network since every node in the system can send messages to every other node simultaneously. While both methods (modular and non-modular) scale as n-squared, the practical reduction in complexity for the modular case is given by the factor 1/k. With k even as small as 8, the reduction in size, power and number of components can be substantial. Contrast this to a system where k=1. Here, there are 32 transmitters and 1024 receivers. If receivers and transmitters require about the same amount of space and power, the k=8 system will be about 6.6 times smaller and require about 6.6 times less power.

Figure 31:
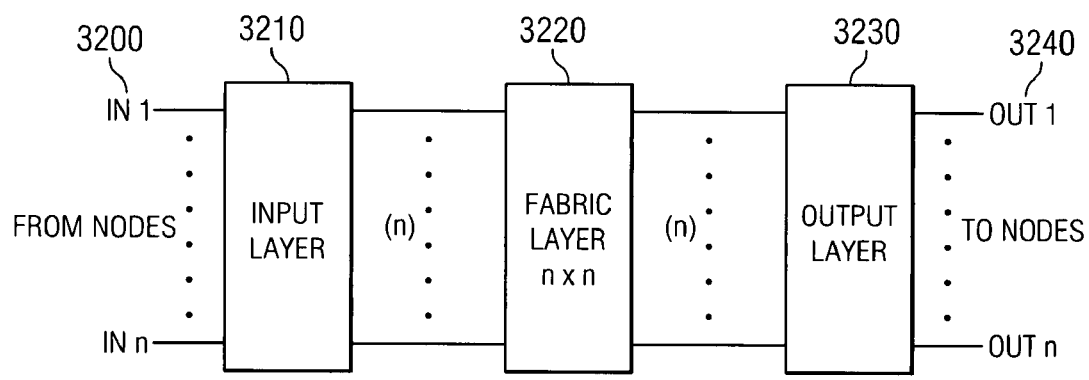
FIG. 31 is a schematic view of the conventional three layers of an interconnect, appropriately labeled "Prior Art."

A typical interconnect (prior art) is depicted schematically in FIG. 31 where inputs 3200 labeled "In 1" through "In n" from n nodes or endpoints are connected to the input layer 3210. This layer typically contains buffers and logic to decompose messages into frames or flits and attach appropriate destination headers to each flit before passing them on to the fabric layer. The fabric layer 3220 accepts prepared flits from each of the n nodes and distributes said flits according to appended routing information. Output layer 3230 receives the flits, whose headers may be altered by logic in the fabric (prior art), and effects any necessary buffering, flow control, flit routing, header removal, error correction and checking, and flit ordering as may be necessary. Output layer 3230 sends the messages reassembled from flits, stripped of routing information and any error-correction/detection bits, to the endpoints or nodes 3240 labeled "Out 1" through "Out n."

FIG. 31 represents an "unfolded" block diagram of the interconnect. That is, a folding of the diagram about a vertical line through the midpoint of fabric layer 3220 would place inputs 3200 adjacent to outputs 3240, more closely representing the physical configuration of an interconnect between n nodes, each having an input port and an output port.

Figure 32:
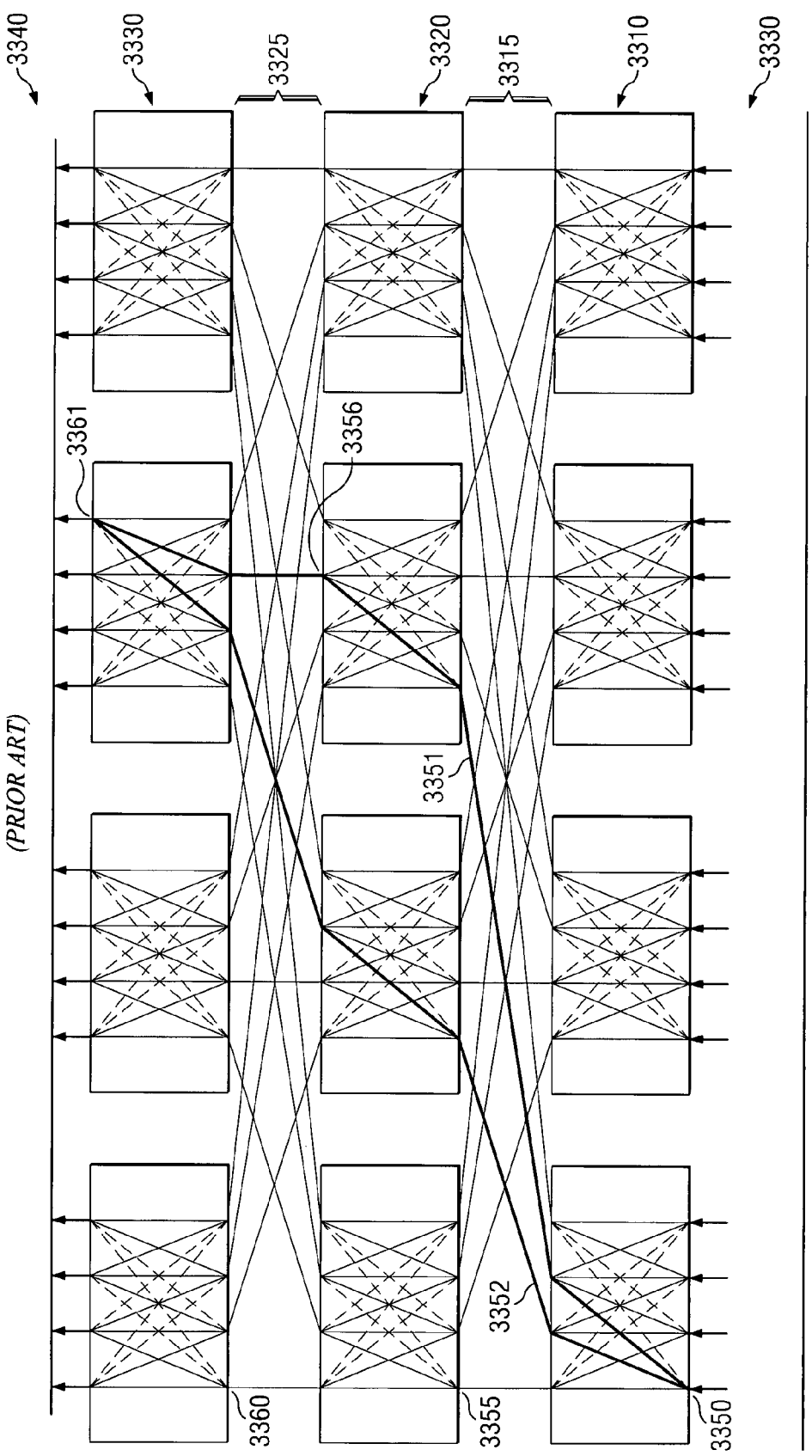
FIG. 32 is a schematic view of a multistage fabric, appropriately labeled "Prior Art."

FIG. 32 depicts a particular type of layered fabric (prior art) that exhibits full connection in that every node is connected to every other node by structure and/or process of one or more "hops" or path segments. Inputs 3300 are the inputs to the fabric (in this example, n is equal to 16). Each of the three layers in the illustrated fabric consists of four 4-way switches. Each switch, as noted above, necessarily has routing, internal flow control, and buffering (storage queue) as needed. The first fabric layer is at the bottom of the figure and receives inputs 3300 from the input layer 3210 of FIG. 31. In FIG. 32, n is equal to 16 by way of illustration. Each 4-way switch 3310 in this layer has 4 inputs (indicated at the bottom of each box) and 4 outputs at the top of each box. The switch outputs 3315 are connected as shown to the inputs of the next (middle) layer of four 4-way switches 3320. The connections 3315 between the two layers are arranged so that a flit from any of the 16 inputs 300 can be routed to any of the four 4-way switches on the second layer. The middle layer comprised of switches 3320 likewise has 16 inputs served by the connections 3315. Each 4-way switch 3320 in the middle layer has 4 inputs (indicated at the bottom of each box) and 4 outputs at the top of each box. The connections 3325 between the middle layer and the top layer are arranged so that a flit from any of the 16 inputs of the middle layer can be routed to any of the four 4-way switches in the top layer. The top layer comprised of switches 3330 likewise has 16 inputs reached by the connections 325. Each 4-way switch 3330 in the top layer has 4 inputs (indicated at the bottom of each box) and 4 outputs at the top of each box which are the fabric outputs 3340.

Routing switches in the switch boxes 3310, 3320, and 3330 are indicated by the 4-way branching 3350, 3355, and 3360 in 4 places in each of the 12 switch boxes. As an example, suppose node 1 is to send a flit from its corresponding position in the input layer 3210 of FIG. 31, which has decomposed a message into a sequence of directed flits. The flit in question enters input 3300 in the left-most switch box 3310 where it can be routed by routing switch 3350 to any of the four outputs of that switch box. Suppose the destination is for node 12 (output 3340 that is twelfth from the left). There are four possible routes from the first layer to switch boxes 3320 in the second layer via those connections 3315 that leave the left most switch box 3310. Suppose a particular path has been selected by the routing mechanism or algorithm directing the flit to the third switch box 3320 from the left. The flit then has only one choice to reach output 3340 ($12^{th}$ from the left), namely it must pass through the middle layer switch box 3320, third from the left, to the top layer switch box 3330, third from the left. This situation is indicated by the bold-marked pathway 3351.

Suppose that another flit is using exit port 3361 in the top layer (there are four paths leading to this port and any one may be used at any time). The flit of interest must then be delayed (temporarily stored in a queue) at port 3361. If the flit queue at port 3361 is full because of multiple flits attempting to access that port, the flit of interest is either discarded and later retransmitted, or a flow-control message must be sent back through the fabric requesting that the flit of interest be temporarily stored at an exit or entrance port or fan-out location in a lower layer.

A more serious situation develops when port 3356 in the middle layer is occupied with traffic prior to the flit from input 3300 at the far left being injected into the fabric. Alleviating congestion at such a port 3356 can slow down any traffic flowing through such a port 3356. However, there are three other routes through the middle layer; bold path 3352 represents one of the alternate routes. A global-flow algorithm could manage such a situation and keep messages flowing at an optimal rate (reduced by the algorithm routing and storage delays). On-the-fly re-routing can also be used where an alternate path is chosen once the congestion is noted presuming local storage is not available. That is, the flit must "back up" one layer and select another route. Of course, the same situation can occur on the new route. In addition, the flit can now be the cause of other flits being delayed or seeking alternate routes. In this way, congestion can back up into all switch-box exit ports below or at the level of the original port 3356. If this happens, the global situation must be detected and all traffic halted until the fabric congestion dissipates by all queues emptying according to their normal operating structure and/or process.

Flit queuing, detection of congestion, and switch routing all require specific hardware within the fabric and efficient algorithms to manage congestion any time such congestion arises. In fabrics serving a few tens of nodes or more, the type of algorithm employed may well depend on the details of the traffic and, hence, on the particular applications being run on the computing nodes. Adaptive control algorithms provide a partial solution to this particular problem. Often the expense of the additional in-fabric hardware and maintaining the software required for traffic management can prove to be a significant fraction of the installation cost.

FIG. 32 represents an "unfolded" block diagram of a layered fabric. That is, a folding of the diagram about a horizontal line through the midpoint of fabric layer 3330 would place inputs 3300 adjacent to outputs 3340, more closely representing the physical configuration of a fabric fully interconnecting n nodes, where each node has an input port and an output port.

The invention can include apparatus for effecting a non-blocking, all-to-all, congestion-free interconnect for communicating between multi- or parallel-processing elements or other devices requiring message coupling. Each endpoint has an associated input serial-data channel that is shared among multiple endpoints in the output layer. Each endpoint contains decoding logic and data-storage buffers. This approach eliminates congestion spreading while retaining the advantages of an all-to-all fabric. The resulting interconnect is equivalent to a one-hop, n-squared, fully connected fabric with endpoint-local distribution.

The invention can include methods of broadcasting messages over multiple serial data channels wherein each serial data channel originates at a single node or endpoint. Each serial channel then delivers said messages to a plurality of nodes or endpoints by branching in a manner consistent with the physics of the information carrier (e.g., light, RF energy, electrical pulses). In this manner, a single serial data channel is shared among multiple receiving endpoints where each endpoint contains decoding logic as well as data-storage queues and routing logic to effect desired distribution of the received messages. The invention can emulate a virtual, circuit-switched network, but directly supports a particularly simple version of packet switching without routing in the distribution fabric.

Past approaches to a fully connected network of n nodes have used $n^2$ transmitters and $n^2$ receivers. The modular approach (or endpoint grouping) used in the present invention reduces the required number of transmitters of such a network by a factor of n (to n) and the number of receivers by n/m (to nxm), where m is the number of modules or physical groups. Each modular grouping consists of n/m transmitters and n receivers and the modules are of a convenient physical size that electrical interconnections between components comprising a physical group or module are simple to engineer and have paths short compared to the total interconnect latency.

The network uses a packet-directive scheme wherein flits have only a destination header. This scheme is to be contrasted with routing methods. The disclosed interconnect does not require that routing information be added to packets; in particular, multi-layer routing information is absent. The destination header is only used after the message has traversed the fabric to the output layer; there is no in-fabric routing or destination routing required or used in the present invention. Instead, each serial channel branches locally within or before the destination module with a multiplicity equal to the number of endpoints in the module. At the end of each branch of each serial channel, packets are locally distributed to endpoints within the module as indicated by the destination header.

At the heart of the invention is a single serial data channel that may be shared among multiple endpoints. Each endpoint contains decoding logic and data-storage queues. The serial data channel has many possible embodiments in that the concept supports and is consistent with any structure and/or process of physical channel and is valid for free-space optical channels, electrical channels, fiber and light-pipe channels as well as any other structure and/or process of transmitting and receiving information over a communications channel, such as RF and microwave.

The resulting fabric allows efficient flow control, both at the input-layer and output layer since the modular input layer is closely coupled (electrically or by other structure and/or process) with the output layer. In the disclosed invention, flow control is an interaction taking place between local partitions or modular groupings of the output and input layers, which are physically adjacent within a module. Such an interconnect is one hop with no switches, queues, routing, and flow control within the fabric and the modular concept allows inputs and outputs to be physically close, global control is not required. Flow-control issues are detected locally, within a module, and a flow-control message is sent to the fabric and broadcast to all nodes, where local action can be taken as necessary. In addition, locks, barriers, tags, and real-time clock synchronization are all possible to realize in an efficient manner within the fabric, making possible a real-time, transaction-based, multiprocessing system.

Conflicts can occur only at the endpoints and are managed by flow control and message queuing. There is no allocation of receiver cycles, which would require a completely synchronous system. The standard method of receiver sharing is essentially a TDMA approach demanding some sort of global control and control data structures, which are simply not required in the present invention.

Congestion spreading into or within the fabric cannot occur because (1) there are no switching branches in the fabric to be blocked and (2) a flit cannot be blocked from being queued.

An interconnect built in the described fashion overcomes all of the problems listed above. That is, the invention discloses a structure and/or process of obtaining a congestion-free interconnect that directly supports, by its architecture, broadcast, multicast, and all-to-all message passing without the use of global flow control. In addition, efficient and effective conflict resolution is enabled by the modularity and flow-control information local to each module. Multicast is the native message-passing mode of the disclosed interconnect; that is, a multicast transmission is equivalent, in its simplicity, to a point-to-point transmission.

Figure 33:
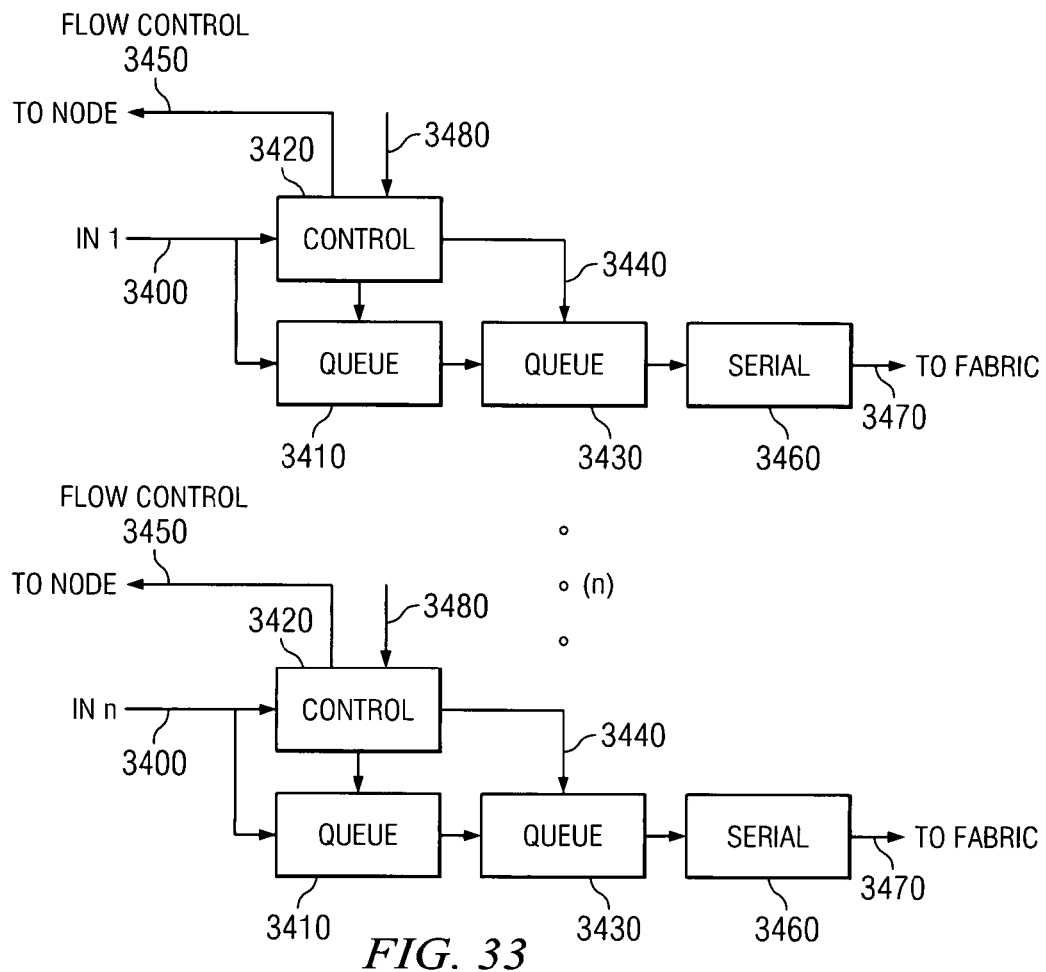
FIG. 33 is a schematic view of an input layer showing serialization of messages, representing an embodiment of the invention.

Referring to FIG. 33, the input layer consists of n channels for converting parallel messages into serial flit streams. Input 3400 from nodes labeled "In 1" through "In n" send a message, typically over a parallel data bus, to a FIFO (first-in-first-out queue or buffer) 3410 for temporary storage. Destination information as well as other information such as message length, process origin, message type is received by the control 3420, which both segments the message into flits and passes data a flit at a time from message queue 3410 to flit queue 3430. Control 3420 also constructs a header for each flit and any other flit-dependent information such as parity or CRC (cycle redundancy check) bits for downstream checking and verification of flit integrity. Control 3420 then allows the "bare" flit to pass to queue 3430 where the header and CRC information are added by auxiliary line 3440. Control 3420 also monitors the state of queue 3410 and is able to alert the node by line 3450 of any potential buffer overruns, serving as an input-layer flow control. A fully prepared flit with appropriate destination header, CRC check, and other desired information then passes to serializer 3460 where it is 8 bit/10 bit-encoded (if desired) before passing into the fabric as a sequence of individual serial pulses through port 3470.

Flow control information from the output nodes corresponding to the input nodes 3400 is presented to control 3420 by connection 3480. In the preferred modular embodiment illustrated in FIG. 30, each network endpoint 3110 contains a message queue 3410 for out-going messages and a flit queue 3430. Flow control information from the output queue (discussed below), can be inserted at the front of the flit queue 3430 for immediate or next-flit presentation to the fabric. That is, the flow-control mechanism allowed by the disclosed invention makes direct use of the fabric, ensuring that no extra-fabric structures are required.

A particular innovation of the present invention is that flow-control information represented by lines 3450 (to the transmitting node) and 3480 (from any receiving station associated by routing information at the receiving end to the transmitting node in question) is either entirely local in nature by being associated with the same node or is sent out over the fabric by control 3420. This innovation will be discussed in greater detail below.

Figure 34A:
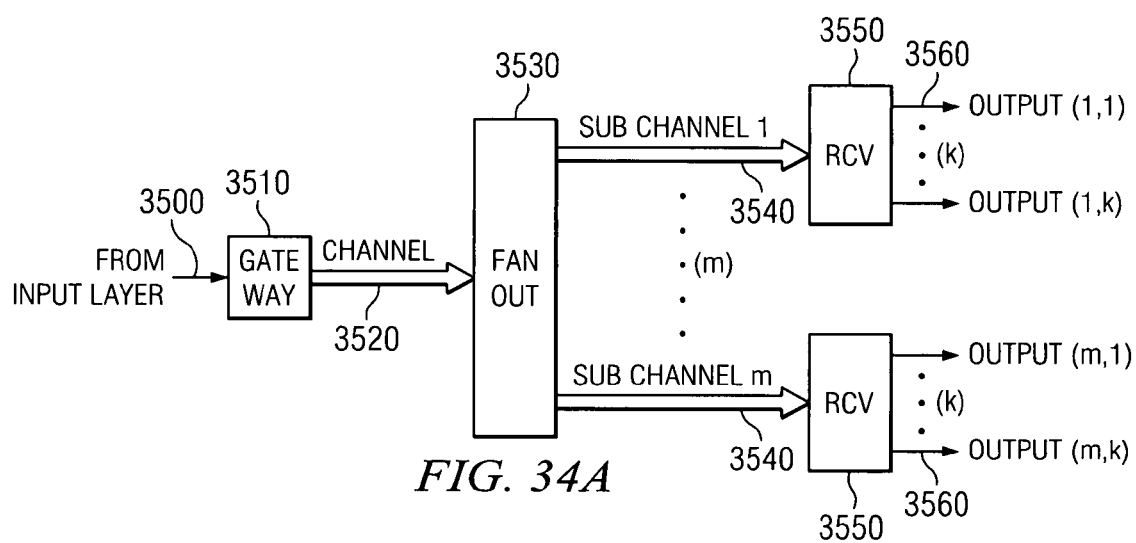
FIGS. 34A-34D are schematic views of a multicast channel showing two levels of branching and subsystems thereof, representing an embodiment of the invention.

The invention can include a branching multicast channel, thereby enabling a multicast native operating mode. FIG. 34A depicts a single multicast channel, of which n such channels comprise the fabric layer. Said channel is the primary focus of the present invention. Each input 3500 to each multicast channel represents a serial stream of encoded bits (the prepared flits from output 3470 of FIG. 33). This serial stream, in the preferred embodiment, typically consists of, but is not limited to, electrical pulses. This is conventional, since the output of the computing endpoints or nodes, as well as the entire input layer depicted in FIG. 33, are typically high-speed electrical devices where information is encoded in serial and parallel electrical signals such as found in present-day electronic processing systems.

The stream 3500 of electrical signals is presented to gateway device 3510. In an electrical-only embodiment, as typically found in most interconnects in use today, device 3510 would be a driving or buffer amplifier that suitably matches the impedance of the source stream 3500 to the physical characteristics of the communications channel 3520, allowing gain as required to boost the power level for servicing multiple endpoints. In the optical case, communications channel 3520 may be realized as any of several physical structure and/or process. Included, but not limited to such structure and/or process are the free-space optical methods as well as fiber-bundle channels consisting of one or more optical fibers or optical light pipes that confine the optical signals. Other forms of energy transfer, such as microwave, terahertz wave, as well as standard RF-band energy (from kilohertz to gigahertz) will be recognized as being viable forms that are subsumed by this disclosure. A valid reason for using RF-channel transmission would be that the various modulation techniques as disclosed in U.S. Pat. No. 7,136,419 entitled Pulse width communications using precision timing, the entire contents of which are hereby incorporated by reference herein for all purposes, as well as standard modulation techniques such as amplitude, phase, and frequency modulation as well as the various spread-spectrum techniques may be used to achieve increased channel bandwidth beyond that of the prevalent pulse amplitude modulation (PAM) encoding.

Channel 3520 branches by fan-out structure and/or process 3530 into a plurality m of channels 3540, one of each channel 3540 is directed towards one of the m modules 3100 of FIG. 30. In the preferred optical embodiment, fan-out structure and/or process 3530 is a spreading lens fabricated such that all modules are illuminated or faceted distributing lenses directing a portion of the light to each module. In the electrical case, device 3530 is a standard fan-out component, typically a multiplexer. In the RF, microwave, or terahertz case, device 3530 is a splitter of suitable design for the particular frequency being multiplexed (an example is the TV-signal splitters often found in homes having more than one device requiring a TV signal). Returning to the optical case of the preferred embodiment, device 3530 can be implemented by any optical device capable of splitting a beam of light into multiple beams. Devices commonly used for such optical multiplexing are diffractive elements, holographic optical elements, and beam splitters. Another way of effecting fan-out device 3530 in the optical embodiment is the use of a fiber bundle for channel 3520. The fiber bundle is then subdivided into m smaller bundles, producing the desired distribution of a single optical channel to m secondary channels. It is clear that the number m of branches 3540 is not restricted to 4 as was chosen for preferred embodiment. Any convenient number greater than or equal to 1 produces a functional interconnect. As the number of nodes n increases, it becomes impractical from an electrical or board- or chip-level standpoint to increase the number k of nodes per module beyond some small integer such as 8 or 16. This implies that an increasing number of nodes n must be accommodated by an increasing number of modules m.

The invention can include a passive fan-out device. It is one of the principle innovations of the present invention that such division or splitting of channel 3520 by fan-out device 3530 into m multiple channels 3540 contains no switches, no queuing or buffering, no direction or routing specification or hardware, and no flow control. In the preferred embodiment, device 3530 is completely passive in that respect. It may be seen, however, that the disclosed channel splitting is consistent with control of device 3530 by electrical signals or optical signals to effect dynamic alterations in the function of fan-out device 3530 nor does the present disclosure limit the operation to a purely passive device.

The invention can include local connectivity within modules or groups. It is another principle innovation of the present invention that the branching into m channels is directed towards the m modules or local groups of endpoints. A cost advantage of this grouping was explained above. A key advantage of this grouping is that flow control no longer needs to be global in nature since the components in each module are electrically close to each other. Nodes grouped in a module can communicate between themselves, as needed, electrically with low latency and minimal congestion. Nodes in other modules communicate exclusively via the fabric. Nodes within a module typically communicate via the fabric also, but the possibility of extra-fabric communication is present and is available for either increased in-module bandwidth and communication channels other than to the fabric (for example, to support external I/O devices).

Sub channels 3540 labeled "Sub Channel 1" through "Sub Channel m" each contain the same information as in the main channel 3520. Each sub channel 3540 is directed towards a module 3100 of FIG. 30 labeled "Module #1" through "Module #4" in the depicted preferred embodiment. Each module has device or receiving station 3550 for each of the n sub channels directed to that module. In the preferred embodiment, receiving stations 3550 comprise photo detectors, trans-impedance amplifiers, and multiplexers mounted on the same plane and near to the gateway 3510 containing lasers or light sources. In an electrical embodiment, the receiving station 3550 consists of a buffer amplifier to drive the multiplexer. The multiplexer in receiving station 3550 further subdivides the channel into k additional sub channels 3560. Information flows from receiving stations 3550 to the m×k output channels 3560 labeled {1,1} through {1, k} for group 1 and {m, 1} through {m, k} for group m, where each set of labels {i,j} for $1 \leq j \leq k$ indicates connections residing in or directed towards module i, depending on the particular physical implementation.

Each of the n multicast channels, one of which is depicted in FIG. 34A, effects a 1×m×k fan-out separated into m groups of k end channels in a group. In the preferred embodiment where n=32, k=8, and m=4, each multicast channel provides a 8×4=32 way, parallel splitting of the data stream, where each of the 32 sub channels carries the same information as the original channel.

Fan-out device 3530 can be configured to produce a continuous branching (beam spreading). In the optical embodiment, a negative lens or a directing wedge can be used as taught in disclosure A or a wide-beam antenna in the RF, microwave, or terahertz realizations. Devices 3530 may also be carrier-conversion devices such as optical-to-electrical, electrical-to-optical, or any combinations thereof and still maintain the purpose and function of the disclosed invention.

Likewise, connections 3540 and 3560 between conversion devices 3530 and 3550 need not support the same form of physical carrier.

In the optical embodiment, devices 3530 and 3550 may support or contain optical-gain structure and/or process (optical amplifier such as erbium-doped glass or a powered optical-electrical-optical conversion devices). This would allow the information to be subdivided into many sub channels without requiring a single powerful laser or light source in device 3510. This is the optical equivalent to placing booster amplifiers in an all-electrical fabric. The importance of incorporating optical amplifiers or buffer amplifiers in the fan-out or splitting structure and/or process 3530 is that the multicast fabric disclosed herein is scalable to a large number of nodes or endpoints, far beyond the example of n=32 used of the preferred embodiment.

The invention can include an interconnect between n and N endpoints where N>n, It is clear to see that channel branching depicted in FIG. 34A is not limited to a single branching layer to the m modules. Multiple fan-out devices 3530 placed at ends of channels 3540 and before devices 3550 can further multiply the number of channels as required supposing need for multiple output layers 3230 of FIG. 31. A useful example would be where multiple output layers required information from the same input layer 3210. The resulting interconnect would no longer be a symmetric n×n device but, rather, an n×p device, where p is some multiple of n.

The invention can includes the use of alternative carriers; beyond electrical and light. The multicast fabric of FIG. 34A is generic in the sense that it supports many different physical communication approaches (light, radio waves, microwaves, terahertz waves, even acoustic waves). A particular optical embodiment has been presented, but that in no way limits the generic innovation of a multicast channel that branches into sub channels, each directed toward a module or local grouping of endpoints. Each particular implementation based on a particular and useful physical communication channel has the same properties of no in-fabric storage, no in-fabric routing or packet direction, no in-fabric flow control, and no need of global control of the message traffic as a whole.

The branching channel depicted in FIG. 34A contains no buffer or switches. This simple fact eliminates congestion spreading. Each of the n channels comprising the fabric has an input and a m-way branch or fan-out, where m is the number of modules in the system. Each of the m branches serve a single module. Each of the n branches to each module fan out a second time into k paths for a total of n×k possible paths to each module. The total number of paths is then m×n×k=$n^2$ showing that the fabric effects a fully connected, n×n system.

It is obvious that one could run multiple groups of serial channels shown in FIG. 34A in parallel effecting a parallel n-way interconnect from multiple serial interconnects. For example, paralleling 8 or 10 (for data and control) channels, the interconnect would have 8 times the bandwidth. Attention must be paid, using well-known techniques, to any possible skewing between the parallel bits comprising a byte sent across such an interconnect.

Figure 34B:
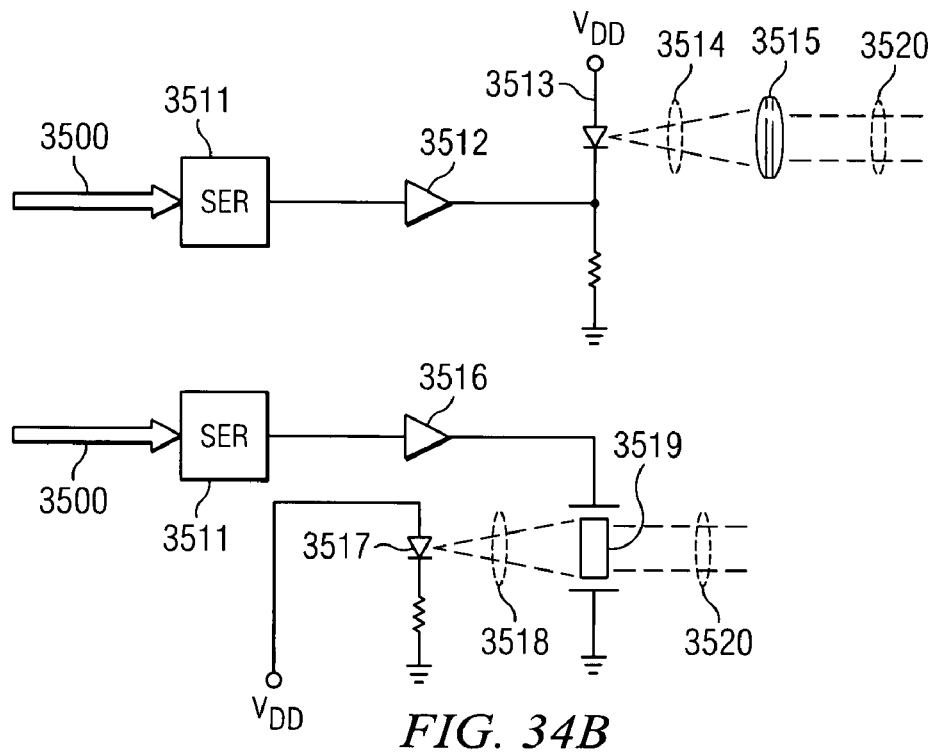
Figure 34C:
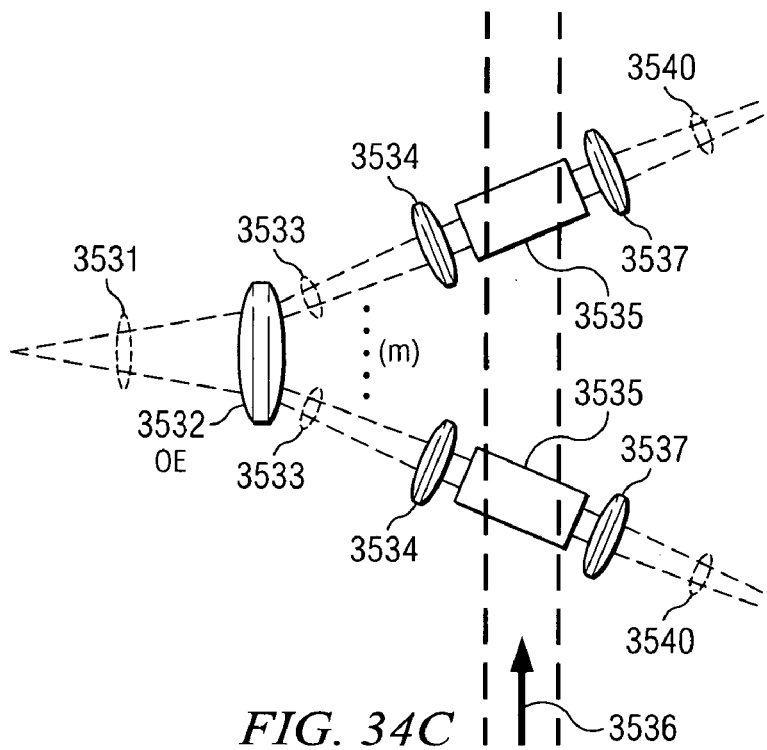
Figure 34D:
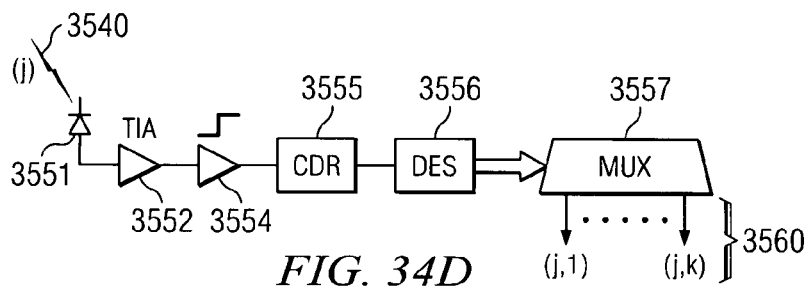

Preferred optical embodiments of 3510, 3530, and 3550 of FIG. 34A are shown in FIGS. 34B, 34C, and 34D. Referring to FIG. 34B, upper panel, serial input stream 3500 enters serializer 3511, a commonly available electronic device for converting a parallel data word into a serial stream of digital pulses, where it emerges as a serial data stream. This serial data stream provides the input for laser-driver amplifier 3512, which supplies the necessary current for modulating the intensity of laser diode 3513, suitably biased as shown. The resulting beam of modulated 3514 light is focused by beam-adjustment lens 3515, if required. For example, the beam shape emanating from an edge-emitting, semiconductor laser typically has an elliptical rather than circular cross section. A suitable aspheric lens 3515 can be used to both obtain a more desirable cross section and the required beam-spread angle for illuminating an optical element in the next stage 3530 of FIG. 34A. The focused, modulated beam is an embodiment of channel 3520.

The lower panel of FIG. 34B illustrates an alternative embodiment based on external modulation. Here, serial input stream 3500 enters serializer 3511 as above. This serial data stream provides the input for driver amplifier 3516, which supplies the necessary voltage for controlling the external modulation device. Light source 3517, typically a diode laser or light-emitting diode operating in the continuous-wave (CW) mode produces a continuous beam of light 3518, which is modulated by external modulation device 3519, producing an intensity- or pulse-modulated beam 3520. Device 3519 may be any of the typically used intensity modulators that are sufficiently fast for the purposes envisioned by the invention. Examples of device 3519 are electro-optic modulators (organic film polymers, lithium niobate crystals) and acousto-optical modulators or Bragg cells (a piezo-electric transducer exciting mechanical vibrations in an optical medium such as glass).

The invention can include in-fabric light amplification for handling more endpoints. FIG. 34C illustrates the preferred optical embodiment of fan out 3530 of FIG. 34A. Cone of light 3531, possibly focused by lens 3515 mounted with laser diode 3513 of FIG. 34B, illuminates optical element 3532 which splits the light into m distinct beams 3533 or spreads out the light so that it can illuminate an appropriately wide field containing lenses 3534. The beams 3533, or alternatively the wide light field, illuminate optical elements 3534 which direct and focus, as necessary, light onto optical amplifiers 3535. Excitation structure and/or process 3536 provides the necessary energy for amplification of beam 3533. Amplified light exits optical amplifiers 3535 and is focused by lenses 3537 into the Sub Channels 3540 of FIG. 34A.

Erbium-doped glass is one way of effecting optical amplifiers 3535; another way is a resonant-cavity optical amplifier based on an electrically pumped semiconductor enclosed in a Fabry-Perot interferometer; another way of effecting device 3535 is by an optical parametric amplifier; yet another way is provided by Raman amplification making use of a nonlinear interaction between the signal 3533 and emission from a pump laser within an optical fiber. Yet another method makes use of the vertical-cavity, semiconductor optical amplifier; this device also requires a resonant cavity with high-reflectivity mirrors to achieve useful optical gain. Each of these devices requires either electrical excitation or optical excitation, indicated by structure and/or process 3536 in the figure. FIG. 34C shows a schematic illustration of pumping or excitation 3536 of the entire set of optical amplifying devices comprising the amplification-fan-out structure and/or process of device 3530 of FIG. 34A.

FIG. 34D illustrates the preferred optical embodiment of receiving station 3550 of FIG. 34A. Sub channel 3540 labeled with index j where $1 \leq j \leq m$ represents a beam of light from fan-out 3530 of FIG. 34A. The light is detected by photodiode 3551 and the resulting electrical pulse is input to trans-impedance amplifier 3552. The amplified signal is then sent to limiting amplifier 3554 for pulse shaping and limiting and thence to clock-and-data recovery device CDR 3555 for phase adjustment to ensure coherence with the clock signal in the receiving station. CDR 3555 typically includes a phaselocked loop or PLL. The recovered and shaped signal then passes to deserializer 3556 where the serial stream of pulses is converted into a parallel data word or byte. The parallel data word then is sent to multiplexer 3557 where it is fanned out to the k outputs 3560, labeled (j, 1) through (j, k).

Figure 35A:
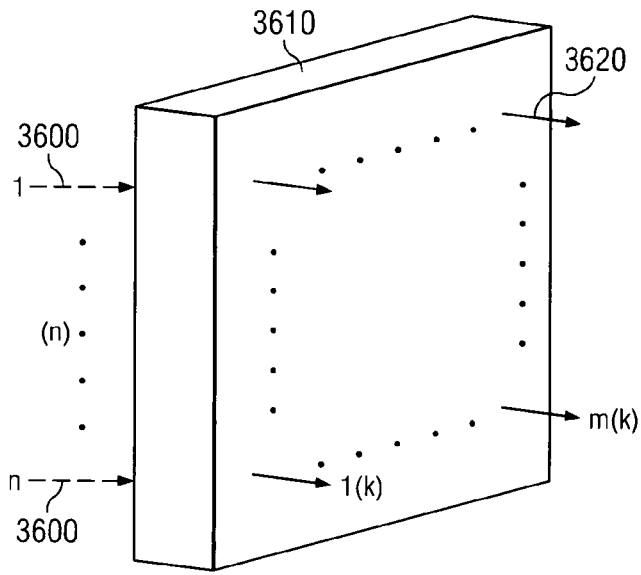
FIGS. 35A-35C are schematic view of a switchless fabric layer illustrating channel grouping, representing an embodiment of the invention.
Figure 35B:
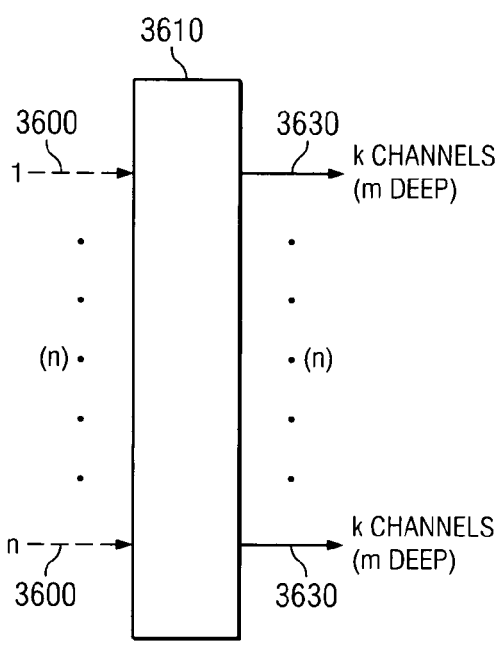
Figure 35C:
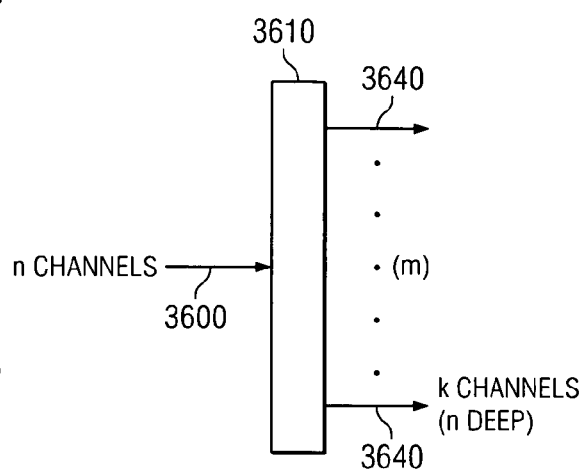

Each of the three views of FIGS. 35A, 35B and 35C depict a mapping of n input channels to n×m×k output channels, illustrating the fully connected, switchless fabric in a purely conceptual manner. FIG. 35A illustrates the fabric in as a 3D configuration. There are n input channels 3600 to the n×m×k interconnect fabric 3610. The outputs of fabric 3610 are grouped into m groups forming an output row 3620. In each group in output row 3620, there are k outputs for a total of m×k outputs in each row 3620. These n outputs 3620 provide n inputs to the interconnect output layer discussed below. FIG. 35B is a side view of the switchless fabric layer with n inputs 3600 to the fabric 3610 branching out to n connection bundles 3630 where each bundle contains m groups (one for each module) of k channels each. FIG. 35C is a top view of the switchless fabric layer 3610 with inputs 3600 representing a stack of n inputs depicted in FIG. 35A. There are m output bundles 3640 where each is n channels deep and each contains k serial lines.

FIGS. 35A-35C are conceptual, depicting an n×m×k fabric in three different views. Each of the input channels 3600 and its internal branchings (not shown) within fabric layer 3610 is realized by the multicast channel depicted in FIG. 34A. That is, the block labeled 3610 contains n multicast channels described by call outs 3500 through 3560 of FIG. 34A. The purpose of FIGS. 35A-35C is to explicitly display the fan-out from n to n×m and thence to n×m×k serial channels.

Figure 36A:
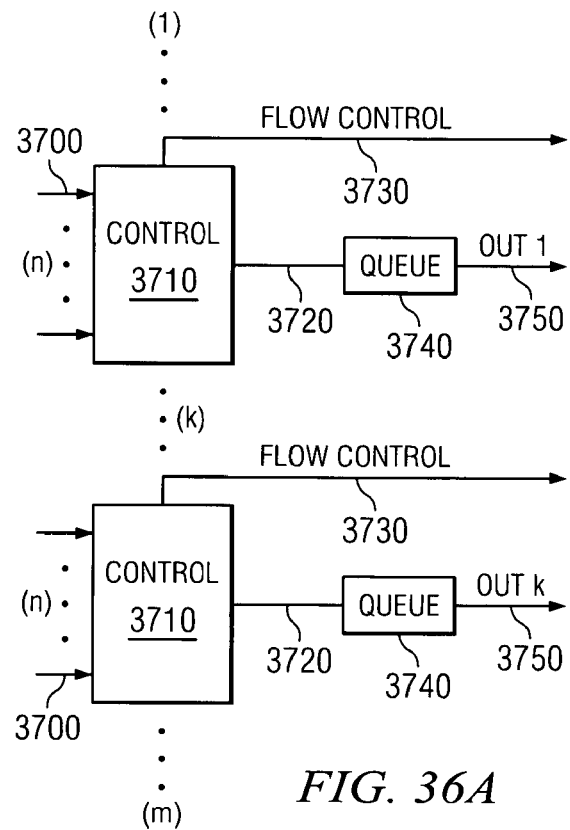
FIGS. 36A-36B are schematic views of an output layer showing local grouping of endpoints, representing an embodiment of the invention.

Referring to FIG. 36A, the function of output layer belonging to module j is shown with module 1 through m indicated by dots. Inputs 3700 in k sets of n inputs in each set provide n×k inputs to each of the m modules. Each group of n inputs 3700 enter control 3710, which converts the serial inputs to parallel words and then assembles words into flits, finally arbitrating and distributing flits, according to destination. If a serial stream entering control 3710 is meant for an endpoint serviced by the particular module control 3710, that flit is allowed to exit control 3710 by line 3720 and be queued for delivery to the targeted endpoint in queue 3740. Data sent to queue 3740 are monitored by the arbiter in control 3710 and flow-control information is sent over line 3730 as described below. Queue 3740 sends either flits or complete re-assembled messages, depending on the precise internal function chosen for control 3710, to target endpoints over outputs 3750.

Figure 36B:
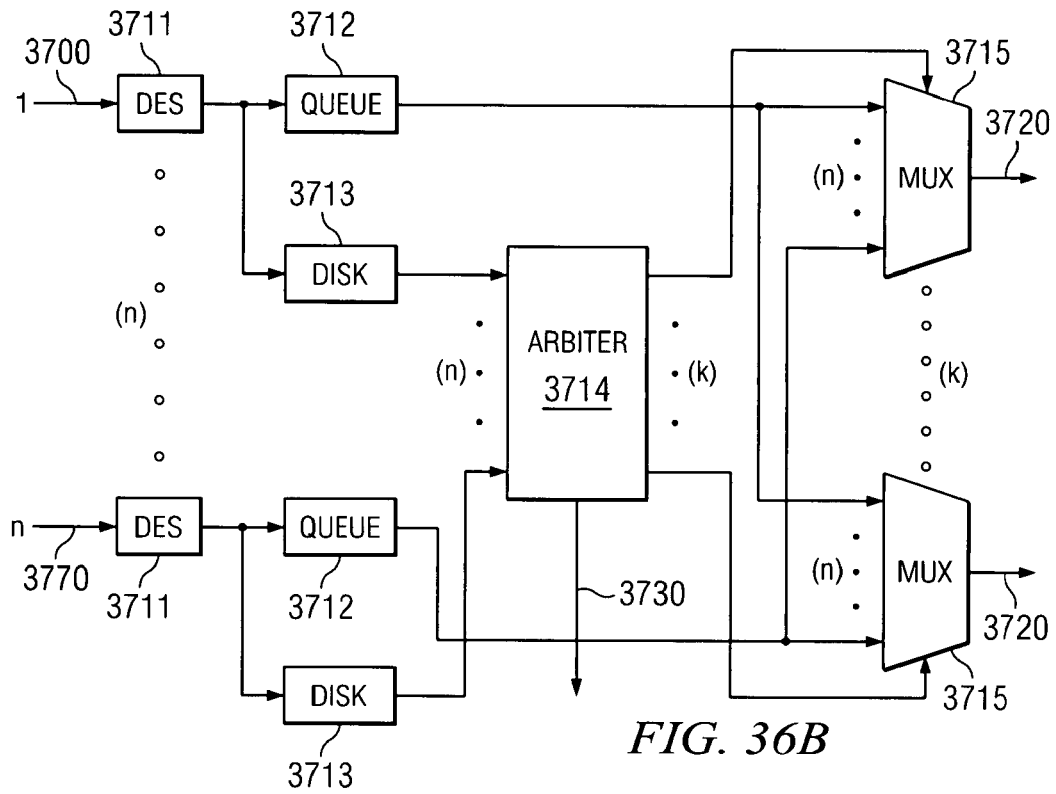

Connections 3730 of FIGS. 36A-36B are made to connections 3480 of FIG. 33 locally, within each module, to provide the basis for a flow control allowing control 3710 of FIGS. 36A-36B to broadcast a control message through the fabric by control 3420 of FIG. 33 located physically adjacent to and logically grouped with queue control 3710 of FIGS. 36A-36B.

The invention can include local flow control distributed back thru the fabric, thereby obviating the need for global flow control. Referring to FIG. 36B, a particular instance of control 3710 of FIG. 36A is shown as comprising, in the preferred embodiment, a set of n deserializers 3711, which convert the serial data streams from the fabric to parallel data words. Discriminators 3713 decode destination headers and send destination information to the arbiter 3714. Meanwhile, the parallel data are temporarily stored in queues 3712, for example, to assemble a complete flit composed of multiple data words. The arbiter 3714 controls the k multiplexers 3715 as to which flits are accepted by which of the k multiplexers 3715, which then allow flits to pass along output lines 3720 to the queue 3740 of FIG. 36A. If there is potential contention due to multiple flits being directed from inputs 3700 to a particular control 3710 in such a manner as to overload a particular queue 3740 of FIG. 36A, arbiter 3714 is designed to detect this potential overload condition and notify the sending node over line 3730 to stop transmission until danger of contention has been relieved by the emptying of queue 3740 of FIG. 36A. Note that such flow control prevents queue 3712, internal to control 3710, from overflowing as subsequent messages over the input channel in question will be halted by the flow control over line 3730 propagating through the fabric to any sending nodes as described above.

Advantages flow from the combination of the two key ideas of (1) modularity or grouping of endpoints or nodes, and (2) switchless channel branching or fan-out. The modularity concept allows local flow control with efficient back flow through the fabric while switchless channel branching ensures that the native mode of operation is multicast. This fact implies that the one-to-all mode is essentially the same as the point-to-point mode. This equivalence is a primary distinction between the present invention and previous implementations of computer interconnects.

Combining the two key ideas allows the last fan-out stage to take place within a module of k nodes rather than over the entire set of n nodes. Thus, the module sizes stays constant even as the number of nodes increases (at least up to some limit depending on the layout of the end-stage circuits as shown in FIGS. 36A-36B). The last-stage fan-out of FIGS. 36A-36B then grows as n rather than $n^2$ and can easily be handled electrically using standard printed-circuit-board techniques even for a reasonably large n. That is, the final multiplicity of paths are local and straightforward to fabricate using standard printed-circuit-board techniques and practices. A practical result of the combination is the elimination of the need for a multilayer interconnect with attendant in-fabric switching, global flow control, message queuing, and hardware routing. This elimination of in-fabric control and hardware is another key distinction between the present invention and other implementations of computer interconnects.

The invention disclosed herein provides a way of completely eliminating congestion spreading while, at the same time, allowing traffic between all system endpoints simultaneously (all-to-all communication) as well as point-to-point and multi-cast communication. The message latency in the disclosed interconnect is the same for multicast (one-to-all) as it is for point-to-point and the latter is at least as efficient in the disclosed invention as it is for presently available, commercial interconnects. The invention provides a non-blocking, all-to-all, congestion-free interconnect for communicating between multi- or parallel processing elements or other devices requiring message coupling.

The potential for contention of access by simultaneous messages or flits at any given endpoint means that some sort of queuing, at minimum, must be done in the output layer. That is, all systems that deal with contention must have queues in the output layer. In previous interconnect implementations, flow control originates in the output layer as well as in each stage of the fabric (the presence of a storage buffer is typically accompanied by flow-control logic). In contrast, the present invention requires only endpoint-local flow control to address the contention problem.

It will be appreciated by those familiar with the operation of computer interconnects that the present invention simplifies the employing locks or barriers (barrier synchronization), transaction tags, and clock synchronization. Furthermore, the operations of scatter (a one-to-many mode where one node sends different messages to different members of a working group), gather (the inverse of scatter), and the variants on the reduction operation are all greatly simplified and performance enhanced by the present invention.

Further Additional Embodiments of the Invention

A properly designed optical system ensures that adequate intensity from any emitter reach its corresponding photodetector (one in each module) and that any other photodetector, other than the intended one, receivers negligible light from that emitter. The goal is to ensure sufficient signal strength at a receiver, resulting in a low bit-error rate and minimizing cross talk between optical channels.

Embodiments of the invention relate to optical design of free-space optical interconnects that include efficient methods of optical fan-out and a closely related method of optical demultiplexing of the combined and merged fanned-out light beams. More narrowly, the invention relates to methods of efficient light distribution and collection within an optical system. This is to be contrasted to the more usual goals of an optical system wherein effort is taken to produce high-quality images. While the system disclosed herein does produce images, their quality is of secondary importance to the efficiency of light collection.

Wide Angle Lens and Optical Distortions

Using simple optics with single-element lenses for the collecting optics and simple negative lenses for the broadcast optics leads to a functional FSOI (free space optical interconnect). However, the array of emitters typically spans an area of many times the area of a module's receiver array. When the mirror distance, or, equivalently, half distance to the focal plane, is constrained to be approximately less than or equal to the linear size of the emitter array, a situation calling for a wide-angle lens results. Using simple lenses, whether spherical or aspheric in design, precludes achieving a flat focal field where the receiver grid is a reduced and registered image of the regular emitter grid. (Regularity of the emitter grid is demanded by a system including interchangeable modules.) A compromise is reached in the optical design (broadcast lenses, mirror, and collecting lenses) where the size of the focal spots, their precise locations, and the intensities at each receiver on a regular receiver grid are varied to achieve an overall best quality of image location, spot size, and receiver intensity. The criterion for this optimum is the lowest possible bit-error rate given a particular emitter power and receiver sensitivity. Thus, efficiency of light collection is paramount.

Practical design of the collecting lenses requires that the numerical apertures (on the side toward the receiver arrays) be held to reasonable values, essentially much less than 1. Equivalently, the f/stop of the collecting lenses should be kept at reasonable values, perhaps above 2. Violating these conditions greatly increases the distortions in the image of the emitter grid, implying poor registration with the array of receivers, as well as shape distortions in individual receiver spots or illuminated regions. This later distortion results in a waste of light energy.

Correcting Distortions

Since a portion of the noted distortions fall into the class of spherical aberrations, typically observed in uncorrected wide-angle lenses, or are of the classic coma distortion of a point source imaged with an off-axis focusing lens, the usual methods of image correction can be applied. However, such corrections typically involve multiple-element lenses that are both difficult to design and expensive to fabricate. An alternate method of overcoming distortions then becomes desirable.

Inefficient Light Distribution

A collecting lens with a small numerical aperture typically has a small diameter relative to the distance to the receiver array. This implies that the area of the collecting lens is typically considerably less than the area of the module being illuminated by an emitter. In a module with eight emitters, there are eight broadcast lenses and one collecting lens. Considerations of beam divergence from the emitters and the noted restrictions on apertures of the collectors implies that the ratio of the area of a collector to the area of the face of a module is much less than 1. Typically, a collecting lens receives only a few percent of the light from each emitter, again underscoring the need for efficient light collection.

In a simple distribution system, each collector is illuminated by a wide beam of light spreading out from each broadcast lens. The focused images of the emitters may be highly distorted, as noted above, and the focal pattern may be poorly registered with the receiver grid. Poor registration means that the optical system has low tolerance to alignment errors, poor resistance to effects of mechanical vibrations, and a performance restricted to a small temperature range, as temperature variations may result in differential expansion of system components.

Mirror Distance and Optical Distortions

The distance to the mirror can be shortened by increasing the (negative) power of the broadcast lenses and tilting them slightly to direct the broadcast beams to achieve uniform coverage of the array of collecting lenses. This shortened distance increases the distortions above. Increasing the distance to the mirror eventually reaches a point where the broadcast optics have no focusing properties; beyond this point, the curvatures of the broadcast lenses become positive. This point depends on the natural divergence of the emitter beams. The result of this mirror-distance increase is to decrease the size of each receiver array and increase the size of the optical system. Each of these results may be undesirable in a particular realization where the receiver spacing might become too small to be practical or the mirror distance too large for a particular application. Accordingly, a means is desired to keep both the receiver spacing and the mirror distance within particular design regions that are application dependent and constrained by other components in the system.

More Modules Mean More Power

Additionally, as more modules are incorporated into a given realization, the emitter power must increase as the number of modules increases. This is simply because each emitter must illuminate additional modules while ensuring that each receiver have adequate light intensity for low-error communications over the optical channels established by the emitter-receiver optical paths.

Solution to These Problems

To overcome the problems of (1) requiring high-powered light sources, (2) distortions in the focal plane, (3) image size at the receiver, and (4) an unwieldy optical region, a more careful design of the system of broadcast and collecting lenses is necessary. If each broadcast lens directs light from its emitter to the collecting lens above each module so that no light falls on any other portion of the system, then the emitter power can be reduced by a factor of approximately 15 in a four-module system and by a factor of 33 in a 16-module system over that required by a simple distribution method.

Collecting-lens design depends critically on the precise manner in which the broadcast lens distributes light in the system. In addition, the collecting lens determines the magnification of the optical system and hence the image size, which is the size of the receiver array. There are two types of collecting lenses that might arise in any given design, namely (1) a simple lens including a single curved surface such as a plano-convex lens and (2) a compound lens including two or more curved surfaces such as a bi-convex lens (two positive surfaces) or a meniscus lens (one positive and one negative surface). In addition, one might use two separate lenses, such as two Fresnel lens spaced a certain distance apart to accomplish the same result.

A simple distribution system that merely allows emitter beams to spread out unimpeded will generally require a more complex collecting lens, both to collect adequate light and reduce inherent optical distortions. Typical complications include use of multi-element aspheric elements with possible anamorphic surfaces. A complex distribution system involving precise direction of light onto particular targeted collecting lenses typically results in a simple plano-convex collecting lens with a spherical or parabolic surface.

The present invention involves designing broadcast lenses particular to their location with respect to the emitters. Furthermore, once the parameters of the broadcast lenses are selected, the collecting lenses above each module must be designed to accommodate the distribution of light from the several broadcast lenses in the system and focus the pattern of light reaching each collecting lens onto the set of receivers below that lens.

To accomplish these goals, the broadcast lens is divided into a number of facets equal to the number of modules in the system, or one less than this number if it is desired that a module not communicate with itself optically. In general, each facet includes a segment of a lens of curvature (power), diameter, and center location particular to that facet. The associated emitter then illuminates the set of facets in roughly equal proportion. Each facet then directs its received light onto a different collecting lens. In this way, the light from an emitter is efficiently used, with very little light wasted in illuminating non-functional parts of the optical system.

Once the broadcast lenses are chosen, the collecting lenses must be designed to achieve the desired system dimensions (mirror spacing and size of the receiver array or receiver spacing). A further innovation of the invention allows a system magnification (image size) other than the one inherent in the system geometry as defined by the module size and spacing, the number of receivers per module, the distance to the focal plane, the distance from the emitters to the lens array and the distance of the lens array to the mirror. Particular embodiments of the collecting optic include a split lens as well dual offset lenses. In the simplest case, the collector is a plano-convex optic, possibly in a Fresnel implementation. Simplicity in this optic is made possible by the faceted broadcast lenses.

An added benefit of so restricting the distribution of light from each emitter is that the collecting lenses take a particularly simple form. Since the distribution method incorporates a pre-focusing function where each facet acts in an independent manner, the collector may be a simple, plano-convex lens with flat side towards its receiver array. A slight amount of asphericity may be added to correct for any slight global distortions present. Additionally, the collectors are amenable to realization as simple Fresnel lenses produced as a single layer of molded plastic only a few millimeters thick.

If the broadcast lenses are also fabricated as (segments of) Fresnel lenses, the entire lens array may by molded as a single plastic form a few millimeters in thickness. This feature greatly reduces the manufacturing and assembly costs of the resulting interconnect.

Another benefit of restricting the distribution of light from each emitter is that the individual beams from each facet are pre-focused to lie within the acceptance aperture of each collecting lens. By controlling the size and shape of images falling on the collecting lens, it is possible to provide a finer detail of control over the emitter images at the focal plane. For example, one may achieve close registration of the focal pattern with the receiver grid, a result that is simply not possible with a simple distribution system and collecting lenses of one or two surfaces. In addition to improved registration, the spot size is controlled by altering the shape of those beams entering the collecting lens aperture at more oblique angles. Typically, oblique beams produce highly distorted images which provide a poor match to the desired circular focal regions.

The focal region is defined by a circular disk centered at a given receiver having sufficient intensity anywhere within the disk. Thus, the larger the diameter of the disk, the more the design is able to accommodate mechanical misalignments, dimensional changes due to operation over a wider range of temperatures, and a wider range of mechanical shocks and vibrations. The size of these disks are limited by the spacing of the receivers and the need for avoiding cross-talk between receivers. Control over the focal-region size allows the designer to achieve small, intense image regions when either low-sensitivity receivers are used or when the system must be made smaller than otherwise practical. At the other extreme, large image regions with good registration become possible if the system is to be used under conditions of severe mechanical vibrations and wide temperature ranges.

Overview and Problem Statement

Figure 37:
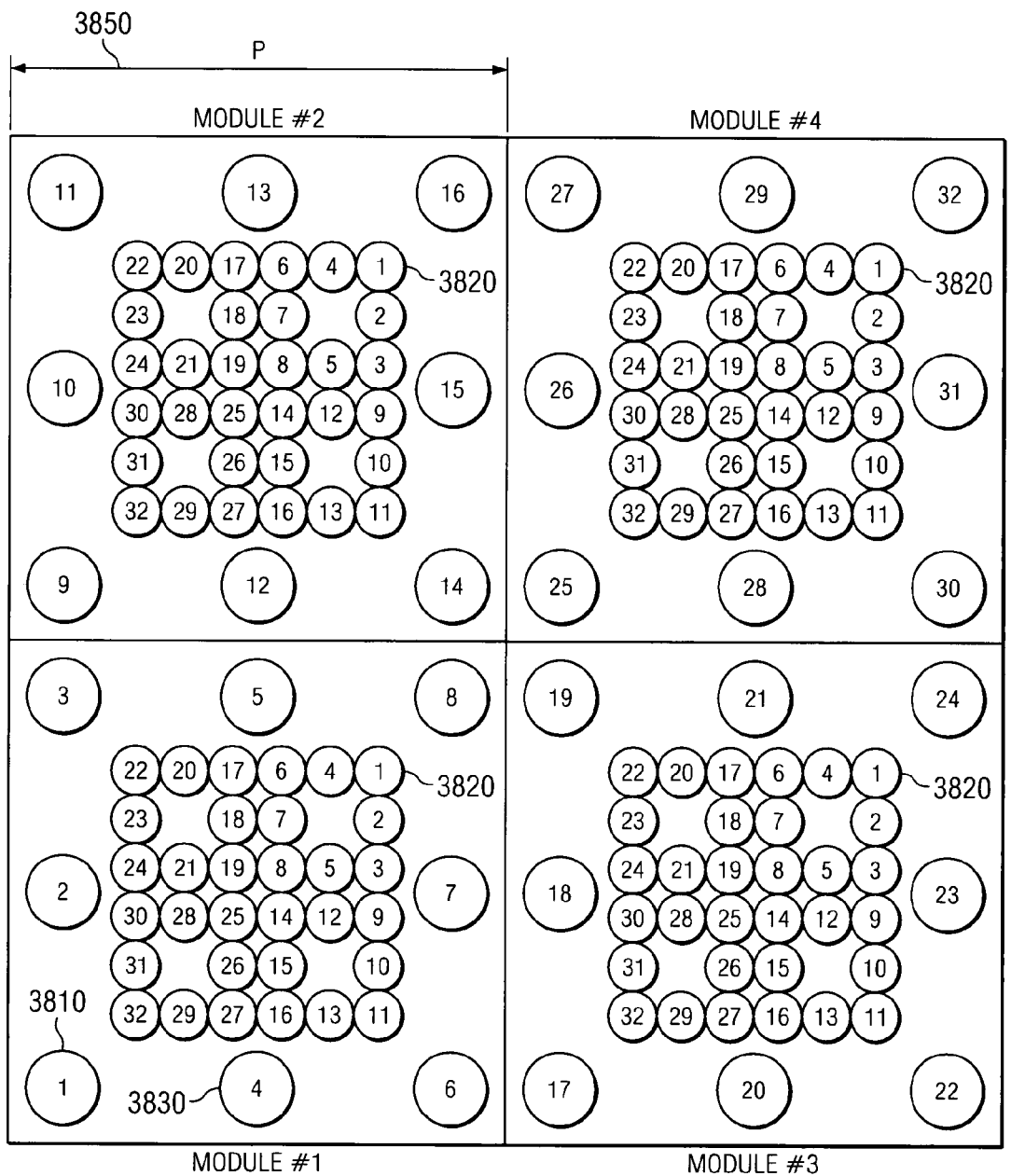
FIG. 37 is a face (end) view illustrating the electro-optic plane of an 8-way, four module system, representing an embodiment of the invention.

A particular preferred embodiment includes an 8-way, 4-module system with 8 emitters in each module giving 32 emitters in the interconnect. Referring to FIG. 37, the large circles 3810 and labeled from 1 to 32 represent both the emitters and associated broadcast lenses. The small circles 3820 represent the four sets of 32 emitters. Each receiver is labeled with a number corresponding to its transmitting emitter. Thus, circle 3810 with label 1 represents a broadcast lens that sends light to receiver 3820 (small circles) with label 1 in each module 3830 labeled Module #1 through Module #4.

Referring to FIG. 38, the electo-optic or EO plane 3910 contains both the emitters and receivers. The lens plane 3920 is located a distance 3930 labeled S from the EO plane 3910. The lens plane 3920 is defined as passing through the apex of the focusing surfaces of each collecting lens. This plane also contains the broadcast lenses, positioned as the collecting lenses. The second surface of the collecting lenses (not shown) lies between the lens plane 3920 and the EO plane 3910. The mirror image 3940 of the lens plane is located a distance 3950 labeled L from the EO plane 3910. The mirror 3960 is located halfway between the plane 3920 and the (mirror image) plane 3930 at distance 3970 labeled M. The focal plane 3980 is located at distance 3990 labeled F from the EO plane 3910.

The magnification of the system is controlled by the distances defining the geometry, specifically the emitter-surface to broadcast-lens distance 3930 and the distance from the broadcast lens to the mirror image of the collecting lens 3950. It is generally desirable to have both the broadcast lenses and the collecting lenses lying in the same plane 3920, with a mirror 3960 lying some distance beyond that plane. The purpose of the mirror 3960 is to fold the optical paths, allowing all lenses to lie in the same plane (the lens plane 3920) and the electro-optics including emitters, receivers, and associated circuitry to similarly lie in a single plane (the electro-optic or EO plane 3910), usually situated at some distance 3930 from the lens plane. Typical distances for a 4-module system with a module face of 100 by 100 mm are S=65 mm from the EO plane to the lens plane, and M=200 mm to the mirror.

Once the system geometry has been chosen, the type of distribution system may be selected. Noting the particular inherent divergence of the light from the emitters is the first step in specifying the distribution optics. If the emitters include narrow-beam lasers, an additional optic might be required to spread the light from an emitter so that the broadcast lens is adequately illuminated when placed at a convenient distance from the emitter. If the emitted beam is so wide that the broadcast lens must be placed too close for design purposes to the emitter, an additional optic might be required to narrow the emitted beam. In a typical system, however, a vertical-cavity, surface-emitting laser may be chosen for the light source. The 92% power envelope is typically around 23 degrees (full angle of the emitted quasi-Gaussian beam) and requires no intervening optic when using (approximately) a 26 mm diameter broadcast lens some 65 mm from the emitting surface.

First Solution—Simple as Possible

The simplest possible broadcast lens results from choosing a system geometry that accommodates the natural spread of the emitters. Simply allow the emitter light to spread out, reflecting from the mirror and back onto the lens plane, which now includes four collecting lenses and 32 holes (if needed) for the 32 naturally diverging beams. The drawback to this scheme is that the amount of light from a corner emitter, for example, may not adequately illuminate the collector in the diagonally opposite module unless the emitter is chosen to be powerful enough. Supposing an adequately powerful laser, collectors closer than the farthest one receive considerably more light than they need, all the more so if the spreading beams are Gaussian in character. This particular situation is rather unique and restrictive. More sophisticated distribution systems are desired to allow the designer more freedom of choice over system geometry and the ability to use emitters with minimal power.

Wedges—Next Step in Sophistication

The next simplest broadcast lens directs the light to fall more uniformly onto the lens plane. For example, if the distances between source and broadcast lens are chosen so as to fully illuminate the broadcast-lens aperture and the distances from the broadcast lenses to the unfolded or mirror image of the collecting lenses are properly chosen, then the broadcast optic need not possess any focusing properties, serving the sole function of directing the several beams of light so that they adequately illuminate the several collecting lenses. The form of such broadcast optics then becomes that of a simple optical wedge or circular section of a prism, which merely directs the broadcast beam of light from each emitter so as to adequately illuminate each and every collecting lens in the system.

Each wedge has only two design parameters, the orientation of the tilted surface with respect to the geometric center of the set of collecting lenses, and the angle of the tilted surface. Thus, both the design and fabrication of the wedge broadcast lens is straight forward and inexpensive.

Simple Broadcast Lenses

The next step in sophistication of the distribution system was described above under Related Art. Here, a negative curvature is added to the wedges so that the light from each emitter spreads out at a rate faster than the inherent beam spread. This allows the mirror to be placed closer to the EO plane than in the case of the simple wedge, resulting in a more compact system. Alternatively, a broadcast lens with positive curvature requires that the mirror be placed farther from the EO plane than in the case of the simple wedge. In this way, the interconnect designer has some control over the size and aspect ratio of the system.

The problems of distortion of the focal plane with attendant global spherical aberration and unacceptable coma for those images of emitters far from the system axis are not addressed by this system unless a complex collector configuration of multiple-element lenses are used, much as is done in the design of flat-field, wide-angle lenses. This solution typically requires a 5-to-7 element collecting lens and becomes prohibitively expensive in a system containing many modules. Additionally, the emitter power required grows proportionally to the number of modules. As an example, emitters with an average power of 45 mW are needed to adequately service a four-module system based on wedge distribution. Going from four modules to 16 modules, increases the required emitter power to 180 mW. As emitter power increases, the driving electronics becomes more difficult to implement and the power dissipation of the system increases. Using wedges, over 90% of the light does not reach the collectors as their apertures must be considerably restricted to aid in suppressing optical distortions. Should this wasted light be properly used, the example of the 16-module system would require approximately 18 mW per emitter instead of 180 mW.

Distributing Facets

The next step in controlling the beams of light from each emitter is to design a broadcast lens that carefully controls and directs light to fall ideally only on the collector apertures. In this way, little optical power is wasted and both distortions of the focal plane and distortions of individual emitter images may be reduced.

To achieve full control over the distribution of emitter beams in both extent and shape, the broadcast lens should include multiple facets, one facet for each collecting lens in the system. This is illustrated in FIG. 39, which shows a four-faceted broadcast lens for the preferred embodiment of four modules. The facets 4010 are sectors of a circle of equal area and numbered from 1 to 4. The boundaries 4020 between the facets are shown as lines defining the facet edges. Each facet 4010 has a central axis 4030 which is oriented at an angle 4040 with respect to the a rectangular coordinate system centered at the junction of the four modules as depicted in FIG. 37.

In the 32-emitter system, there are 32 broadcast lenses each with four facets, for a total of 128 facets. Each facet is determined by its orientation and associated facet lens. Typically, a facet lens is a simple plano-convex optic whose center is placed in a particular location with respect to the facet axis and whose diameter must extend to cover the entire facet in question. As such, there are 128 such lenses to be defined as to curvature, diameter, and location with respect to the center of their respective broadcast optics. Each facet is a particular segment of one of these lenses; one may think of fabricating a lens and then cutting out a small segment in the shape of a facet 4010 and then assembling four such segments to form the entire broadcast lens.

Symmetry Considerations

As shown in FIG. 37, the system exhibits considerable symmetry. Each module is rotationally symmetric with the other modules in the system. This fact alone means that only a total of 8 different broadcast lenses are required, this group of 8 being replicated in each module. Broadcast lens 3810 labeled 2 is a mirror image of broadcast lens 3810 labeled 4, but this pair is not rotationally symmetric in that one cannot be obtained by a physical rotation of the other. Proceeding in this fashion through the other lenses in the module establishes that the 8 broadcast lenses are each different from the other.

FIG. 40 tabulates, in Table I, the symmetry properties of the 32 broadcast lenses in the four-module system. Column 1 of the Table I refers to the 8 lenses in 3830 of FIG. 37 labeled Module #1. The other entries refer to the labels for broadcast lenses on other modules. The symmetry is indicated by the rows of the table. For example, broadcast lens 3810 labeled 1 is found in row 1 column 1 of Table I. By rotating this lens 90 degrees about the origin O of FIG. 37, one obtains broadcast lens 3810 labeled 22. An additional rotation by 90 degrees, yields broadcast lens 3810 labeled 32, and a final rotation by 90 degrees yields broadcast lens 3810 labeled 11. In this way, each of the 8 different lenses is rotated multiple times to obtain the full 32 required broadcast lenses. The table captures this rotational symmetry.

Facet Mapping

Figure 41:
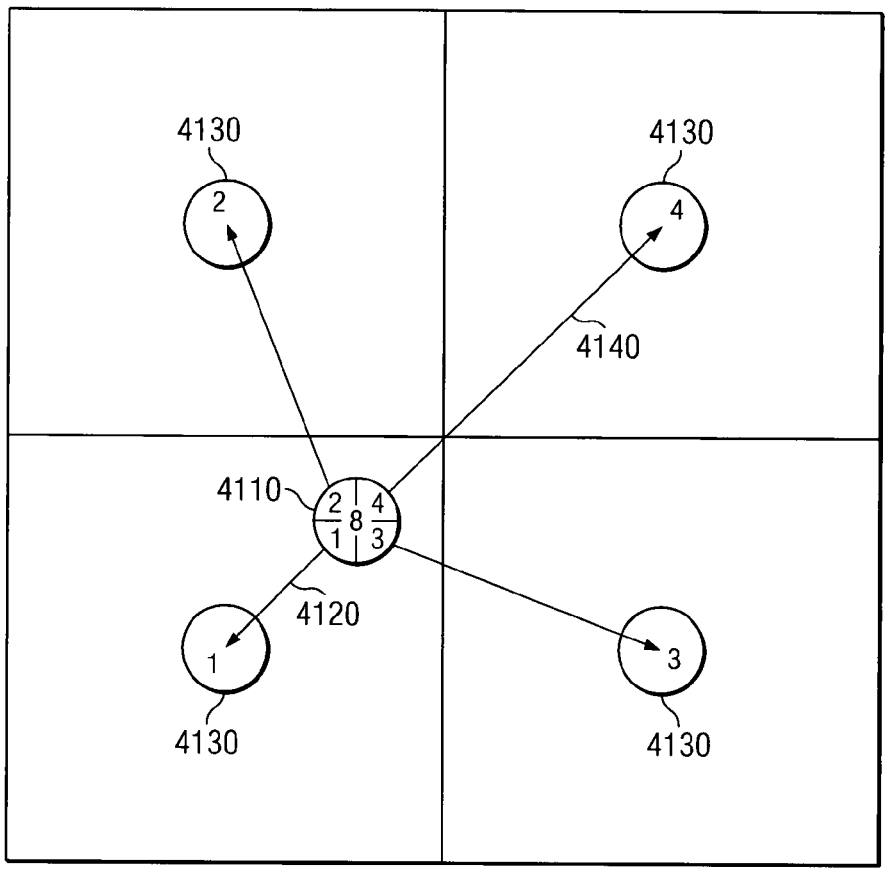
FIG. 41 is a mapping for broadcast lens 8 in FIG. 37, representing an embodiment of the invention.

Before the facet parameters may be determined, it is essential to know which of the 128 different facets directs its light onto which of the four collecting lenses. First, it is obvious that each of the four facets in a particular broadcast lens must direct light onto a collecting lens. The question then becomes, which facet points to which collector and does it matter? By assigning collectors to particular facets in a regular fashion, the symmetry of the system can be preserved and a simplified mapping that aids in lens construction can be found. An example of such a mapping for broadcast lens 3810 labeled 8 is shown in FIG. 41 where 4110 indicates the broadcast lens 3810 labeled 8. Facet 4120 labeled 1 directs light to collecting lens 4130 labeled 1 along direction 4140. This set of mappings can be describe as a set of numbers {8,1,1} meaning facet 1 of broadcast lens 8 directs light to collector 1.

A table of such assignments can be constructed for the entire set of 8 unique lenses. This table can then be replicated 3 additional times with different rotation angles assigned to each group. The result is a map for the entire set of 128 facets connecting to four collecting lenses. Such a table is shown in FIG. 42 which is a tabulation of the symmetry properties of the 128 facets comprising the 32 broadcast lenses.

Referring to FIG. 42, column 1 of Table II indexes the 8 different broadcast lenses required in the preferred embodiment. The headings of columns 2, 3, 4, and 5 in Table II indicate the module number (M1 through M4) referring to modules 3810 of FIG. 37. The heading numbers in parentheses refer to the angle, in degrees, of rotation required to orient the broadcast lenses 1 through 8 of column 1 to the particular module so indicated. For example, the broadcast lenses 1 through 8 of column 1 are rotated by 0 degrees for assignment to module 3810 labeled Module #1 of FIG. 37. This is indicated by the heading M1(0) in Table II. The entries in columns 2, 3, 4, and 5 refer to the mapping of the facet numbers, indicated by the four positions in the 4-tuples of numbers, to the collecting lens indicated by the contents of that position. For example, broadcast lens 4110 labeled 8 in FIG. 41 and indicated by entry 8 in column 1 of Table II has assignment of facet 4120 labeled 1 in FIG. 41 to collecting lens 4130 labeled 1 in FIG. 41, as indicated by the number 1 being in the first position of the corresponding 4-tuple. Referring to FIG. 41, the assignment 4140 is represented by the contents of position 1 in the 4-tuple of column 2 of Table II of FIG. 42, corresponding to the entry 8 of column 1. As a further example, lens 8 of column 1 is rotated 90 degrees to map into module 2 as shown by the heading M2(90) of column 3. Referring to entry 8 of column 2 in Table I of FIG. 40, we find the number of the corresponding broadcast lens to be 19. The 4-tuple in row 8 of column 3 of Table II contains the assignment {5,1, 2,4} which indicates that facet 1 of broadcast lens 19 is to direct its light to collector 3 of Module 3, and so on.

Additional Facet Symmetry

Table II shown in FIG. 42 exhibits a great deal of additional symmetry in that all facets in a given module are similarly oriented. These additional symmetries reduce the number of unique facets from 32 to 18, which may also be verified by constructing figures similar to FIG. 41 for all 32 broadcast lenses in the system.

Defining the Facet Lenses

FIG. 38 refers to a set of four numbers, {F, L, M, S}, that specify the geometry of the system. In addition, the module size or spacing is required to fix the size of the object, which is the emitter grid. This module size 3850 is referred to as P in FIG. 37. Since the mirror distance, M, is given by half the sum of L and S, it may be considered to be a derived parameter. The specifying set of numbers is then {P, S, L, F} and determines both the magnification (if a single-surface collector is used) and the overall size of the optical system. With a particular assignment to this set, values for any of the facet-lens parameters may be computed.

Consider 4010 of FIG. 39, which, in the preferred embodiment, is one fourth of a circle (in the general case, the aperture of the broadcast lens need not be circular and the number of sectors is equal to or one less than the number of modules in the system). This one-quarter circle, with facet boundaries 4020, is a section of a lens with a certain specified location, diameter, radius of curvature, R, and shape parameter k. The curvature and shape parameter are related to the height of the lens surface by the standard surface equation of an axially symmetric lens, given by $$Z(r) = \frac{r^2}{R\left(1 + \sqrt{1 - \frac{r^2(1+k)}{R^2}}\right)} \quad (4)$$

where Z is the height of the surface at radius r and k is a shape parameter. For k=0, the equation becomes that of a spherical surface with radius of curvature R. For k=−1, the surface is a paraboloid of revolution. Any facet lens, from which the corresponding facet sector is taken, requires a location and diameter in addition to the parameters R and k of Equation (4). To complete the specification, all facet lenses are taken as plano-convex with refractive index n.

Figure 43:
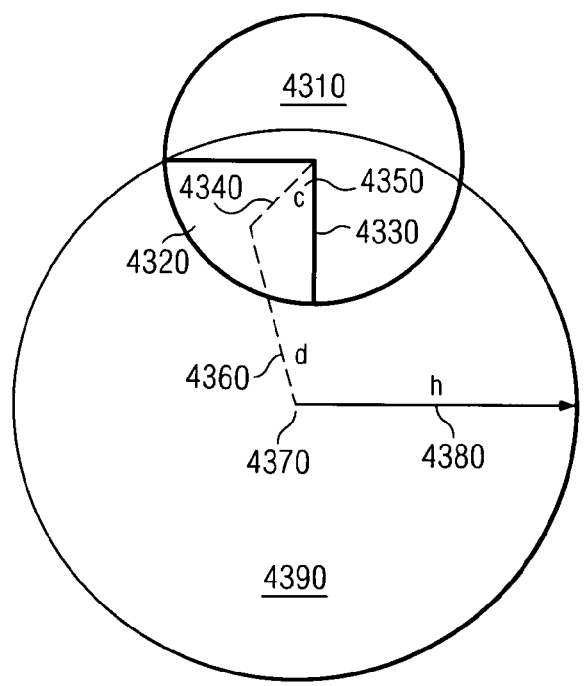
FIG. 43 is an illustration of the facet location parameters, representing an embodiment of the invention.

To establish the center of a facet lens, refer to FIG. 43, which illustrates a broadcast lens 4310 and a particular facet 4320 of the broadcast lens delineated by the facet boundaries 4330. A facet axis 4340 bisects the facet and defines a direction for locating the center of the facet lens. The distance 4350 labeled c is the first center parameter and is measured from the center of the broadcast lens 4310 along the facet axis 4340. A direction, from the point along the axis specified by c to the center of the collecting lens, which is located above a module of FIG. 37 is established. The second center parameter is a distance 4360 labeled d along this direction. The center of the facet lens 4370 is located at this point.

The radius 4380 of the facet lens labeled h is specified so that the lens completely covers the facet 4320. An outline 4390 of the resulting facet lens is shown in the figure.

A facet lens is then defined by the parameter set {c, d, h, R, k}. Once this set has been determined for the 18 different facet types, the entire 128 facets may be manufactured and assembled into the set of 32 broadcast lenses. An alternate approach is to manufacture four sets of the 8 different broadcast lenses, wherein each lens is molded from a specially designed, four-segment mold. Four sets of these 8 different lenses are required to complete the broadcast optics of the four-module interconnect.

Computing the Facet Parameters

As shown in the section on Collecting Lenses, a collecting lens is generally not centered over a module face. The collecting-lens centers must be known to be able to specify the parameter d in the facet parameter set {c, d, h, R, k}. Assume that the collecting lens centers are known, then the facet parameter set {c, d, h, R, k} is determined by a solution to an optimization problem that involves tracing a set of rays from the source or emitter lying a distance (3930 of FIG. 38 labeled S) below the broadcast lens in question. Only rays incident on the desired facet are required.

Optimizing the parameter set requires choosing initial values for all 5 parameters and tracing the set of rays from the source, through the facet lens. The resulting pattern of rays is examined on the lens plane 3940 as to location, extent, and shape. A quality factor is computed based on these measures, and the process is repeated with a different set of parameters. An efficient way of choosing parameter sets to examine is provided by the simplex method of multidimensional optimization.

Once an initial set of parameters has been found, a refined set may be derived by allowing the set of rays to refract through the collecting lens and fall on focal plane 3980. Once again, the pattern of rays is examined as to location, extent, and shape. A quality measure at this stage depends upon the desired size of the focal pattern, which is controlled by the parameter R; the position of the focal pattern, which is controlled by the two location parameters, c and d, as well as by R; and the shape, which depends on parameter k. In reality, all 5 parameters interact to affect the quality measures. Again, the simplex method of optimization is the most efficient one found for such a set of interacting parameters.

The results of such an optimization is summarized in FIG. 44, Table III, which was computed by considering all 32 facets that point to Module #1. This calculation demonstrated that only 18 of the facets were unique.

Each of the 18 facet sets displayed in Table III belong to more than one physical facet. For example, from the symmetry diagrams and Table I, facet #1 is found in broadcast lenses 1, 11, 22, and 32 where it is rotated in position by 0, −90, +90, and 180 degrees, respectively. As another example, consider facet#3 of Table III. This facet is found in Module#1 lens 3 and lens 6. Lens 3 is also lens 17, 30, and 16 by rotation and lens 6 is also lens 24, 27, and 9 by rotation. Thus, facet#3 is found in the 8 lenses {3, 17, 30, 16, 6, 24, 27, 9}.

Location of the 18 Facets

A map assigning the 18 facets to broadcasts lenses and to particular locations in these lenses is displayed in FIG. 45, Table IV. This table displays a tabulation of the location of the 18 unique facets found within the 32 broadcast lenses. The first column refers to the broadcast lens index 3810 in FIG. 37. Columns 2, 3, 4 and 5 contain the numbers 1 to 18, which refer to the facet-parameter sets of FIG. 44, Table III. For example, the first facet of broadcast lens #3 has parameter set 3, or the third row in Table III. This is facet 4010 labeled 1 in FIG. 39. Likewise, the second facet 4010 labeled 2 has parameter set 16 found by contents of row 16 in Table III. This procedure indicated here allows one to map any set of facet parameters to its appropriate broadcast lens and facet location.

Note that any particular facet index (1 to 18) is found multiple times in Table IV. As an example, facet index 18 is found four times in the body of the table, namely in broadcast lens 1, 8, 25 and 32. These are lenses along the main diagonal of FIG. 37 and share only rotational symmetry with each other. By contrast, facet index 17 is found eight times in the table and belongs to broadcast lenses 2 and 4, which are symmetric by reflection across the main diagonal, as well as the reflection-symmetric pairs 10 and 20, 13 and 23, and, finally, 29 and 31. These pairs are rotationally symmetric to each other (10 rotated to 23 and 20 rotates to 13, and so on).

Local Distortions Reduced by Anamorphic Facet Lenses

The 8 images of the emitters in a particular module are axially symmetric with respect to that module, thus emitters 3810 labeled 1 through 8 are symmetrically located with respect the module 3830 labeled Module#1 center. As such, they experience very little distortion. However, beams from emitters located in other modules in the system strike the collector in question at increasingly oblique angles as the distance to the particular emitter is increased from the specified collector. These oblique beams produce highly distorted images on the focal plane. The position of these images is controlled by the power and placement of the lens segment comprising the particular facet responsible for the image. However, the aspect of the distorted images becomes large for distant facets. This distortion reduces the optical power falling on the target receiver and reduces the effective diameter of the focal region, leading to increased susceptibility to both static and dynamic misalignments of the components. Additionally, an image that is highly distorted may partially illuminate a neighboring receiver, increasing the possibility of cross talk in the system.

By designing facet lenses to be anamorphic in character, the distorted images can be made more circular, thus providing a more uniform illumination of the receiver region. A simple anamorphic lens has an elliptical surface instead of the usual spherical surface. The orientation of the ellipse (direction or alignment of the major axis) is chosen to lie along the line between the center of the facet lens and the center of the targeted collecting lens. By varying the eccentricity of the elliptical surface, the aspect ratio of the image spot may be controlled.

Collecting Lenses

Collecting Lens for an 8-Way, 2×2 Configuration

Each collecting lens is approximately centered over its corresponding module; more precisely, the axis of the collecting lens passes close to the center of its module, which is also the center of the receiver pattern. Referring to FIG. 37, the system axis is a vector {0,0,1}, normal to the center 3840 labeled O while the center of Module #1 is located at {−P/2,−P/2} where P is the dimension of the side of a module centers indicated by 3850 in FIG. 37, and hence the spacing between module centers.

The emitter grid, as depicted in FIG. 37, is a square lattice with points centered at {0,0} with lattice points spaced by P/3 in each direction, starting with the lower left emitter 3810 labeled 1 located at {−5P/6,−5P/6}. Emitters corresponding to lattice points at {±P/2, ±P/2} are omitted as these points specify the centers of the receiver grids.

A ray emanating from a hypothetical emitter located at {0,0,0} and hitting the collecting lens at its center {a, a, L} for some value a, will refract at the collecting lens but not change direction on passing through the lens. This is so since the ray intersects the surface precisely at the lens axis where the normal is directed along the system axis direction {0,0,1}. The ray will, however, be deflected by an amount depending on the thickness of the plano-convex collecting lens and the index of refraction. In the thin-lens approximation, this thickness will be ignored.

This hypothetical ray is required to strike the center of the receiver pattern (module center) at the focal plane. That is, the ray must pass through the point $\{-P/2,-P/2, F\}$ for a 2×2 configuration of modules centered on a square grid with pitch P.

Referring to FIG. 38, S is the distance 3930 from the plane of emitters 3910 to the lens plane 3920, L is the distance 3950 from the plane of emitters 3910 to the mirror image of the lens plane 3940. The distance 3990 to the focal plane 3980, F, is then given by (assuming that emitting and receiving surfaces lie in the same plane)

$$F = L + S \quad (5)$$

and the distance 3970 to the mirror 3960 is given by $$M = (S+L)/2 \quad (6)$$

where both distances are referenced to the emitter plane.

Faceted Broadcast Lenses Allow Simple Collecting Lenses

Figure 46:
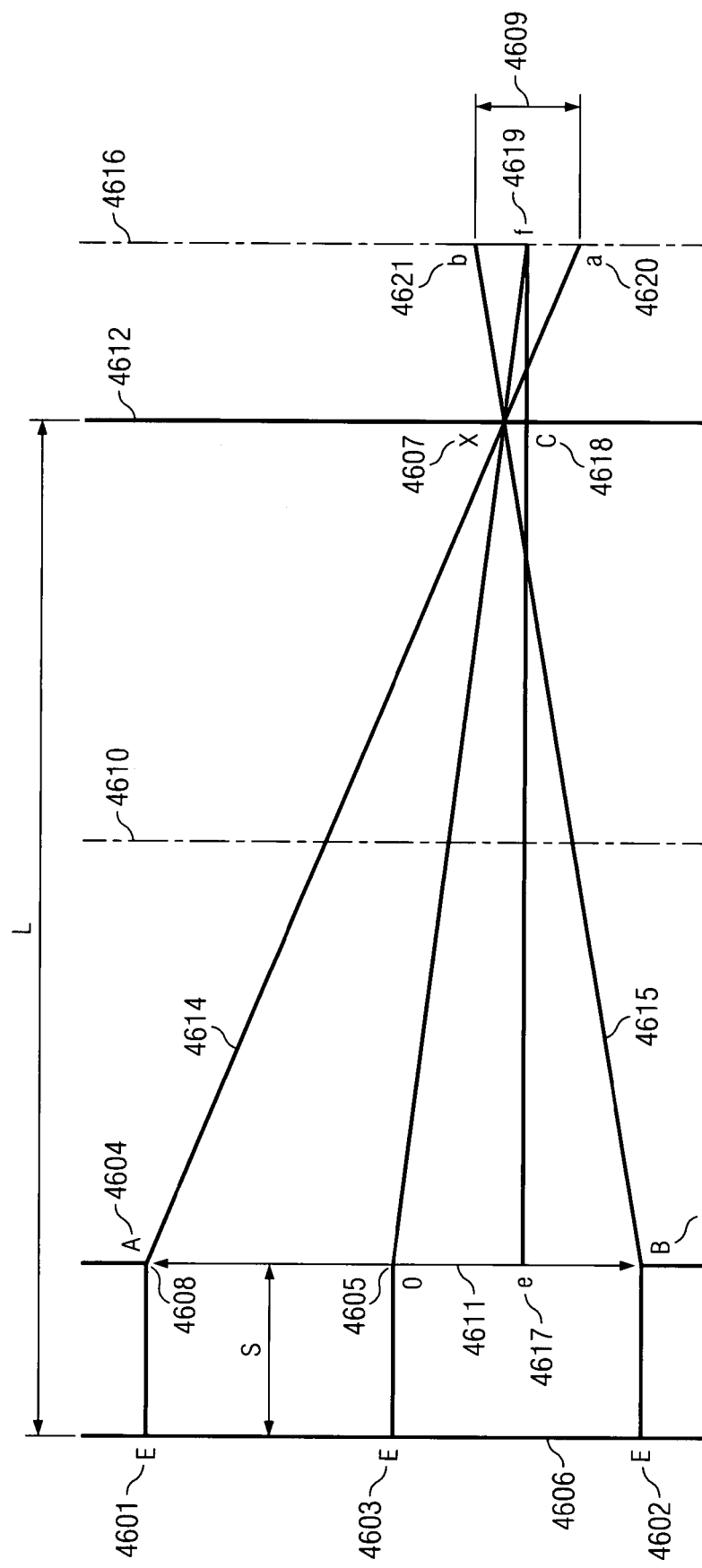
FIG. 46 is an illustration of ray geometry and system magnification, representing an embodiment of the invention

A ray from each emitter to the lens array directed along the system axis $\{0,0,1\}$ is refracted by the broadcast lenses (located in the lens plane above each emitter). These central rays each reach the surface of the collecting lens on the its axis. Intersection of collection of these 32 rays with the second (exit) surface of the broadcast lenses defines the virtual emitter grid. That is, the virtual emitter grid is located at distance S from the actual emitter plane. Referring to FIG. 46, the position and extent of this grid, along a diagonal between the two most distance emitters, for example, emitter 3810 labeled 1 and emitter 3810 labeled 32, is termed object 4608. The mirror, 4610 is shown for comparison to FIG. 38.

The mechanical reference plane supports both receivers and emitters, while the optical reference located at z=0 is the plane 4606 containing the emitting surfaces. The lens plane 4612 defines the z-position of the front surfaces of the set of lenses in the system. The location of the back surface of the lenses is referenced from this plane and determined by lens thickness (not shown).

The first step in designing the facet lenses is to compute the location of the collecting lens from the geometry specified by the set of numbers $\{P, S, L, F\}$. This location must then be corrected by the offset experienced by the central ray as it is refracted by the collecting lens. In the thin-lens approximation, the correction vanishes.

The simplest collecting lens includes a curved or focusing surfaced followed by a planar surface parallel to the reference plane. The lens axis is taken to be the vector $\{0,0,1\}$, or normal to the reference plane. The geometry illustrated in FIG. 46 defines the magnification of the lens and hence the size of the receiver array. That is, the size of receiver grid or image 4609 (receiver spacing and array size) is determined by the set $\{P, S, L, F\}$ and the choice of a plano-convex collecting lens (a collecting lens with multiple surfaces will produce a receiver grid of a different extent). The center of the collecting lens in the lens plane is likewise determined by this set of numbers when corrected for the lens thickness and the refractive index of the lens material. Again, in the thin-lens approximation, this correction vanishes.

Geometric Magnification & Collecting Lens Location

The magnification of the collecting lens is defined as the ratio of the image size to the object size. Since the object is fixed by the geometry of the emitter configuration, the magnification depends on the defining set $\{P, S, L, F\}$ while holding P fixed. In the ideal case of a thin collecting lens, or equivalently, if the collecting lens is approximated by a pinhole, the magnification is a simple geometrical ratio involving F, L, and S. The "module" in the following discussion refers to module 3830 of FIG. 37 labeled Module #1.

Referring to FIG. 46, consider the ray 4614 from emitter at 4601 labeled E, located on the emitter plane 4606. This ray is directed along the normal $\{0,0,1\}$ until refracted at the lens plane 4611 by the broadcast lens centered at 4604 labeled A. From there, the ray 4614 intersects the center of the collecting lens located at 4607 labeled X. The ray 4614 then proceeds in the same direction, since the collecting-lens normal is also directed along $\{0,0,1\}$ at point X, until it intersects the focal plane 4616 at the lower extent of image 4609 at the point 4620 labeled a. In a similar manner, ray 4615 originating at corner emitter 4602, also labeled E, is refracted by the broadcast lens centered at 3840 and labeled B. The ray is thereby directed to intersect the collecting-lens surface at the same point X. Ultimately, this ray intersects the focal plane 4616 at the upper extent of image 4609 at the point 4621 labeled b. The size of the image 4609 is found by the similarity of the two triangles ABX and abX. The point 4619 labeled f is located at the center of the module and, hence, the center of the receiver pattern. Extend a line from f, parallel to the direction $\{0,0,1\}$ and back to the lens plane 4611. This line intersects the lens plane 4611 at point 4617 labeled e and also intersects the mirror image of the lens plane 4612 at point 4618 labeled C. The segment eC is then the height of triangle ABX while the segment Cf is the height of triangle abX. By similarity of the two triangles, it is evident that geometric magnification G given by Equation (7), as $$G = \frac{ab}{AB} = \frac{Cf}{eC} = \frac{F-L}{L-S} = \frac{S}{L-S} = \frac{S}{2(M-S)} \quad (7)$$

where segment ab is the height of the image 4609 and segment AB is the height of the object 4608 and the last two ratios are found from Equation (5) and Equation (6), respectively.

To find the location of the center of the collecting lens, or the pinhole in the pinhole-lens analogy, consider the point 4605 labeled O which lies at point $\{0, 0, S\}$. A ray 4613 from (virtual) emitter 4603 labeled E to the point O is then directed to the point 4607 labeled X, the center of the collecting lens. An extension of this ray intersects the focal plane 4616 at the point 4619 labeled f, which, by design, is the center of the module and receiver pattern. The two triangles Oef and XCf are similar. The offset of the lens center from the module center is the segment CX and found from the similarity ratio given by Equation (8) as $$\frac{CX}{Oe} = \frac{Cf}{ef} = \frac{F-L}{F-S} \quad (8)$$

Segment Oe is simply half the module-face width, so the offset, D, is given by Equation (9), as $$D = CX = \frac{P}{2}\frac{F-L}{F-S} = \frac{P}{2}\frac{S}{L} = \frac{P}{2}\frac{S}{2M-S} \quad (9)$$

where the Equations (5) and (6) are used to obtain the last two ratios.

The two procedures outlined above determine both the geometric magnification of the system and the location of the collecting lenses given the parameter set $\{P, S, L, F\}$, and are correct in the thin-lens approximation. A minor correction can easily be made for the case of a finite-thickness lens; such a correction usually involves tracing rays 4614 and 4615 through the chosen lens of desired thickness and taking the normal to the lens at the points intersected by the rays to be directed along {0,0,1}.

Corrections for a Thick Collecting Lens

Figure 47:
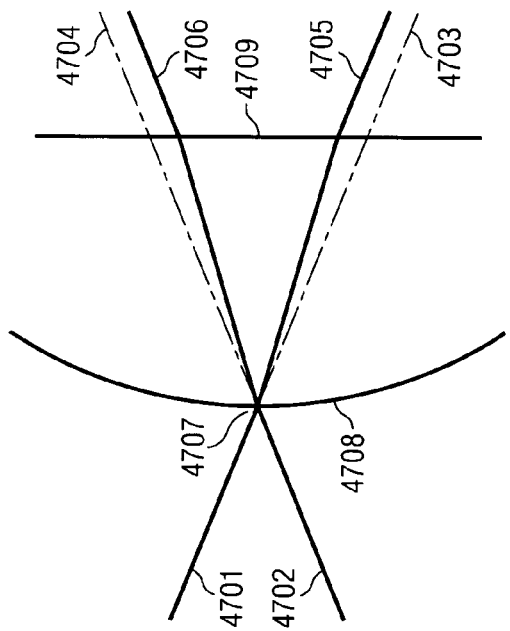
FIG. 47 is an illustration of refracted rays altering the system magnification, representing an embodiment of the invention

As noted above, the values of the geometric magnification, G, and the offset, D, are both exact in the thin-lens approximation. This is so since refraction of a ray incident on the axis of a thin lens does not shift in position when traversing the lens. In a more practical situation, where the lens has finite thickness, refraction at the second surface, even if planar, will shift the ray's position according to Snell's law. Referring to FIG. 47, the first surface 4708 of the lens refracts rays 4701 and 4702, which are incident on the surface axis or center 4707. Passing to the second or back surface of the lens 4709, these two rays are refracted into rays 4705 and 4706. Unrefracted version of these two rays are shown as dashed lines, 4703 and 4704. The unrefracted rays lie outside of the surface formed by the refracted rays.

From this figure, based on Snell's law of refraction, it is evident that the magnification of the system is reduced by an amount related to the lens thickness and the angles of incidence of the extreme rays above and below the lens center. (A ray at a steeper angle undergoes more deflection, while one along the lens axis undergoes no deflection). Tracing these rays in a situation of finite thickness, produces the actual system magnification, which is typically a few percent lower than the geometric magnification.

A central ray such as ray 4613 shown in FIG. 46, will still be incident on the center of the collecting lens. However, since the collecting lens is not on the system axis {0,0,1}, this central ray will undergo a slight deflection, which may be calculated in the same manner as mentioned above. To ensure that this central ray strikes the center of the module and hence receiver pattern, this deflection must be subtracted from the offset D determined in Equation (9).

Summary of Design Based on Geometric Magnification

The design of a four-module system is straightforward when the geometric magnification, G of Equation (7) is used. Assume that the corrections for lenses of finite thickness, as discussed above, have been made. The facets are then computed as described above, and the R and k of Equation (4) for the collecting lenses are chosen to optimize the size and shape of the set of focal patterns at the focal plane. This is in contrast to the choice of parameter set {c, d, h, R, k} chosen to optimize individual focal spots belonging to each facet after an R and k for the collecting lens have been selected.

The actual magnification increases with S and decreases with L, allowing the designer to vary the image size. A determining factor for S is the spread of the emitted beam and the diameter of the broadcast optic. A beam emitted into a narrow cone will require the broadcast lens to lie far from the emitting surface which implies a large image size.

An interconnect designed in this way will be optimal for the (corrected) geometric magnification based on the set {P, S, L, F} with single-surface collecting and facet lenses conforming to Equation (4). The simplicity of the resulting optics is attractive for many situations. However, the system magnification is fixed for a given mirror distance within a small variation in lens-plane distance for a given module-face size. If this restriction of the magnification is too confining, a second collecting surface must be added.

Split or Compound Collecting Lens

Certain situations in the design of an interconnect might arise where the defining set {P, S, L, F} is specified, but a receiver grid different in size, location, or aspect ratio is desirable. These variations in receiver grid geometry may be effected by a second collecting-lens surface. For example, if it is necessary to shrink the receiver grid while keeping it centered in the module face while maintaining the aspect ratio of the emitter grid, then a second collecting surface with converging properties must be added between the first surface and the focal plane. Conversely, a second surface with negative curvature will expand the image size, increasing the effective magnification above the geometric magnification.

More specifically, since it is desirable (but not necessary) to place both broadcast lenses and collecting lenses in the same plane, the focal length of the collector depends on distance S as well as the acceptance aperture of the broadcast lens. It is generally desirable to fill this aperture out to the 85-to-95% spread of the emitters so as to make efficient use of the light sources. With a smaller beam divergence, the broadcast lens must be placed farther from the emitter, implying a larger distance S and a larger magnification. The resulting image might be so large that the receiver grid interferes with the emitter grid. This situation requires a second collecting surface with converging properties to reduce the image size. Conversely, should the emitter have a large beam divergence, the broadcast lens must be situated closer to the emitter, resulting in a smaller magnification and receiver grid. In this case, the solution is to provide a second collecting surface with diverging properties to enlarge the image size.

Options for the second collecting surface are twofold. The first option is to replace the second planar surface of the collecting lens with a curved surface, allowing adequate separation between the two surfaces. An increased thickness would ensure that each central ray from each emitter is refracted to a different location than it would have been with no or minimal separation of the two surfaces; such a separation effectively alters the magnification. Additionally, local surface variations will play less of a role in distorting the receiver grid on a thicker lens as the image of the emitter grid at the second surface will be larger and more spread out, hence less susceptible to local surface variations.

The second option is to employ a distinct lens spaced a certain distance between the first lens and the focal plane. This spacing becomes an important design parameter and also allows both collecting lenses to be realized as Fresnel lenses.

The axis of the second surface will not coincide with the axis of the first surface. The reason for this is that the hypothetical central ray emanating from the center of the virtual emitter grid intersects the collecting lens at an oblique angle. That is, neither the object (the array of emitters) nor the image (the array of receivers) lies on the lens axis.

If the collecting lens includes a single optic with two curved surfaces, the lens must be "split" parallel to the reference plane so that the two surface axes are offset by a certain amount. This offset is determined by simple geometrical considerations and depends on the thickness of the lens as well as the defining parameter set. If two lenses are used, as might be the case if thin Fresnel lenses are chosen for the optics, the offset between the two axes depends on both thicknesses, the refractive index, and the distance between the two lenses.

Figure 48:
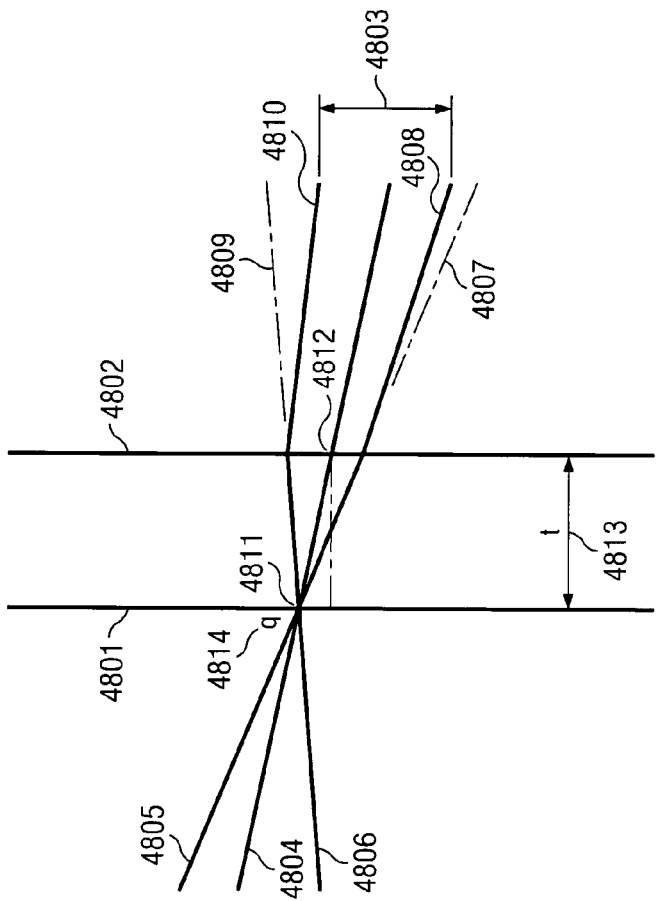
FIG. 48 is an illustration of a split lens showing offset axes of the two focusing surfaces (refraction of central ray ignored), representing an embodiment of the invention.

Referring to FIG. 48, the ray 4805 from a corner emitter and the ray 4806 from a diagonally opposite corner emitter both intersect the first surface at the lens plane 4801 at the center of the first surface 4811. If the second surface 4802 has positive curvature (is a converging lens), the refracted rays 4808 and 4810 will bend inwards, as shown. These two refracted rays define the extent of the image 4803. If the second surface 4802 had no refractive effect, the two incident rays would be the unrefracted rays, 4807 and 4809, delineating larger image according the geometric magnification of the system. Thus, a convex surface placed between the first surface and the image plane reduces the image size. Conversely for a concave surface (negative curvature).

The central ray 4804 must still intersect the center of the receiver pattern and, hence, remain unaffected in direction by the second surface. This can only happen in the situation depicted if this ray intersects the axis of the second surface 4812. This illustrates that the axis of the second surface cannot be coincident with the axis of the first surface. The second-surface axis must lie farther from the system origin than the axis of the first surface. The geometry of this situation is evident from the figure, which may be used to compute the precise position of the second surface with respect to the first, given the distance 4813 labeled t between the two surfaces. The angle central ray 4804 makes with the system axis {0,0,1} is the inverse tangent of the ratio of the distance Oe to the distance ef of FIG. 46. The distance between the two axes, which pass through 4811 and 4812 respectively, is the tangent of this angle times the distance between the two centers 4811 and 4812 measured along the system axis {0,0,1}. Thus, the axial distance 4814 labeled q is given by Equation (10), as $$q = t\frac{Oe}{ef} = t\frac{S}{F-S} = t\frac{S}{L} = t\frac{S}{2M-S} \qquad (10)$$

Of course, in a system with a central module, such as 9 modules configured in a square array, the collecting lens above the center module has both object and image on axis. In this case, the there will be no offset between the two axes and the axis of the collecting lens coincides with the axis of the module and the axis of the emitter grid. That is, the collecting lens, both first and second surfaces, for this center module is located precisely at {L, 0, 0} and {L+t,0,0}, respectively.

Extending the methods to other module configurations

The system with 4 modules arranged in a square is the simplest, non-trivial configuration. All collectors in this configuration are identical and the optics may be realized with a simple, single-surface collecting lens if the geometric magnification is sufficient to define the required receiver grid.

Other configurations, serving different applications are possible. Consider four modules arrange in a row. The form factor of this 1-by-4 four arrangement has obvious advantages over the more compact, 2-by-2 arrangement described as the particular preferred embodiments. For example, forced-air cooling of the 1-by-4 arrangement may well be an easier task than forcing air through two layer of electronics.

Numbering the modules in the linear array with the numbers 1, 2, 3, and 4, symmetry considerations show that there are two different collectors (location and curvature) replicated twice, once for the left half (numbers 1 and 2 say), and the other for the right half. There are also, in an 8-way module, 8 different broadcast lenses required in each module on the left half, which are replicated, by rotational symmetry, for the right half. That is, lenses for module 1 are identical to those for module 4, and those of module 2 are identical to those of module 3.

The situation is a bit more complicated with nine modules arranged in a 3-by-3 fashion. In this case, by symmetry considerations, there are a total of three different collecting lenses and nine different broadcast lenses. For a 4-by-4 arrangement, there are three different collecting lenses, with the proviso that the placement of these collectors follows a reflection about the several symmetry axes. The number of distinct broadcast lenses jumps to 32 with 54 distinct facets among the total of 8×16×16 or 2048 in all.

If all collectors are to be placed in the same plane, then FIG. 48 implies that two of the collectors in the 1-by-4 case will require either split or compound lenses; while a minimum of 5 in the 3-by-3 example will need to be split or compound. For the 4-by-4, either 8 or 12 of the lenses will be split or compound. Of course, for any magnification other that the one determined by geometry (as given by Equation (7)), all lenses will be either split or compound.

Macro Distortions Reduced by Correcting Collector from Spherical to Aspheric

A distortion of the image or focal plane may still be found in the distribution-collection methods disclosed herein. By adding small aspheric expansion terms to the standard spherical terms in the expression for the surface of the collecting lens, it is possible to reduce the effect of such focal-plane distortions.

Summary of Method & Benefits

The invention includes two inter-related parts: (1) designing a faceted broadcast lens in conjunction with (2) an appropriate collecting lens. This combination solves many of the optical and intensity problems inherent in a broadcast FSOI. Among these problems are focal plane distortion, image-region distortion at individual receivers, inadequate intensity, especially when scaling to larger systems.

The above discussion has presented design methods for realizing the simplest possible optical system involving an array of coplanar broadcast and collecting lenses. In this simplest case, it is feasible to realize the lens array as a molded array of Fresnel lenses in a single sheet of nominal thickness. Both broadcast (facet) lenses and collecting lenses may be plano-convex, resulting in an inexpensive optical system.

A minor complication was required to vary the system magnification from the geometrical magnification. This change required that a second, curved surface be added to the collector by either making the lens thicker or adding a second lens plane containing this second surface as an additional plano-convex lens, which may also be fabricated as a sheet of Fresnel optics.

ADVANTAGES OF THE INVENTION

The invention provides advantages in the context of supercomputing. Communications between processing nodes is one of the central bottle necks found in supercomputers. The methods disclosed herein overcome the latency problems associated with interprocessor communications by interconnecting all nodes in a system with light. The resulting interconnect is smaller and faster than existing cross-bar and fat-tree methods. In addition, the invention allows efficient broadcast models to be directly implemented rather than simulated as is presently done.

The invention provides advantages in the context of switching and routing. Configured as an optical switch, any node in the system can broadcast information to all other nodes. If each information packet has an associated routing header, any one or several receiving nodes that recognize that header can accept the information packet and transmit it out of the optical switch to the appropriate recipient.

The invention provides advantages in the context of associative memory. In simplest terms, memory association is a method of posing a query as to the presence or absence of a certain item. A code for the item in question is broadcast to all portions of the system. These portions are searched in parallel and any positive responses are reported back to the querying node. The effect is that of an associative memory. Such an associative memory can be very large and distributed by making use of hashing tables at each processing node (module), such hashing tables contain references to remote memory stores such as disk drives or internet resources.

The invention provides advantages in the context of sorting and merging. The broadcast capability allows a multiprocessor system to carry out sorting algorithms more efficiently than presently used interconnect methods. A table or list to be sorted is broken into n small pieces and each piece is sent to one of n processing nodes (modules) where it is is finished to coordinate the merging phase. Each processing node (module) then sends its table element-by-element in ordered fashion to the merging node where the results are placed in the final table in sorted order. Comparisons are done in the merging node (module) to achieve the overall order based on range information received from each of the partial-sorting nodes (modules).

The invention provides advantages in the context of communications processing where one light path is used to simply transmit a communication stream while the other $n^2-2$ paths split up the data stream into multiple processes on independent processors, each of which might search for a different pattern or condition without affecting or interfering with the primary communications path. The invention provides advantages in communications processing where forward error correction can be effectively and efficiently done on the communications stream in place and on-the-fly. The invention provides advantages in communications processing where individual data packets representing voice messages can be decoded into sampled audio, such sampled audio is then subjected to further processing such as speaker or speech recognition even as the uninterrupted path through the system continues to carry the original message.

The invention provides advantages in the context of image processing where each portion of the image is sent to a different processor for a particular type of filtering operation, all such filtering operations taking place in parallel. The final image is then reassembled at a single node in the system.

The invention provides advantages in the context of pattern recognition on signals or images where the probabilities of certain pattern types are desired. Each of n processors can examine a signal or image in parallel where each examination is essentially testing an hypothesis concerning a particular pattern. The result of each individual process is a probability of a particular pattern being present. Combining the results in the Bayesian manner yields the most probable pattern along with its absolute probability within the population of patterns being searched.

The invention provides advantages in the context of database searching where each processor has access to a different database or a different part of a particular database. A machine with n nodes optically connected as in the broadcast method allows such a search to proceed in parallel, effectively speeding up a database search by the number of processors available.

The invention provides advantages in the context of pattern recognition, where data from a subset of sensors, such as a random grouping of pixel information from an imaging device, is sent by broadcast to specific partial-image processors. The entire set of image-processing nodes (modules) can then identify particular pieces of the pattern in parallel. Individual pattern elements are then recognized as belonging to certain patterns. The results are assembled in a coordinating element and the most probable pattern is identified with the presented image. The paper by W. W. Bledsoe and I. Browning, "Pattern Recognition and Reading by Machine" in the 1959 *proceedings of the Eastern Joint Computer Conference* presents a particular example of pattern recognition that would benefit by the broadcast method disclosed herein.

More generally, in the usual interconnection methods, typically either optical or electrical (crossbar, electrical multiplexing with fan-out, etc), broadcast is achieved by increased complexity or simply not attempted other than by relaying messages between processors or serially between levels of the interconnect hardware. Optical fan-out is both inexpensive and simple to accomplish. Electrical fan-out, on the other hand, is slow, expensive, and difficult to accomplish, introducing latencies and delays in the message paths. The optical broadcast method uses optical fan-out, allowing light energy to reach all parts of the system from each optical emitter. An added feature of using light for broadcast is that light from various emitters does not interfere in the free-space region where the fan-out is taking place. That is, multiple light channels can occupy the same physical space.

The broadcast model of optical communication within a backplane allows efficient multiple-instruction, multiple-data (MIMD) operation as well as the usual single-instruction, multiple-data (SIMD) operation. Broadcast allows parallel database searching. This can be achieved by broadcasting a query to a distributed database where each portion of the database is interfaced to a processing node (module) of the system.

The broadcast model of optical communication within a backplane allows asynchronous operations and data-flow architectures. Synchronization can be efficiently achieved and maintained by broadcasting short messages concerning global system status and reporting local processor or cluster status. Data-flow computations can be easily coordinated by such short broadcast messages.

The broadcast model of optical communication within a backplane allows both large-grained and fined-grained problems to run simultaneously. In this case, destination codes can be assigned to groups of nodes and such nodes are not constrained to be near neighbors. Dynamic "local" groups are may be formed where "local" has a purely logical connotation and not constrained by physical nearness.

The broadcast model of optical communication within a backplane allows high-throughput transaction processing. For instance, by allowing each processing node (module) in a large lightcube array to communicate with several transaction stations, a lightcube can handle a large number of distributed and local transactions. Coordination between the transactions and a central data repository can be accomplished by broadcasting necessary information to coordinating processors as the transactions occur.

The broadcast model of optical communication within a backplane allows efficient semaphore use and management. Semaphores can be used to control computing resources by preempting them for in certain situations and allowing access in others. Semaphore management can become efficient and practical in a broadcast model.

The broadcast model of optical communication within a backplane allows multiple hypothesis testing on a single system (e.g., Bayesian parallel processing). Bayesian hypothesis concatenation and the particular application of Bayesian signal processing are the most consistent techniques for dealing with data of all kinds. Although preferred by many, these computationally intensive activities are often approximated by faster but less accurate methods. A parallel-processing system that allows broadcast of data to multiple hypothesis-testing nodes will allow the more accurate Bayesian methods to find wider application.

The broadcast model of optical communication within a backplane enables distributed memory access. A significant advantage of a low-latency, message-broadcast model is improved memory access in a distributed memory system. For example, in a cache-coherent, uniform memory model, the addition of a new node would not be a problem as the new node would simply announce its presence and any reference to the new node would be simply a reference at large, broadcast to all.

The invention is scalable and cost effective. The invention is inherently tolerant to misalignment with no feed-back recovery system necessary. The invention facilitates efficient optical communication and/or computing within and between core switches, terabit routers and cross-connect equipment, especially in central office environments.

PRACTICAL APPLICATIONS OF THE INVENTION

There are many practical uses for the communications power provided by the invention that have substantial value within the technological arts. A central result achieved by the invention is that of intrinsic information broadcast to the entire set of processing nodes (modules). As a computing or data-processing technique, broadcast allows multiple receiving nodes, simultaneously and without necessity of intervening and delaying relaying steps, to receive coordinating information as well as allowing data to be processed in parallel. Practical uses of broadcast include synchronizing computing activities, efficient communication of system control information, efficient management of semaphores (e.g., for simultaneous updating of local cache memory from a global memory store), implementation of a flat-memory model where a system-wide distributed memory is uniformly available to all processing nodes (modules) within a system, asynchronous routing of packet information to multiple receivers, distributing video information to multiple receivers, database transaction processing where a single query is passed to multiple databases and/or distributed to portions of a large database, and pattern matching wherein a pattern is broadcast to multiple processors each of which examine in parallel a small portion of the image and the matching information is broadcast from each partial-pattern processor to a central information processor. In addition to processing of information, broadcast can be used to efficiently and effectively control information being sent to a variety of receiving stations, whether local within the system or remote from the interconnect and accessed by Ethernet, internet, or other networks and communication channels.

There are many practical uses for the magnitude of computing power provided by the invention that have substantial value within the technological arts. The invention is useful for simulation and modeling of physical processes. The invention is useful for switching and routing of information. The invention is useful for the management of massive databases. The invention is useful for pattern matching and correlations. The invention is useful for data analysis and reduction. The invention is useful for image processing and rendering.

A partial list of practical applications for the invention include: nuclear stockpile verification; massive database searches & correlations; drug design; biological simulation and modeling; weather simulation and modeling; physics & astronomy simulation and modeling; chemistry by design; mechanical engineering structural modeling and design (e.g., buildings, vehicle crash testing, etc.); earth sciences simulation and modeling; biometrics on a massive scale (e.g., voice, face, vital signs, bio patterns, etc.) voice identification and speech transcription on an accurate and massive scale; economic and sociopolitical simulation and modeling; automatic database creation, management, consolidation and mining; and onboard space-craft and satellite data processing. Some applications for the invention in switching, routing, and rendering are: automatic communications and data-routing center, for instance, gathering, sorting, classifying, correlating, and disseminating all communications; information management and switching (e.g., a continental-scale data router or other (potentially inexpensive and redundant) continental-sized distributed systems); pinpoint video for a mass audience (e.g., education, entertainment, and so forth); repository, storage, and delivery system(s); real-time film production (e.g., animation, rendering, digital imaging, etc); and a multi-player, video game server. There are virtually innumerable uses for the invention, all of which need not be detailed here.

The terms a or an, as used herein, are defined as one or more than one. The term plurality, as used herein, is defined as two or more than two. The term another, as used herein, is defined as at least a second or more. The terms comprising (comprises), including (includes) and/or having (has), as used herein, are defined as open language (i.e., requiring what is thereafter recited, but open for the inclusion of unspecified procedure(s), structure(s) and/or ingredient(s) even in major amounts. The phrases consisting of and/or composed of close the recited method, apparatus or composition to the inclusion of procedures, structure(s) and/or ingredient(s) other than those recited except for ancillaries, adjuncts and/or impurities ordinarily associated therewith. The recital of "essentially" along with "consisting of" or "composed of" renders the recited method, apparatus and/or composition open only for the inclusion of unspecified procedure(s), structure(s) and/or ingredient(s) which do not materially affect the basic novel characteristics of the composition. The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

All the disclosed elements and features of each disclosed embodiment can be combined with, or substituted for, the disclosed elements and features of every other disclosed embodiment except where such elements or features are mutually exclusive. Variation may be made in the steps or in the sequence of steps composing methods described herein.

Although the optical interconnect described herein can be a separate module, it will be manifest that the optical interconnect may be integrated into the system with which it is associated. For instance, the optical backplane may be part of a computer or network. The individual components need not be formed in the disclosed shapes, or combined in the disclosed configurations, but could be provided in virtually any shapes, and/or combined in virtually all configurations.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. An apparatus, comprising a broadcast optical interconnect including:
    a plurality of nodes positioned to define a node array, each of the plurality of nodes having at least one optical signal emitter and a plurality of optical signal receivers, the plurality of optical signal receivers positioned to define an individual receiver array that with regard to image forming geometry substantially corresponds to the node array; and
    a plurality of optics optically coupled to the array of nodes, the plurality of optics positioned to define an optics array whose members with regard to image forming geometry substantially correspond to the nodes of the node array and, each of the plurality of optics including at least one optical distributing element and an optical collecting element, wherein diverging elements of the optics array with regard to image forming geometry substantially correspond to the optical receivers of each node of the node array, wherein an optical signal from the optical signal emitter is fanned-out by the at least one optical distributing element of one of the optics and broadcast to one of the plurality of receivers of all of the plurality of nodes by the optical collecting element of all of the plurality of optics.

2. The apparatus of claim 1, wherein the at least one optical distributing element includes a wedge.

3. The apparatus of claim 1, wherein the at least one optical distributing element includes a diverging lens.

4. The apparatus of claim 1, wherein the at least one optical distributing element includes a faceted lens having a plurality of facets, one facet for each optical collecting element.

5. The apparatus of claim 4, wherein the plurality of facets include a plurality of anamorphic facets.

6. The apparatus of claim 1, wherein each optical collecting element of all of the plurality of optics includes a compound collecting lens.

7. The apparatus of claim 6, wherein the compound collecting lens includes two Fresnel lenses.

8. The apparatus of claim 6, wherein the split collecting lens includes two Fresnel lenses.

9. The apparatus of claim 1, wherein each optical collecting element of all of the plurality of optics includes a split collecting lens.

10. A method, comprising operating a broadcast optical interconnect including:
    fanning-out an optical signal from an optical signal emitter, of one of a plurality of nodes, with an optical distributing element of one of a plurality of optics; and
    substantially simultaneously broadcasting the optical signal to one of a plurality of receivers of all of the plurality of nodes with an optical collecting element of all of the plurality of optics,
    wherein the plurality of optics are positioned to define an optics array, the plurality of receivers are positioned to define a receiver array that corresponds to the optics array and the plurality of nodes are positioned to define a node array that substantially corresponds to the receiver array and the optics array.

11. The method of claim 10, wherein fanning-out includes refracting the optical signal through a wedge.

12. The method of claim 10, wherein fanning-out includes refracting the optical signal through a diverging lens.

13. The method of claim 10, wherein fanning-out includes refracting the optical signal through a faceted lens having a plurality of facets, one facet for each node.

14. The method of claim 13, wherein refracting the optical signal includes conveying the optical signal through a plurality of anamorphic facets.

15. The method of claim 10, wherein substantially simultaneous broadcasting including magnifying.

16. The method of claim 15, wherein magnifying includes refracting the optical signal through a compound collecting lens.

17. The method of claim 16, wherein refracting the optical signal including conveying the optical signal through two Fresnel lenses.

18. The method of claim 15, wherein magnifying includes refracting the optical signal through a split collecting lens.

* * * * *